US012236335B2

(12) United States Patent
Ramanan et al.

(10) Patent No.: US 12,236,335 B2
(45) Date of Patent: Feb. 25, 2025

(54) SYSTEM AND METHOD FOR TIME-DEPENDENT MACHINE LEARNING ARCHITECTURE

(71) Applicant: ROYAL BANK OF CANADA, Toronto (CA)

(72) Inventors: Janahan Mathuran Ramanan, Toronto (CA); Jaspreet Sahota, Toronto (CA); Rishab Goel, Toronto (CA); Sepehr Eghbali, Toronto (CA); Seyed Mehran Kazemi, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 1109 days.

(21) Appl. No.: 16/746,866

(22) Filed: Jan. 18, 2020

(65) Prior Publication Data
US 2020/0234100 A1    Jul. 23, 2020

Related U.S. Application Data

(60) Provisional application No. 62/795,846, filed on Jan. 23, 2019.

(51) Int. Cl.
*G06N 3/084* (2023.01)
*G06F 17/10* (2006.01)
(Continued)

(52) U.S. Cl.
CPC ............ *G06N 3/049* (2013.01); *G06F 17/10* (2013.01); *G06F 17/14* (2013.01); *G06F 17/142* (2013.01);
(Continued)

(58) Field of Classification Search
CPC ........ G06N 3/049; G06N 20/00; G06N 20/10; G06N 3/044; G06N 3/084; G06F 17/10;
(Continued)

(56) References Cited

U.S. PATENT DOCUMENTS

2019/0365342 A1 * 12/2019 Ghaffarzadegan ....... A61B 7/04

OTHER PUBLICATIONS

Godfrey et al., "Neural Decomposition of Time-Series Data for Effective Generalization", 2018, IEEE Transactions on Neural Networks and Learning Systems, vol. 29, No. 7, pp. 2973-2985. (Year: 2018).*

(Continued)

*Primary Examiner* — Ben M Rifkin
(74) *Attorney, Agent, or Firm* — Norton Rose Fulbright Canada LLP

(57) ABSTRACT

Described in various embodiments herein is a technical solution directed to decomposition of time as an input for machine learning, and various related mechanisms and data structures. In particular, specific machines, computer-readable media, computer processes, and methods are described that are utilized to improve machine learning outcomes, including, improving accuracy, convergence speed (e.g., reduced epochs for training), and reduced overall computational resource requirements. A vector representation of continuous time containing a periodic function with frequency and phase-shift learnable parameters is used to decompose time into output dimensions for improved tracking of periodic behavior of a feature. The vector representation is used to modify time inputs in machine learning architectures.

23 Claims, 39 Drawing Sheets

(51) Int. Cl.
G06F 17/14 (2006.01)
G06F 17/15 (2006.01)
G06F 17/18 (2006.01)
G06N 3/044 (2023.01)
G06N 3/049 (2023.01)
G06N 20/00 (2019.01)
G06N 20/10 (2019.01)

(52) U.S. Cl.
CPC ............ *G06F 17/156* (2013.01); *G06F 17/18* (2013.01); *G06N 3/044* (2023.01); *G06N 3/084* (2013.01); *G06N 20/00* (2019.01); *G06N 20/10* (2019.01)

(58) Field of Classification Search
CPC ...... G06F 17/14; G06F 17/142; G06F 17/156; G06F 17/18
See application file for complete search history.

(56) References Cited

OTHER PUBLICATIONS

Neil et al., "Phased LSTM: Accelerating Recurrent Network Training for Long or Event-based Sequences", Oct. 29, 2016, arXiv:1610.09513v1, pp. 1-9. (Year: 2016).*

Jithendar Anumula, Daniel Neil, Tobi Delbruck, and Shih-Chii Liu. Feature representations for neuromorphic audio spike streams. Frontiers in neuroscience, 12:23, 2018.

Kyunghyun Cho, Bart Van Merriënboer, Caglar Gulcehre, Dzmitry Bahdanau, Fethi Bougares, Holger Schwenk, and Yoshua Bengio. Learning phrase representations using rnn encoder-decoder for statistical machine translation. arXiv preprint arXiv:1406.1078, 2014.

Nan Du, Hanjun Dai, Rakshit Trivedi, Utkarsh Upadhyay, Manuel Gomez-Rodriguez, and Le Song. Recurrent marked temporal point processes: Embedding event history to vector. In Proceedings of the 22nd ACM SIGKDD International Conference on Knowledge Discovery and Data Mining, pp. 1555-1564. ACM, 2016.

Michael S Gashler and Stephen C Ashmore. Modeling time series data with deep fourier neural networks. Neurocomputing, 188:3-11, 2016.

Tuomas Virtanen Giambattista Parascandolo, Heikki Huttunen. Taming the waves: sine as activation function in deep neural networks. 2017.

Luke B Godfrey and Michael S Gashler. Neural decomposition of time-series data for effective generalization. IEEE transactions on neural networks and learning systems, 29(7):2973-2985, 2018.

Klaus Greff, Rupesh K Srivastava, Jan Koutnik, Bas R Steunebrink, and Jürgen Schmidhuber. Lstm: A search space odyssey. IEEE transactions on neural networks and learning systems, 28(10):2222-2232, 2017.

Sepp Hochreiter and Jürgen Schmidhuber. Long short-term memory. Neural computation, 9(8):1735-1780, 1997.

Hao Hu and Guo-Jun Qi. State-frequency memory recurrent neural networks. In International Conference on Machine Learning, pp. 1568-1577, 2017.

Diederik P Kingma and Jimmy Ba. Adam: A method for stochastic optimization. arXiv preprint arXiv:1412.6980, 2014.

Alan Lapedes and Robert Farber. Nonlinear signal processing using neural networks: Prediction and system modelling. Technical report, 1987.

Shuang Li, Shuai Xiao, Shixiang Zhu, Nan Du, Yao Xie, and Le Song. Learning temporal point processes via reinforcement learning. In Advances in Neural Information Processing Systems (NeurIPS), pp. 10804-10814, 2018.

Yang Li, Nan Du, and Samy Bengio. Time-dependent representation for neural event sequence prediction. 2018.

Hongyuan Mei and Jason M Eisner. The neural hawkes process: A neurally self-modulating multivariate point process. In Advances in Neural Information Processing Systems, pp. 6754-6764, 2017.

Vinod Nair and Geoffrey E Hinton. Rectified linear units improve restricted boltzmann machines. In Proceedings of the 27th international conference on machine learning (ICML-10), pp. 807-814, 2010.

Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. 2017.

David Poole, David Buchman, Seyed Mehran Kazemi, Kristian Kersting, and Sriraam Natarajan. Population size extrapolation in relational probabilistic modelling. In International Conference on Scalable Uncertainty Management, pp. 292-305. Springer, 2014.

Josep M Sopena, Enrique Romero, and Rene Alquezar. Neural networks with periodic and monotonic activation functions: a comparative study in classification problems. 1999.

Utkarsh Upadhyay, Abir De, and Manuel Gomez-Rodriguez. Deep reinforcement learning of marked temporal point processes. In Advances in Neural Information Processing Systems (NeurIPS), 2018.

Ashish Vaswani, Noam Shazeer, Niki Parmar, Jakob Uszkoreit, Llion Jones, Aidan N Gomez, Łukasz Kaiser, and Illia Polosukhin. Attention is all you need. In Advances in Neural Information Processing Systems, pp. 5998-6008, 2017.

Yu Zhu, Hao Li, Yikang Liao, Beidou Wang, Ziyu Guan, Haifeng Liu, and Deng Cai. What to do next: Modeling user behaviors by time-lstm. In Proceedings of the Twenty-Sixth International Joint Conference on Artificial Intelligence, IJCAI-17, pp. 3602-3608, 2017.

* cited by examiner

A weighted sum of the sinusoids in Time2Vec oscillating every 7 days.

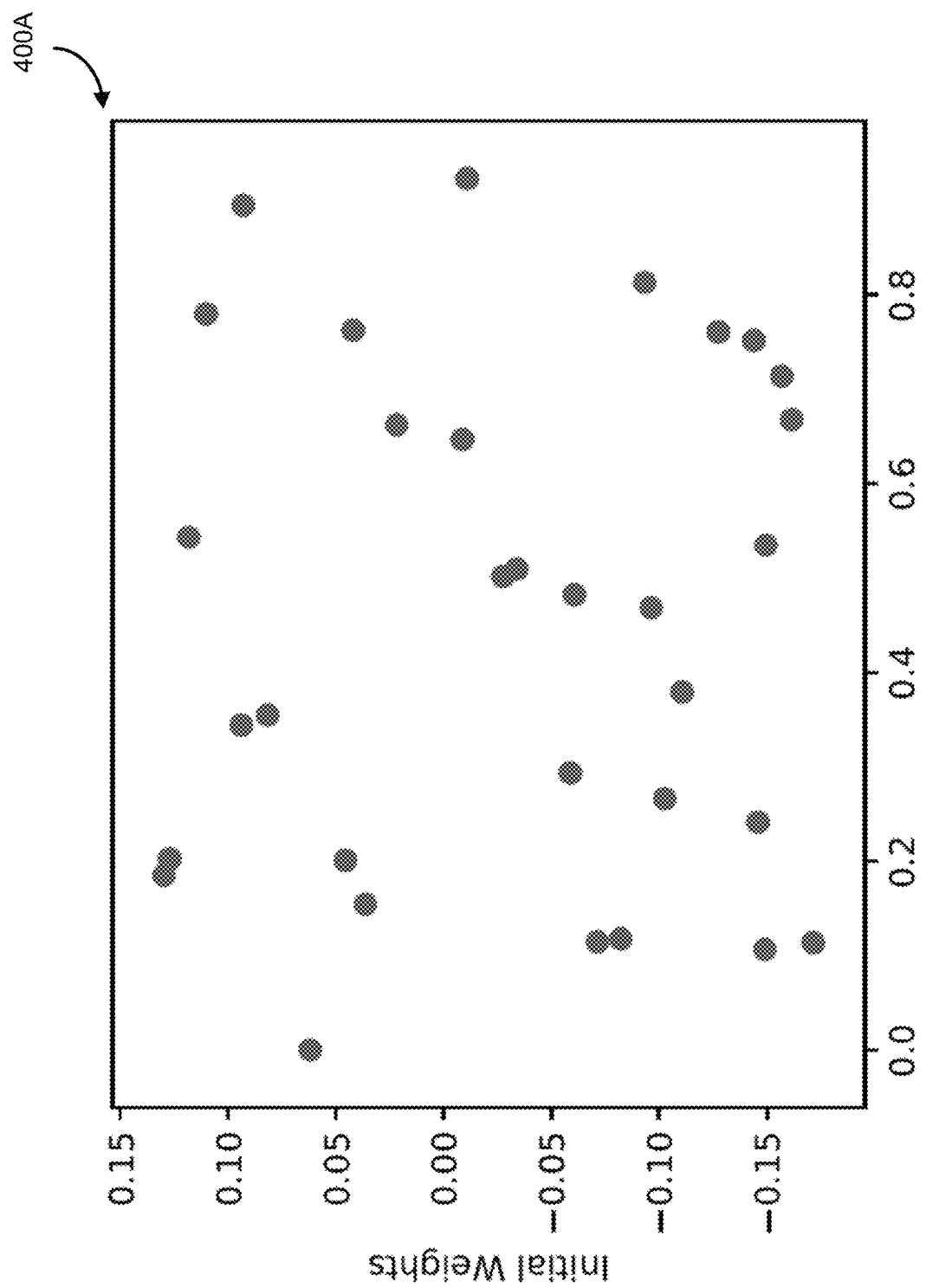

Event-MNIST

SYSTEM AND METHOD FOR TIME-DEPENDENT MACHINE LEARNING ARCHITECTURE

CROSS-REFERENCE

This application is a non-provisional of, and claims all benefit, including priority to, U.S. Application No. 62/795,846, filed on Jan. 23, 2019, entitled "SYSTEM AND METHOD FOR TIME-DEPENDENT MACHINE LEARNING ARCHITECTURE", incorporated herein by reference.

FIELD

Embodiments of the present disclosure generally relate to the field of machine learning, and more specifically, embodiments relate to devices, systems and methods for a time-dependent machine learning architecture.

INTRODUCTION

The goal of machine learning is to construct models in relation to various applications that improve their performance based on past experience. In building these models, "time" is often an important feature.

Examples of the situations where time is an important feature include predicting daily sales for a company based on the date (and other available features), predicting the next time a patient will return to the hospital based on their medical history, and predicting the song a person is willing to listen to, based upon what songs the person has listened to in the past and when.

SUMMARY

Described in various embodiments herein is a technical solution directed to decomposition of time as an input for machine learning, and various related mechanisms and data structures. In particular, specific machines, computer-readable media, computer processes, and methods are described that are utilized to improve machine learning outcomes, including, improving accuracy, convergence speed (e.g., reduced epochs for training), and reduced overall computational resource requirements.

Embodiments herein are implemented using a combination of electronic or computer hardware and/or software, such as processors, circuit boards, circuits, data storage devices, memory. As described in various embodiments, an improved data structure representation is provided. The improved data structure representation (described herein as "Time2Vec") is an orthogonal and complementary approach that uses a model-agonistic vector representation for time. In particular, the improved data structure is a computer implemented data structure that can be used in conjunction with computer-based artificial intelligence and machine learning data model architectures. The improved data structure encapsulates a learnable vector representation for time.

The improved data structure is utilized to replace a conventional representation of time, and experimental results are provided to indicate that, in some embodiments, the usage of the improved data structure improved technical performance of various machine learning data model architectures. For example, the computational performance of a recurrent neural network (RNN) can be obtained where the improved data structure is utilized to help make effective use of time as a feature.

Accordingly, a system for feature encoding by decomposing time features into a data structure as inputs into a machine learning data model architecture can be provided in various embodiments. The system can, for example, reside in a data center or be implemented using a series of configured computing devices that interoperate together, such as a computer processor operating with computer memory in one or more computer servers. The training data and the new example data can be received across a network interface (e.g., through a messaging bus), for example, from external data set storage devices, and the system can provide one or more machine learning data model architecture that have been adapted according to approaches described herein. In another embodiment, the system is utilized to modify existing machine learning data model architectures by replacing time elements at inputs and/or intermediary gates (e.g., time gates, forget gates) with the decomposition as described herein in various embodiments.

As the machine learning data model architectures iterate across a plurality of training epochs based on a set of training data, because the decomposed set of feature components includes frequency and phase-shift learnable parameters, these parameters shift over the plurality of training epochs to reflect periodicity of the set of training data, which helps the machine learning data model architectures adapt to the periodicity of the set of training data. Relative to conventional time-based inputs, the utilization of the decomposed set of feature components yields potential improvements as it relates to convergence time and accuracy of the machine learning data model architectures when compared after number of training epochs. As noted in experimental simulations, the improvement yield may be dependent on underlying periodicity of the training data and the new examples.

The trained machine learning data model architectures are maintained on a data storage and stored for usage. The trained machine learning data model architectures can be deployed to generate predictions based on new data sets provided as inputs. The predictions are generated through passing the inputs through the various layers (e.g., gates) and interconnections such that an output is generated that is an output data element. An output data element can be captured as a data structure, and can include generated logits/softmax outputs such as prediction data structures. Generated predictions, for example, can include estimated classifications (e.g., what type of animal is this), estimated values (e.g., what is the price of bananas on Nov. 21, 2025).

The system can be utilized in various types of machine learning data architectures, such as data architectures adapted for supervised learning, reinforcement learning, among others. As noted above, the approach to decompose time from a data structure perspective into a time vector can help the machine learning data architecture adapt to periodicity in the data, even if such periodicity is not known beforehand such that an improved convergence rate is possible, which could yield a technically superior machine learning data architecture (e.g., neural network) for a fixed number of training epochs, for example.

This is particularly useful where it is not practical to set pre-defined periodicity, where the machine learning data architectures are being used for different data sets having different periodicity, where complex periodicity is encapsulated in the training data sets, or where long-time frame periodicity is present.

The input for problems involving time can be considered as a sequence where, rather than being identically and independently distributed (iid), there exists a dependence across time (and/or space) among the data points.

In relation to time, the sequence can be either synchronous, i.e. sampled at an equal rate, or asynchronous, i.e. sampled at different points in time. In both cases, time may be an important feature. For predicting daily sales, for instance, although the input is synchronous, it may still be useful to know if a day is Black Friday or not.

For predicting the next time a patient will return to the hospital, it is important to know the (asynchronous) times of their previous visits. Within the field of deep learning, Recurrent Neural Networks (RNN) have become a useful model in processing sequential data.

A principle of the RNN is that its input is a function of the current data point as well as the history of the previous inputs. The original RNN model suffered from the problem of exploding and vanishing gradients during its back-propagation learning. This was an open problem until the introduction of gating units [Sepp Hochreiter and Jürgen Schmidhuber. Long short-term memory. *Neural computation*, 9(8):1735-1780, 1997; Kyunghyun Cho, Bart Van Merriënboer, Caglar Gulcehre, Dzmitry Bandanau, Fethi Bougares, Holger Schwenk, and Yoshua Bengio. Learning phrase representations using rnn encoder-decoder for statistical machine translation. *arXiv preprint arXiv:*1406.1078, 2014].

For example the Long Short-Term Memory (LSTM) network developed by Hochreiter and Schmidhuber [Sepp Hochreiter and Jürgen Schmidhuber. Long short-term memory. *Neural computation*, 9(8):1735-1780, 1997] introduced input, forget, and output gates and an internal cell state for improving gradient flow.

When time is a relevant feature, one possible approach for dealing with time is to feed the time (or some engineered features of time such as day of the week, is Black Friday, etc.) as yet another input feature to an RNN. Observing that standard RNNs often fail at effectively consuming time as a feature, the focus of the recent studies has been mainly on proposing new architectures that better handle time. RNNs do not typically treat time itself as a feature, typically assuming that inputs are synchronous. When time is known to be a relevant feature, it is often fed in as yet another input dimension. In practice, RNNs often fail at effectively making use of time as a feature. To help the RNN make better use of time, several researchers design hand-crafted features of time that suit their specific problem and feed those features into the RNN. Hand-crafting features, however, can be expensive and requires domain expertise about the problem.

In an example approach described in embodiments herein, an orthogonal but complementary approach to the recent studies is provided: instead of designing new architectures that better handle time, a new representation and data structures thereof for representing time that is agnostic to the architecture, was developed, i.e., it can be possibly used in any of the existing or future architectures. In particular, some embodiments are directed to a vector representation (e.g., embedding) for time that can be used instead of the time itself.

Corresponding devices, systems, methods, non-transitory computer readable media, and processes are described. In these devices, systems, methods, non-transitory computer readable media, and processes, approaches to generating the Time2Vec data structures and utilizing the generated Time2Vec data structures are contemplated, improving the exploitation of temporal information.

A system for representing time as a vector is described in some embodiments. In an embodiment, the system includes at least one function containing frequency and phase-shift learnable parameters, is being used to represent time (e.g., continuous or discrete time, according to various embodiments), and/or enables the capture of periodic behaviour.

In another aspect, at least one function is a sine function.

In another aspect, the vector is being fed as an input into a model that processes sequential data;

In another aspect, the vector is a neural network layer;

In another aspect, the vector uses at least one function only for transforming time;

In another aspect, the neural network layer decomposes time into at least one output dimension of the layer, such output dimension being a distinct feature.

In another aspect, at least one distinct feature is a harmonic sum with at least one learnable frequency, which can be used to model the periodic behaviour of a feature.

In another aspect, at least one distinct feature is a linear term which can model non-periodic components and may aid with extrapolation.

In another aspect, each component of the attribute vector will latch on to different relevant signals with different underlying frequencies such that each component can be viewed as representing distinct temporal attributes (having both a periodic and non-periodic part).

The system can be implemented as a vector decomposition engine, which generates data structures representing decomposed multi-dimensional vectors adapted as inputs into a machine learning mechanism.

In another aspect, the decomposed set of feature components representative of the at least one or more periodic functions is a vector representation t2v(τ) having k sinusoids, provided in accordance with the relation:

$$t2v(\tau)[i] = \begin{cases} \omega_i \tau + \varphi_i, & \text{if } i = 0. \\ \sin(\omega_i \tau + \varphi_i), & \text{if } 1 \leq i \leq k; \end{cases}$$

wherein t2v(τ)[i] is a vector of size k+1, t2v(τ)[i] is the $i^{th}$ element of t2v(τ), and $\omega_i$s and $\varphi_i$s are the frequency and phase-shift learnable parameters.

In another aspect, t2v(τ) replaces a time feature, τ as an input into the machine learning data model architecture. For example, this can be utilized to modify existing machine learning data model architectures (e.g., TimeLSTM). Aside from the illustrative example, TimeLSTM (for which empirical evidence is noted below), there are several other architectures that can potentially benefit from Time2Vec. These architectures include RMTPP, JODIE, Know-Evolve, among others. Accordingly, it should be understood that not all embodiments are limited to TimeLSTM.

In another aspect, the set of training data where a period or a phase shift of the set of training data is undefined (e.g., not known a priori) and is learned (e.g., updated, converged, maintained) over the plurality of iterated training epochs by modifying one or more weights associated with the frequency and phase-shift learnable parameters. Accordingly, the system can be utilized where there is no need to specifically define the periodicity or associated characteristics prior to implementation (known as "hand crafting")—the system, over a period of training epochs, adapts weightings such that certain frequencies and phase shifts are emphasized over time, for example, through the use of various optimization functions (e.g., avoiding "hand crafting").

In another aspect, the frequency and phase-shift learnable parameters are initialized as random numbers. In another aspect, the frequency and phase-shift learnable parameters are initialized as predefined numbers.

In another aspect, the number of sinusoids, k, is a selectable hyperparameter, selected, for example, from one of 16, 32, 64. In another embodiment, k is selected based on a number or type of gates to be modified. For example, if there are 2 time gates, k is selected to 16 to avoid overfitting. In a non-limiting, illustrative example, k (corresponding to the number of sine gates used in Time2Vec) can be mainly dataset dependent (for smaller and simpler datasets a lower value of k is expected to give better results while for larger and more complicated datasets a higher value of k is expected to give better results).

The system, in another embodiment, further includes a feature encoder adapted to identify one or more periodic or non-periodic features selected from the decomposed multi-dimensional vector for incorporation into a machine learning mechanism. In a further embodiment, the system can include a machine learning mechanism (e.g., a neural network), that incorporates the feature encoder or decomposition engine as describe above.

The system is potentially useful when adapted for machine learning mechanisms that receive inputs that have a latent periodicity. The feature terms of the decomposed vectors are used for training such that over epochs of training, the latent periodicity is automatically adapted for and used to improve convergence and overall model accuracy. Implementations where there is latent periodicity include implementations where there may not be an explicitly set schedule of time-aspects associated with inputs, but there is a latent periodicity.

For example, data associated with bread purchases in a household will likely exhibit periodic components, but the purchases are likely not consistent with a specific schedule (e.g., few people purchase bread every Monday). There may be phase shift effects, modifications to frequency, a level of 'jitter', among others.

Other types of data where this is useful for analysis include computing resource monitoring, health care data pattern analysis, among others.

For predicting daily sales, for instance, it may be useful to know if it is a holiday or not. For predicting the time for a patient's next encounter, it is important to know the (asynchronous) times of their previous visits.

A technical benefit to decomposing time for machine learning in data structures in accordance with various embodiments is that there is no need, in some embodiments, to explicitly assign periodicity, which can be very time consuming especially where there are a large number of dimensions. Periodicity is not always visibly apparent in data, especially in large data sets having a large number of dimensions, or periodicity that only is exhibited in long time frames, and accordingly, it is not always practical to explicitly define periodicity.

Rather, using a decomposed vectorized time data structure approach for machine learning, the periodicity can automatically become dominant as it surfaces as a feature through epochs of training (e.g., as weights on interconnected nodes are updated through each iteration of a neural network).

In another aspect, the decomposed set of feature components includes a non-periodic term that is a linear term that represents a progression of time and the linear term is used for capturing non-periodic patterns in the set of training data that depend on time; and the linear term includes at least a representation of the frequency and phase-shift learnable parameters.

In another aspect, providing the decomposed set of feature components as inputs into the machine learning data model architecture includes replacing a time feature of one or more gates of the machine learning data model architecture with the decomposed set of feature components.

In another aspect, the set of training data includes long sequences or long time horizons. For example, the length of the sequences in the raw N_TDIGITS18 dataset are quite large (almost 6K elements in the sequence) and that has been one of the main reasons why other approaches work struggled on this dataset.

In another aspect, the computer processor is configured to: receive a new data set representative of a new example; and process the new data set using the trained machine learning data model architecture to generate one or more prediction data structures (e.g., logits for provisioning into a softmax to establish normalized prediction outputs).

Accordingly, various embodiments are directed to approaches for providing new machine learning data model architectures. Alternative embodiments are directed to approaches for retrofitting or modifying machine learning data model architectures to include the time decomposition data structures noted herein. Further embodiments are directed to trained machine learning data model architectures (e.g., neural networks) that are adapted for the time decomposition data structures and trained on training data sets.

The improvements described herein can offer boosts in convergence and technical performance of the machine learning data model architectures as compared to naïve machine learning data model architectures.

The trained machine learning data model architectures can be deployed for use with

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1A is a comparison against the Event-MNIST dataset, FIG. 1B is a comparison against the TIDIG-ITS spoken digit dataset (N_TIDIGITS_18), FIG. 1C is a comparison against a dataset based on Stack Overflow, FIG. 1D is a comparison against a history of the listening habits for 992 users on the Last.FMsite (Last.FM) dataset. FIG. 1E is a comparison against a dataset containing data about what and when a user posed on the citeulike website (CiteULike).

FIG. 2A is a chart showing TLSTM1 on Last. FM, FIG. 2B is a chart showing TLSTM1 on CiteULike, FIG. 2C is a chart showing TLSTM3 on Last. FM, FIG. 2D is a chart showing TLSTM3 on CiteULike.

3A is a chart showing oscillation every 7 days, and FIG. 3B is a chart showing oscillation every 14 days. The circles represent the points to be classified as 1.

FIG. 4A-4B are charts showing weights for frequencies for the synthesized data set, according to some embodiments. FIG. 4A is a plot of the initial weights, and FIG. 4B is a plot of the learned weights.

FIG. 5A is a plot comparing different activation functions for Time2Vec on Event-MNIST. In FIG. 5A, Sigmoid and Tan h almost overlap. FIG. 5B is a plot comparing frequencies fixed to equally-spaced values, frequencies fixed according to positional encoding, and learned frequencies on Event-MNIST. FIG. 5C is a plot of a histogram of the frequencies learned in Time2Vec for Event-MNIST. The x-axis represents frequency intervals and the y-axis represents the number of frequencies in that interval. FIG. 5D is a plot showing the performance of TLSTM3+ Time2Vec on CiteULike in terms of Recall@10 with and without the linear term.

FIG. 7A is a plot in relation to Event-MNIST. FIG. 7B is a plot in relation to raw N_TIDIGITS18.

FIG. 8A is a plot in relation to Recall, and FIG. 8B is a plot in relation to MRR.

FIG. 9A is a plot in relation to Recall, and FIG. 9B is a plot in relation to MRR.

FIG. 10A is a plot in relation to Recall, and FIG. 10B is a plot in relation to MRR.

FIG. 11A is a plot in relation to Recall, and FIG. 11B is a plot in relation to MRR.

FIG. 12A is a plot in relation to Recall, and FIG. 12B is a plot in relation to MRR.

FIG. 13A is a plot in relation to Recall, and FIG. 13B is a plot in relation to MRR.

FIG. 14A is a plot in relation to Recall, and FIG. 14B is a plot in relation to MRR.

DETAILED DESCRIPTION

Figure 1A:
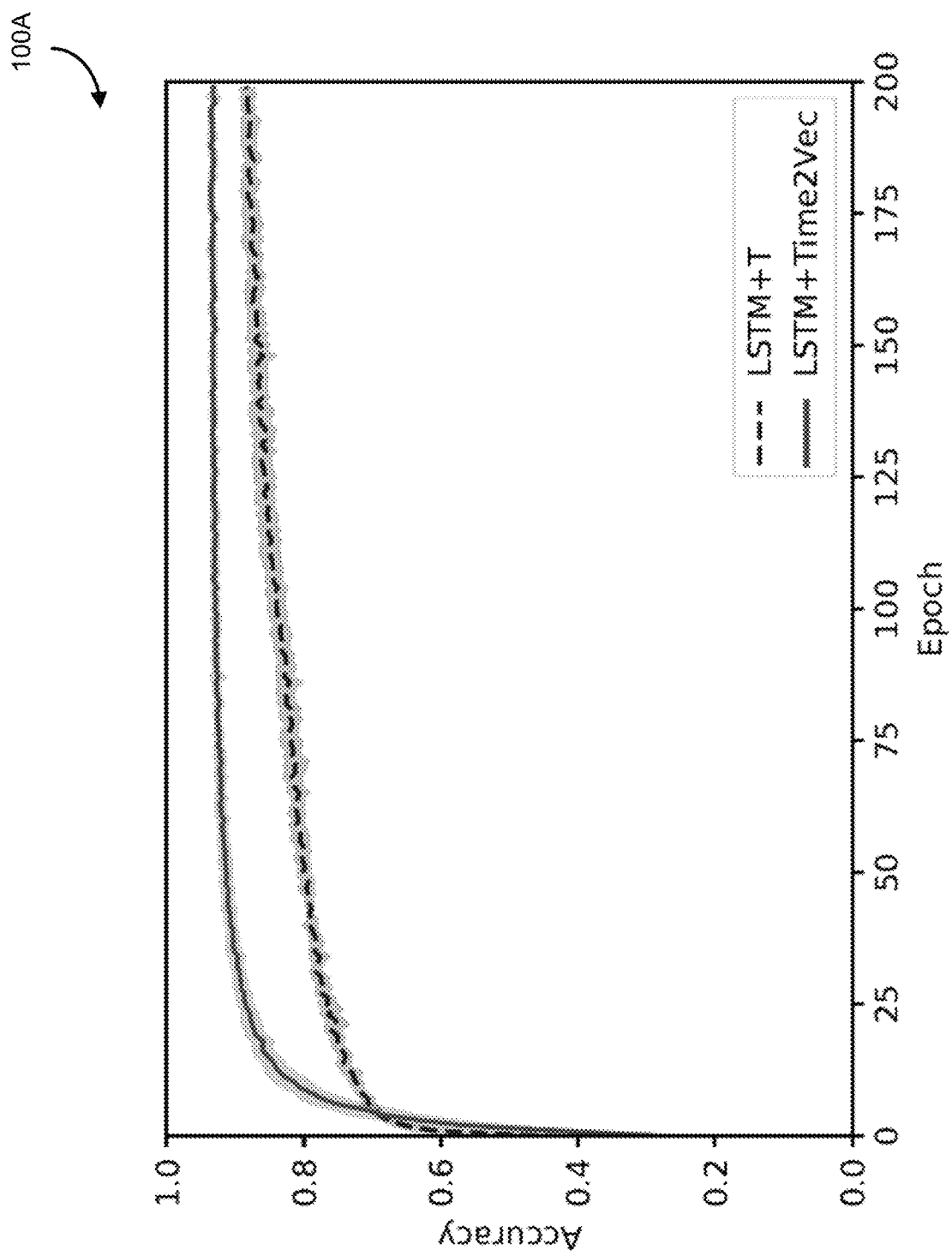
FIG. 1A-1E include charts comparing LSTM+T and LSTM+ Time2Vec on several datasets, according to some embodiments.

Methods, systems, devices, and corresponding computer readable media for using a vector representation of time containing a periodic (e.g., sine) function with frequency and phase-shift learnable parameters which enable the capture of periodic behaviour are provided. The vector decomposes time into output dimensions, including at least a plurality of periodic components (e.g., periodic functions). In an embodiment, a periodic component is a harmonic sum with at least one learnable frequency, which can be used to model the periodic behaviour of a feature. In some embodiments, time is modelled as continuous time. In other embodiments, time is modelled as discrete time.

In some embodiments, a linear term which can model non-periodic components and aids with extrapolation and is included; and where each component of the attribute vector will latch on to different relevant signals with different underlying frequencies such that each component can be viewed as representing distinct temporal attributes (having both a periodic and non-periodic part).

The vector representation can also be used to modify time inputs in various neural network architectures.

Variations are possible, for example, different periodic functions may be utilized (e.g., instead of a sine wave/cosine wave, a sawtooth or a series of Heaviside functions can be utilized). Similarly, in some embodiments, there may be no linear term, or the linear term is replaced with one or more non-linear terms.

The embodiments described herein are directed to improvements for time representation as a separate type of data structure which can be used to expand the feature set encoded for inputs (or other types of processing) in relation to machine learning, which can include, but is not limited to, neural networks, hidden Markov models, etc.

The input for problems involving time can be usually considered as a sequence where, rather than being identically and independently distributed (iid), there exists a dependence across time (and/or space) among the data points.

The sequence can be either synchronous, i.e., sampled at an equal rate, or asynchronous, i.e., sampled at different points in time.

Within the field of deep learning, Recurrent Neural Networks (RNN) have become a useful model in processing sequential data. A principle of the RNN is that its input is a function of the current data point as well as the history of the previous inputs.

The original RNN model suffered from the problem of exploding and vanishing gradients during its back-propagation learning. The introduction of gating units partially mitigated the issue [Sepp Hochreiter and Jürgen Schmidhuber. Long short-term memory. *Neural computation,* 9(8): 1735-1780, 1997; Kyunghyun Cho, Bart Van Merriënboer, Caglar Gulcehre, Dzmitry Bahdanau, Fethi Bougares, Holger Schwenk, and Yoshua Bengio. Learning phrase representations using rnn encoder-decoder for statistical machine translation. *arXiv preprint arXiv:*1406.1078, 2014]. For example the Long Short-Term Memory (LSTM) network developed by Hochreiter and Schmidhuber [Sepp Hochreiter and Jürgen Schmidhuber. Long short-term memory. *Neural computation,* 9(8):1735-1780, 1997] introduced input, forget, and output gates and an internal cell state for improving gradient flow.

When time is a relevant feature, one possible approach for dealing with time is to feed the time (or some engineered features of time such as day of the week, is black Friday, etc.) as yet another input feature to an RNN. Observing that standard RNNs often fail at effectively consuming time as a feature, the focus of the recent studies has been mainly on proposing new architectures that better handle time.

Instead of designing new architectures that better handle time, in some embodiments, the vector, called Time2Vec, is a representation for time that is agnostic to the architecture, i.e., it can be possibly used in any of the existing or future architectures. In some embodiments, on a range of architectures and problems that consume time, using Time2Vec instead of the time itself can potentially give a boost in performance.

There is are algorithms for predictive modeling in time series analysis. They include auto-regressive techniques that predict future measurements in a sequence based on a window of past measurements. Since it is not always clear how long the window of past measurements should be, hidden Markov models, dynamic Bayesian networks, and dynamic conditional random fields use hidden states as a finite memory that can remember information arbitrarily far in the past. These models can be seen as special cases of recurrent neural networks.

They typically assume that inputs are synchronous, i.e. arrive at regular time intervals, and that the underlying process is stationary with respect to time. It is possible to aggregate asynchronous events into time-bins and to use synchronous models over the bins. Asynchronous events can also be directly modeled with point processes (e.g., Poisson, Cox, and Hawkes point processes), and continuous time normalizing flows. Alternatively, one can also interpolate or make predictions at arbitrary time stamps with Gaussian processes or support vector regression.

The results obtained from experiments on several (synthesized and real-world) datasets validate the effectiveness of the Time2Vec representation.

The goal is not to propose a new model for time series analysis, but instead to propose a representation of time in the form of a vector embedding that can be used by many models. Vector embedding has been previously successfully used for other domains such as text, (knowledge) graphs, and positions.

The approach described herein is related to time decomposition techniques that encode a temporal signal into a set of frequencies. However, instead of using a fixed set of frequencies as in Fourier transforms, the approach allows the frequencies to be learned.

Instead of decomposing a 1D signal of time into its components, the approach transforms the time itself and feeds its transformation into the model that is to consume the time information. The approach corresponds to the technique of when applied to regression tasks in 1D signals, but it is more widely useful since the approach includes learning a representation that can be shared across many signals and can be fed to many models for tasks beyond regression.

Also as a proof of concept, the notion of time in the architectures developed by Zhu et al. [Yu Zhu, Hao Li, Yikang Liao, Beidou Wang, Ziyu Guan, Haifeng Liu, and Deng Cai. What to do next: Modeling user behaviors by time-lstm. In *Proceedings of the Twenty-Sixth International Joint Conference on Artificial Intelligence, IJCAI*-17, pages 3602-3608, 2017] was replaced with Time2Vec, which extension improved the performance of their architectures.

Notation

Lower-case letters are used to denote scalars, bold lower-case letters to denote vectors, and bold upper-case letters to denote matrices. For a vector r, the $i^{th}$ element of the vector is represented as r[i]. For two vectors r and $s$, [r;s] is used to represent the concatenation of two vectors. $\odot$ is used to represent element-wise (Hadamard) multiplication. $\tau$ is used to represent a scalar notion of time (e.g., absolute time, time from start, time from last event, etc.) and $\boldsymbol{\tau}$ to represent a vector of time features.

Long Short Term Memory

The original long short term memory (LSTM) [Sepp Hochreiter and Jürgen Schmidhuber. Long short-term memory. *Neural computation*, 9(8):1735-1780, 1997] model can be neatly defined with the following update equations:

$$i_j = \sigma(W_i x_j + U_i h_{j-1} + b_i) \quad (1)$$

$$f_j = \sigma(W_f x_j + U_f h_{j-1} + b_f) \quad (2)$$

$$\bar{c}_j = \text{Tan } h(W_c x_j + U_c h_{j-1} + b_c) \quad (3)$$

$$c_j = f_t \odot c_{j-1} + i_j \odot \bar{c}_j \quad (4)$$

$$o_j = \sigma(W_o x_j + U_o h_{j-1} + b_o) \quad (5)$$

$$h_j = o_j \odot \text{Tan } h(c_j) \quad (6)$$

Here $i_t$, $f_t$, and $o_t$ represent the input, forget and output gate respectively, while $c_t$ is the memory cell. $\sigma$ and Tan h represent the Sigmoid and hyperbolic tangent activation functions respectively. $x_j$ are referred to as the $j^{th}$ event.

Peepholes:

Gers and Schmidhuber [Felix A Gers and Jürgen Schmidhuber. Recurrent nets that time and count. In *Proceedings of the IEEE-INNS-ENNS International Joint Conference on Neural Networks. IJCNN 2000. Neural Computing: New Challenges and Perspectives for the New Millennium*, volume 3, pages 189-194. IEEE, 2000] introduced a variant of the LSTM architecture where the input, forget, and output gates peek into the memory cell.

In this variant, $w_{pi} \odot c_{j-1}$, $w_{pf} \odot c_{j-1}$, and $w_{po} \odot c_j$ are added to the linear parts of equations 1, 2, and 5, respectively.

LSTM+T

When time is a relevant feature, one method to handle time is to consider it as just another feature, or extract some engineered features from it, concatenate the time features with the input, and use the standard LSTM model. This model is referred to herein as LSTM+T. Let $\tau_j$ represent the time features for the $j^{th}$ event of the LSTM and let $x'_j = [x_j; \tau_j]$. Then LSTM+T uses the exact same equations as the standard LSTM (denoted above) except that $x_j$ is replaced with $x'_j$.

Time-LSTM

To leverage time information, Zhu et al. [Yu Zhu, Hao Li, Yikang Liao, Beidou Wang, Ziyu Guan, Haifeng Liu, and Deng Cai. What to do next: Modeling user behaviors by time-lstm. In *Proceedings of the Twenty-Sixth International Joint Conference on Artificial Intelligence, IJCAI*-17, pages 3602-3608, 2017] modified the architecture of the LSTM with peepholes by adding time gates and proposed three architectures.

Here, the first and third architectures are discussed, hereafter called TLSTM1 and TLSTM3 respectively, since the second architecture is quite similar to the third architecture. For clarity of writing, the peephole terms are not included in the equations but they are used in the experiments.

In TLSTM1, a new time gate is introduced as follows:

$$t_j = \sigma(W_t x_j + \sigma(u_t \tau_j) + b_t) \quad (7)$$

Then equations 4 and 5 are updated as follows:

$$c_j = f_j \odot c_{j-1} + i_j \odot t_j \odot \overline{c_j} \tag{8}$$

$$o_j = \sigma(W_o x_j + v_t \tau_j + U_o h_{j-1} + b_o) \tag{9}$$

$t_j$ controls the influence of the current input on the prediction and makes the required information from timing history get stored on the cell state. TLSTM3 uses two time gates:

$$t1_j = \sigma(W_{t1} x_j + \sigma(u_{t1} \tau_j) + b_{t1}) \tag{10}$$

$$t2_j = (W_{t2} x_j + \sigma(u_{t2} \tau_j) + b_{t2}) \tag{11}$$

where the elements of $W_{t1}$ are constrained to be negative. t1 is used for controlling the influence of the last consumed item and the t2 stores the TS that allows to model long range dependencies.

TLSTM3 couples the input and forget gates following Greff et al. [9] along with the t1 and t2 gates. Equations 4 to 6 are changed to the following:

$$\tilde{c}_j = (1 - i_j \odot t1_j) \odot c_{j-1} + i_j \odot t1_j \odot \overline{c_j}) \tag{12}$$

$$c_j = (1 - i_j) \odot c_{j-1} + i_j \odot t2_j \odot \overline{c_j} \tag{13}$$

$$o_j = \sigma(W_o x_j + v_t \tau_j + U_o h_{j-1} + b_o) \tag{14}$$

$$h_j = o_j \odot \tan h(\tilde{c}_j) \tag{15}$$

Zhu et al. [Yu Zhu, Hao Li, Yikang Liao, Beidou Wang, Ziyu Guan, Haifeng Liu, and Deng Cai. What to do next: Modeling user behaviors by time-lstm. In *Proceedings of the Twenty-Sixth International Joint Conference on Artificial Intelligence, IJCAI-17*, pages 3602-3608, 2017] use $\tau_j = \Delta t_j$ in their experiments, where $\Delta t_j$ is the duration between the current and the last event.

Time2Vec

Since time can be measured in different scales (e.g., days, hours, etc.), another important property of a representation for time is invariance to time rescaling. A class of models is invariant to time rescaling if for any model $M_1$ in the class and any scalar $\alpha > 0$, there exists a model $M_2$ in the class that behaves on $\alpha \cdot \tau$ ($\tau$ scaled by $\alpha$) in the same way $M_1$ behaves on original $\tau$s.

An approach to deal with time in different applications is to apply some hand-crafted function(s) $f_1, \ldots, f_m$ to $\tau$ ($\tau$ can be absolute time, time from last event, etc.), concatenate the outputs $f_1(\tau), \ldots, f_m(\tau)$ with the rest of the input features x, and feed the resulting vector [x; $f_1(\tau); \ldots; f_m(\tau)$] to a sequence model.

This approach requires hand-crafting useful functions of time which may be difficult (or impossible) in several applications, and the hand-crafted functions may not be optimal for the task at hand.

Instead of hand-crafting functions of time, the approach described herein devises an improved data structure representation of time which can be used to approximate any function through learnable parameters.

While there are some expanded storage/processing costs associated with this expansion of time in a modified data structure representation, such a representation offers two technical advantages: 1—it obviates the need for hand-crafting functions of time and 2—it provides the grounds for learning suitable functions of time based on the data.

As vector representations can be efficiently integrated with the current deep learning architectures, the approach described herein employs a vector representation for time. This vector representation is adapted to improve technical modelling of periodic aspects in machine learning training data sets, which can improve (e.g., reduce) the amount of time needed for training, which could also help ultimately reduce a total number of processing cycles. Improved training speed is especially useful where the machine learning model is operating under constrained computing resources or time (e.g., real-time/near-real time prediction generation, mobile/portable device computing with limited parallel processing resources).

The proposed representation, in some embodiments, leverages the periodic series (e.g., Fourier sine series) according to which any 1D function can be approximated in a given interval using a weighted sum of periodic functions (e.g., sinusoids) with appropriate frequencies (and phase-shifts).

In an embodiment, there are k sinusoids of the form $\sin(\omega_i \tau + \varphi_i)$ in the vector representation where $\omega_i$ and $\varphi_i$ are learnable parameters. That is, the approach concatenates the input features x with k sinusoids and feed the concatenation [x; $\sin(\omega_1 \tau + \varphi_1); \ldots; \sin(\omega_k \tau + \varphi_k)$] into a sequence model. K can be treated as a hyperparameter.

In some embodiments, the function can model a real Fourier signal when the frequencies of the sine functions are integer multiples of a base frequency (e.g., a first harmonic). In other embodiments, the frequencies are not set, and rather, the frequencies are rather learned over training epochs. In experimentation, it is shown that learning the frequencies results in better generalization.

Different functions of time can be created using these sinusoids by taking a weighted sum of them with different weights. The weights of the sequence model are allowed to combine the sinusoids and create functions of time suitable for the task.

If one expands the output of the first layer of a sequence model (before applying an activation function), it has the form: $a(\tau, k)[j] = \gamma_j + \Sigma_{i=1}^k + \theta_{j,i} \sin(\omega_i \tau + \varphi_i)$, where $\theta_{j,i}$s are the first layer weights and $\gamma_j$ is the part of output which depends on the input features x (not on the temporal features).

Each $a(\tau, k)[j]$ operates on the input features x as well as a learned function $f_j(\tau) = \theta_{j,i} \sin(\omega_i \tau + \varphi_i)$ of time, as opposed to a hand-crafted function. Following, to facilitate approximating functions with non-periodic patterns and help with generalization, Applicants also include a linear projection of time in the vector representation.

A non-limiting example is provided: For a given notion of time $\tau$, Time2Vec of $\tau$, denoted as $t2v(\tau)$, is a vector of size k+1 defined as follows:

$$t2v(\tau)[i] = \begin{cases} \sin(\omega_i \tau + \varphi_i), & \text{if } 1 \leq i \leq k. \\ \omega_i \tau + \varphi_i, & \text{if } i = k+1. \end{cases} \tag{16}$$

where $t2v(\tau)[i]$ is the $i^{th}$ element of $t2v(\tau)$, $\omega_i$s and $\varphi_i$s are learnable parameters. For $1 \leq i \leq k$, $\omega_i$ and $\varphi_i$ are the frequency and the phase-shift of the sine function. The period of i.e., $$\sin(\omega_i \tau + \varphi_i) \text{ is } \frac{2\pi}{\omega_i},$$

it has the same value for $\tau$ and $$\tau + \frac{2\pi}{\omega_i}.$$

Time2Vec can be viewed as the neural network layer of FIG. 1A where time is fed into $k$ neurons with sine activation and one neuron with linear activation. The $w_i$s and $b_i$s in FIG. 1A correspond to the $w_i$s and the $\varphi_i$s. An example method is shown in FIG. 1A for decomposition and feature encoding.

Other variations are possible. An alternate form of relation 16 is shown:

$$t2v(\tau)[i] = \begin{cases} \omega_i \tau + \varphi_i, & \text{if } i = 0. \\ \mathcal{F}(\omega_i \tau + \varphi_i), & \text{if } 1 \le i \le k. \end{cases} \quad (16)$$

where t2v($\tau$)[i] is the $i^{th}$ element of t2v($\tau$), $\omega_i$s and $\varphi_i$s are learnable parameters. In this example, F is a periodic activation function. Given the prevalence of vector representations for different tasks, a vector representation for time makes it easily consumable by different architectures. Applicants chose $\mathcal{F}$ to be the sine function in the experiments but Applicants conduct experiments with other periodic activations as well. When $\mathcal{F}$ =sin, for $1 \le i \le k$, $\omega_i$ and $\varphi_i$ are the frequency and the phase-shift of the sine function.

The use of sine functions is inspired in part by positional encoding.

Consider a sequence of items (e.g., a sequence of words) $\{I_1, I_2, \ldots, I_N\}$ and a vector representation $v_I \in \mathbb{R}^d$ for the $j^{th}$ item $I_j$ in the sequence. added $\sin(j/10000^{k/d})$ to $v_I[k]$ if k is even and $\sin(j/10000^{k/d}+\pi/2)$ if k is odd so that the resulting vector includes information about the position of the item in the sequence.

These sine functions are called the positional encoding. Intuitively, positions can be considered as the times and the items can be considered as the events happening at that time. Thus, Time2Vec, in some embodiments, can be considered as representing continuous time, instead of discrete positions, using sine functions. The sine functions in Time2Vec also enable capturing periodic behaviors which is not a goal in positional encoding.

Time2Vec can be fed as an input to the model (or to some gate in the model) instead of adding it to other vector representations. Unlike positional encoding, Applicants show in experiments that learning the frequencies and phase-shifts of the functions in Time2Vec result in better performance compared to fixing them. In another embodiment, Time2Vec is used when initially establishing the model (e.g., as opposed to retrofitting another model).

In Time2Vec, time is decomposed into one or more periodic function components as well as one or more non-periodic function components. The decomposition establishes an expanded vector, which can be encapsulated into an expanded data structure that expands the set of features associated with a time aspect of a particular input.

Establishing an expanded time vector representation, as noted in various embodiments, allows for improved tracking and convergence based on underlying periodicity of the inputs. While specific periodic functions and non-periodic functions are described below, in some embodiments, variations are contemplated using different types of functions.

The specific number of components as well as the type can be established through modifiable machine learning hyperparameters that may be varied to identify performance improvements, etc.

Consider a sequence of items (e.g., a sequence of words) $\{I_1, I_2, \ldots, I_N\}$ and a vector representation $v_I \in \mathbb{R}^d$ for the $j^{th}$ item $I_j$ in the sequence. Vaswani et al. [Ashish Vaswani, Noam Shazeer, Niki Parmar, Jakob Uszkoreit, Llion Jones, Aidan N Gomez, Łukasz Kaiser, and Illia Polosukhin. Attention is all you need. In *Advances in Neural Information Processing Systems*, pages 5998-6008, 2017] added $\sin(j/10000^{k/d})$ to $v_I[k]$ if $k$ is even and $\sin(j/10000^{k/d}+\pi/2)$ if $k$ is odd and consider the resulting vector representation to include information about the position of the item in the sequence.

These sine functions are called the positional embedding. Intuitively, positions can be considered as the times and the items can be considered as the events happening at that time, so Time2Vec can be considered as representing continuous time, instead of discrete positions, using sine functions. The sine functions in Time2Vec also enable capturing periodic behaviours which is not a goal in positional embedding.

The process provides Time2Vec as an input to the model (or to some gate in the model) instead of adding it other vector representations. Unlike positional embedding, experiments potentially illustrate that learning the frequencies and phase-shifts of sine functions in Time2Vec result in better performance compared to fixing them.

In an embodiment, a signal of time is itself transformed into the model that is to consume the time information. Note that the time itself can be also viewed as a binary signal. Sine waves are shown in various examples, but other types of functions are possible, etc., such as other activation functions.

The sine functions in Time2Vec help capture periodic behaviours, for example seasonal weather patterns or traffic patterns throughout the year, without the need for feature engineering. For instance, a sine function $$\sin(\omega\tau + \varphi) \text{ with } \omega = \frac{2\pi}{7}$$

repeats every seven days (assuming T indicates days) and can be potentially used to model weekly patterns. Furthermore, unlike other basis functions which may show strange behaviours for extrapolation (see e.g., David Poole, David Buchman, Seyed Mehran Kazemi, Kristian Kersting, and Sriraam Natarajan. Population size extrapolation in relational probabilistic modelling).

In designing a representation for time, there are three important properties identified: 1—capturing both periodic and non-periodic patterns, 2—being invariant to time rescaling, and 3—being simple enough so it can be combined with many models.

Periodicity: In many scenarios, some events occur periodically. The amount of sales of a store, for instance, may be higher on weekends or holidays. Weather conditions usually follows a periodic pattern over different seasons. Some other events may be non-periodic but only happen after a point in time and/or become more probable as time proceeds. For instance, some diseases are more likely for older ages. Some notes in a piano piece usually repeat periodically. Some other events may be non-periodic but only happen after a point in time and/or become more probable as time proceeds. Such periodic and non-periodic patterns distinguish time from other features calling for better treatment and a better representation of time. In particular, it is important to use a representation that enables capturing periodic and non-periodic patterns.

The period of $$\sin(\omega_i \tau + \varphi_i) \text{ is } \frac{2\pi}{\omega_i},$$

i.e. it has the same value for $\tau$ and $$\tau + \frac{2\pi}{\omega_i}.$$

Therefore, the sine functions in Time2Vec help capture periodic behaviors without the need for feature engineering. For instance, a sine function $\sin(\omega\tau+\varphi)$ with $$\omega = \frac{2\pi}{7}$$

repeats every 7 days (assuming $\tau$ indicates days) and can be potentially used to model weekly patterns. Furthermore, unlike other basis functions which may show strange behaviors for extrapolation sine functions are expected to work well for extrapolating to future and out of sample data. The linear term represents the progression of time and can be used for capturing non-periodic patterns in the input that depend on time.

Invariance to Time Rescaling:

Since time can be measured in different scales (e.g., days, hours, seconds, etc.), another important property of a representation for time is invariance to time rescaling. A class $\mathcal{C}$ of models is invariant to time rescaling if for any model $\mathcal{M}_1 \in \mathcal{C}$ and any scalar $\alpha > 0$, there exists a model $\mathcal{M}_2 \in \mathcal{C}$ that behaves on $\alpha\tau$ ($\tau$ scaled by $\alpha$) in the same way $\mathcal{M}_1$ behaves on original TS.

Simplicity:

A representation for time should be readily consumable by different models and architectures. A matrix representation, for instance, may be difficult to consume as it cannot be easily appended with the other inputs. By selecting a vector representation for time, Applicants ensure an improved ease of integration with deep learning architectures, in some embodiments.

Viewing the proposed time decomposition from the perspective of harmonic analysis, the output of Time2Vec can be interpreted as representing semi-periodic features which force the underlying recurrent model to learn periodic attributes that are relevant to the task under consideration.

Figure 15:
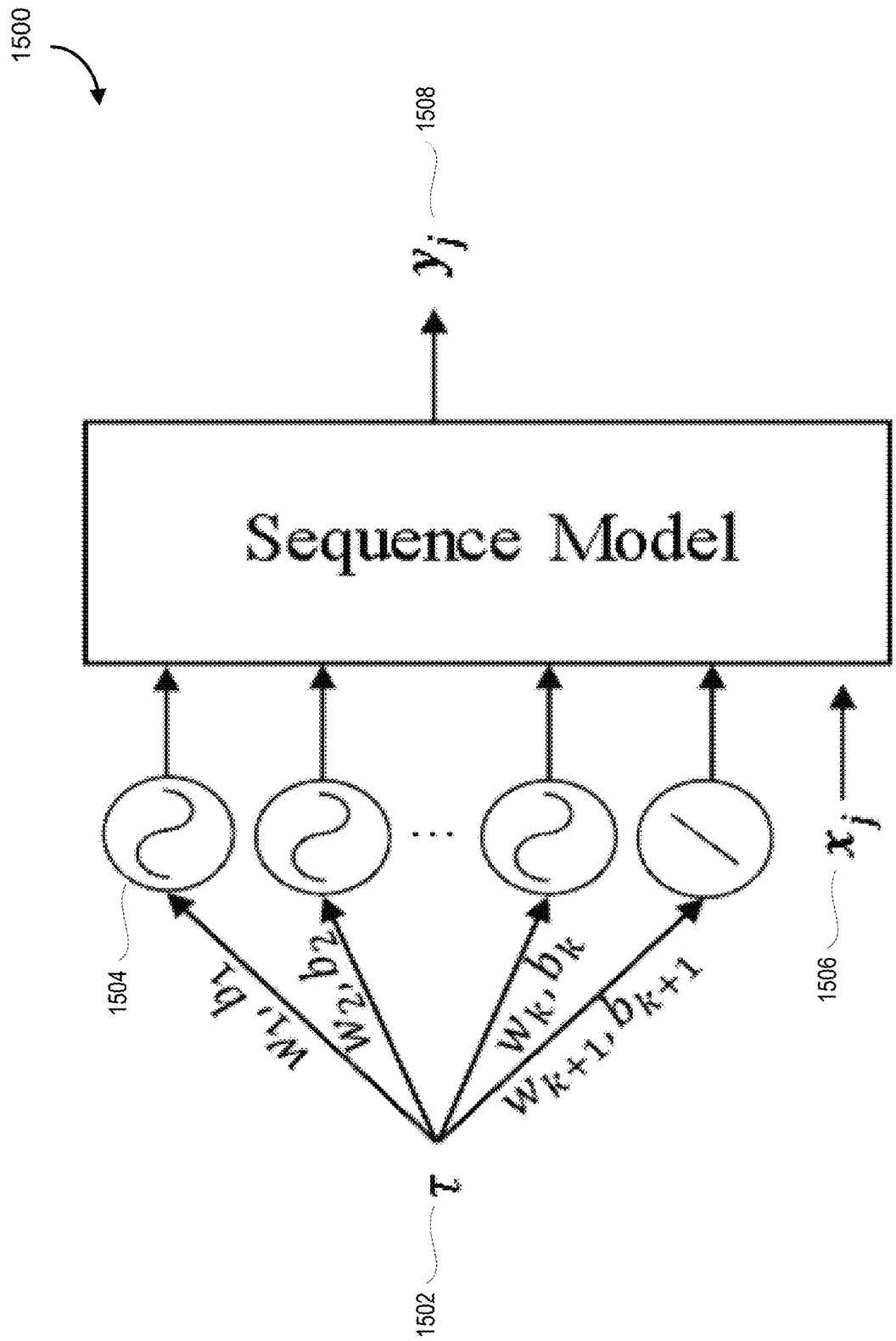
FIG. 15 is an example sequence model showing a pictorial of a decomposition of time for provisioning as a vector representation, according to some embodiments.

This can be shown by expanding the output of the first layer of the sequence model of FIG. 15. In FIG. 15, $\tau$ is shown as 1502, the decomposed periodic components are shown as 1504, and the decomposed non-periodic component is shown at 1506. The encoded features are shown as 1508.

The output of the first layer, after the Time2Vec decomposition and before applying a non-linear activation, has the following form, $$a = \Theta t2v[\tau], \quad (17)$$

where $\Theta$ is the first layer weights matrix having components $[\Theta]_{i,j} = \theta_{i,j}$. It follows directly from the definition given in Equation 16 that the $i^{th}$ component of a equals $$a_i(\tau, k) = \sum_{j=1}^{k} \theta_{i,j}\sin(\omega_j\tau + \varphi_j) + \theta_{i,k+1}(\omega_{k+1}\tau + \varphi_{k+1}), \quad (18)$$

Where $k$ is the number of sine functions used in the Time2Vec transformation. Hence, the first layer has decomposed time $\tau$ into $n$ output dimension of first layer) distinct features as represented by Equation (18).

The first term corresponds to a harmonic sum with learnable frequencies which can be used to model the periodic behaviour of feature $a_i$. The linear term $\theta_{i,k+1}(\omega^{k+1}\tau+\varphi_{k+1})$ can model non-periodic components and helps with extrapolation. Other types of terms are possible, and this linear term is shown as an example of an embodiment. For example, a non-linear term (e.g., where $\log(\tau)$, $\tau^2$, $\tau^3$, etc. are utilized are possible as well.

Each component $a_i$ of the attribute vector will latch on to different relevant signals with different underlying frequencies such that each component $a_i$ can be viewed as representing distinct temporal attributes (having both a periodic and non-periodic part).

Notice that the functional form of Equation (18) can model a real Fourier signal when the frequencies $\omega_i$ of the sine functions are integer multiples of a base (first harmonic) frequency (and $\omega_{k+1}=0$). Experiments have indicated that learning the frequencies potentially results in better generalization.

Figure 16:
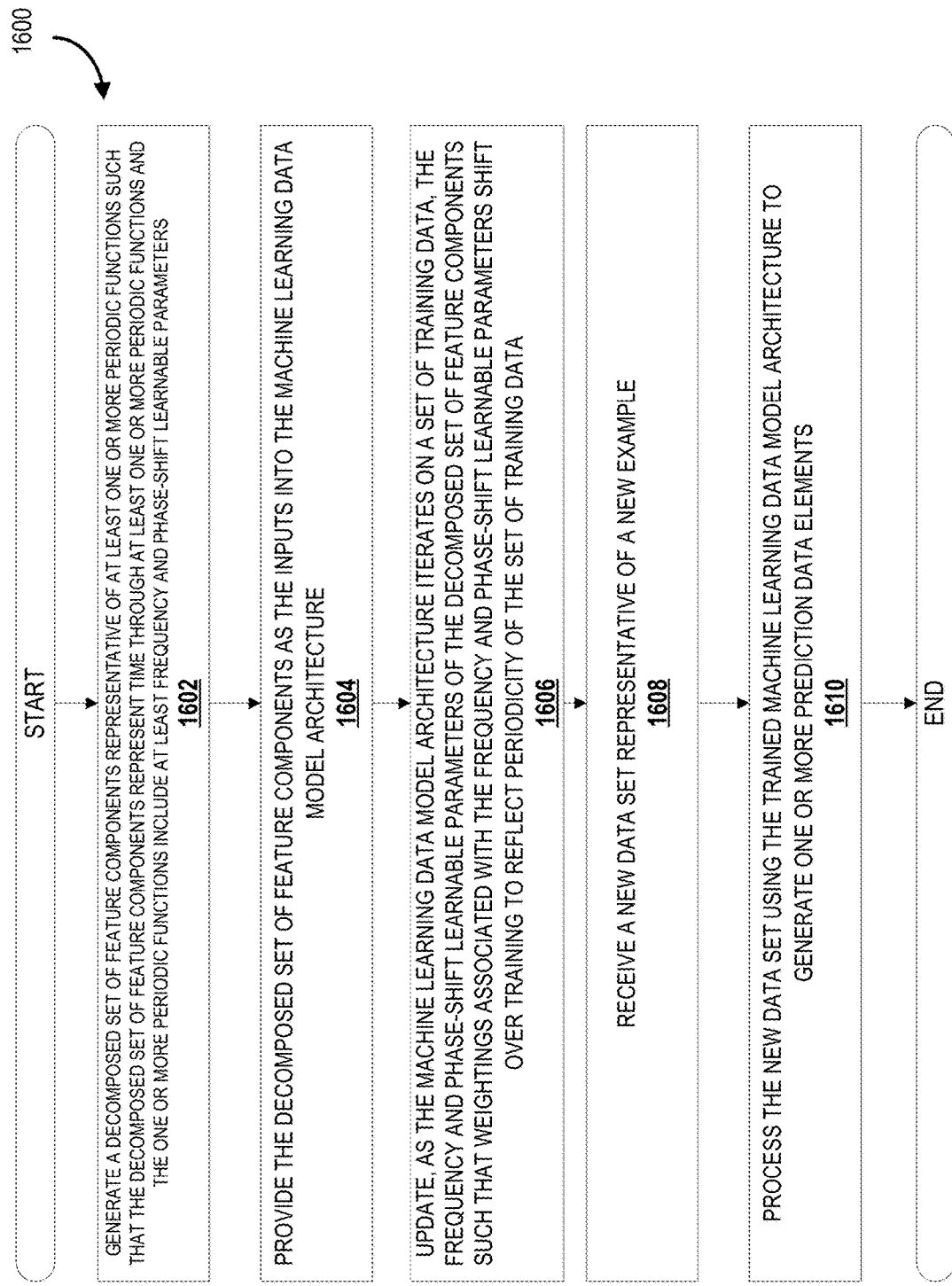
FIG. 16 is a method diagram showing an example method for machine learning using a decomposed representation of time, according to some embodiments.

An example method is shown in FIG. 16. FIG. 16 is a method diagram 1600 showing an example method for machine learning using a decomposed representation of time, according to some embodiments. The steps shown 1602-1610 can be provided in various orders, and there may be different, or alternate steps. The steps are shown as a non-limiting example of a method according to various embodiments. At 1602, the Time2Vec representation is established having learnable parameters as described herein, and at 1604, the representation is provided to a machine learning data architecture. The representation can be used at the input stage or to modify intermediary gates, such as time gates, forget gates, etc. The machine learning data architecture can be a retrofit of an existing machine learning data architecture by swapping out the time representation or a wholly new machine learning data architecture. At 1606, the machine learning data architecture is trained on training data sets having the modified technical representation of time in the form of the data structure as described herein. Allowing a periodic aspect into the learning representation may yield performance improvements in training of the machine learning data architecture, especially where there are latent periodicities encapsulated within the training data.

A trained machine learning data architecture is then ready for deployment at 1608, where it receives a new example to conduct a machine learning task, such as classification, prediction, generation, etc. The machine learning data architecture at 1610 processes the new example using its trained network and generates prediction data elements (e.g., data structures storing data values or fields representing logits, prediction values, prediction classifications, among others). The representation is technically useful in relation to aiding computer-based machine learning reduce a number of training cycles or epochs required to provide a trained machine learning data architecture that is useful in relation to the tasks for deployment. As noted in the experimentation, the representation is especially useful where there is latent periodicity and is an improvement over other approaches as the periodicity does not need to be pre-defined and the mechanism adapts over the training epochs to atomically learn parameters, which over time map weightings to adapt to the periodicity. Accordingly, the level of accuracy for a given number of training epochs can be improved. This can be useful where there is only a limited amount of processing time available or limited computing resources (e.g., slow processor on a mobile device).

Figure 17:
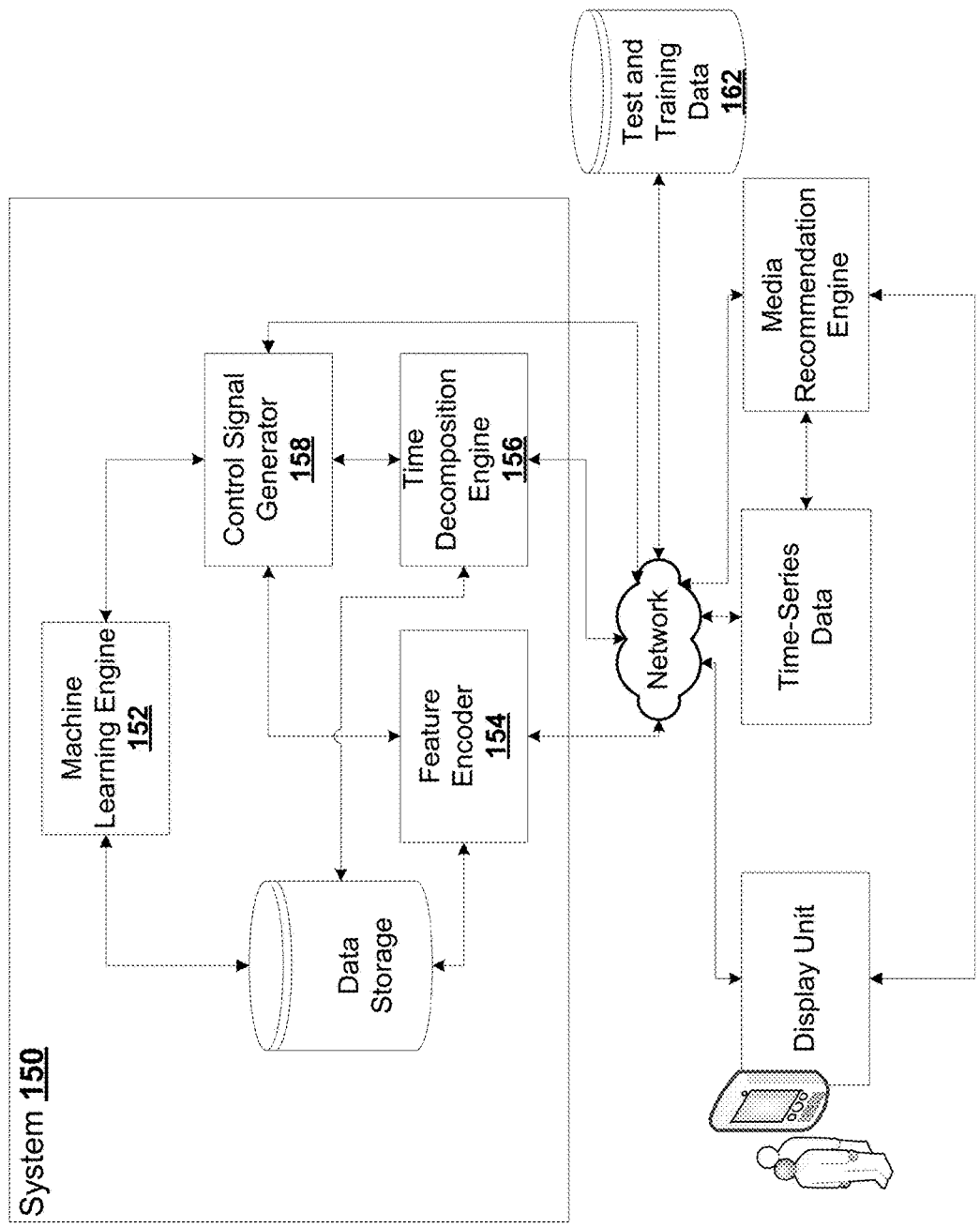
FIG. 17 is an example block schematic diagram, according to some embodiments.

FIG. 17 is an example block schematic diagram, according to some embodiments. Specific technologies such as computer resource usage allocation, as well as health record and supply chain management are shown as non-limiting examples.

In the example schematic, the system is 150 being utilized in relation to internet-connected home media device communication, in particular media use information. Not all embodiments are limited to media-use aspects. In this example, the system 150 is adapted to include a machine learning engine 152 that utilizes time-based inputs as part of a feature set that is input into a machine learning mechanism. In an example, the machine learning engine 152 can track the time of activations of a web-based voice activated assistant device by a user over a period of time, and attempt to pre-allocate/initialize resources predictive of when a user will next use the assistant device.

The machine learning engine 152 can include various types of neural networks, hidden Markov models, among others, and is adapted to re-tune/re-weight various interconnections over time based on a reward/penalty mechanism (e.g., minimizing a loss function).

Time-series data from test and/or training data is decomposed by feature encoder 154 in accordance with various embodiments, for example, through an additional time decomposition engine 156. Time records are decomposed into an expanded feature set including one or more periodic components, and in some embodiments, one or more non-periodic components, such as linear functions and non-linear functions, as described in various embodiments herein.

The expanded feature set is encoded to provide features for the machine learning engine 152, and over a series of training epochs based on test and training data 162, the time-based features, among others, are used for tuning the machine learning model stored on the data storage. In some cases (e.g., where there is some level of periodicity), the weights associated with components of the decomposed time vector converge and certain components therefore become more significant over training.

Accordingly, the system 150, using the time-decomposed data structure representing the feature, may naturally identify one or more periodic components of the underlying data sets and utilize these features to more accurately or more quickly converge on useful machine-learning outputs.

These machine-learning outputs, for example, can include control signals generated by control signal generator 158 to control aspects of a circuit or an electronic device. For example, the control signals may control the allocation or spinning up of various assistant device mechanisms in advance of a predicted voice activation.

Experiments were designed to answer the following questions: Q1: is Time2Vec a good representation for time?, Q2: what do the sine functions learn?, Q3: can Time2Vec be used in other architectures and improve their performance?, Q4: is there anything special about sine functions or can they be replaced with other activation functions? and Q5: Is there value in learning the sine frequencies or can they be fixed to equally-spaced values as in Fourier sine series?

Datasets

Experiments were conducted on the following datasets:
1) Synthesized Data:

This was a toy dataset used for explanatory experiments. The inputs of this dataset are the integers between 1 and 50*365. Input integers that are multiples of 7 belong to class one and the other integers belong to class two. That is:

$$f(t) = \begin{cases} 1, & \text{if } t \mod 7 = 0. \\ 2, & \text{if } t \mod 7 \neq 0. \end{cases} \quad (19)$$

The first 75% is used for training and the last 25% for testing. This dataset is inspired by the periodic patterns (e.g., weekly or monthly) that often exist in daily-collected data; the input integers can be considered as the days.

2) Event-MNIST:

An event-based version of the MNIST dataset was created by flattening the images and recording the position of the pixels whose intensities are larger than a threshold (0.9 in the experiment).

Following this transformation, each image will be represented as an array of increasing numbers such as $[t\_1, t\_2, t\_3, \ldots, t\_m]$. Applicants consider these values as the event times and use them to classify the images. As in other sequence modeling works, the aim in building this dataset is not to beat the state-of-the-art on the MNIST dataset; the aim is to provide a dataset where the only input is time and different representations for time can be compared when extraneous variables (confounders) are eliminated as much as possible.

3) N_TIDIGITS_18:

The dataset includes audio spikes of the TIDIGITS spoken digit dataset [R Gary Leonard and George Doddington. Tidigits. *Linguistic Data Consortium, Philadelphia*, 1993] recorded by the binaural 64-channel silicon cochlea sensor. Each sample is a sequence of (t, c) tuples where t represents time and C denotes the index of active frequency channel at time t.

The labels are sequences of 1 to 7 connected digits with a vocabulary consisting of 11 digits (i.e., "zero" to "nine" plus "oh") and the goal is to classify the spoken digit based on the given sequence of active channels. The reduced version of the dataset was used, where only the single digit samples are used for training and testing.

The reduced dataset has a total of 2,464 training and 2,486 test samples. Following [Jithendar Anumula, Daniel Neil, Tobi Delbruck, and Shih-Chii Liu. Feature representations for neuromorphic audio spike streams. *Frontiers in neuroscience*, 12:23, 2018], the raw event data was converted to event-binned features by virtue of aggregating active channels through a period of time in which a pre-defined number of events occur. The outcome of binning is thus consecutive frames each with multiple but fixed number of active channels.

4) Stack Overflow (SOF):

This dataset contains sequences of badges obtained by stack overflow users and the timestamps at which the badges were obtained. Applicants used the subset released by containing ~6K users, 22 event types (badges), and ~480K events. Given a sequence $[(b_1^u, t_1^u), (b_2^u, t_2^u), \ldots, (b_n^u, t_n^u)]$ for each user u where $b_i^u$ is the badge id and $t_i^u$ is the timestamp when u received this badge id, the task is to predict the badge the user will obtain at time $t_{k+1}^u$.

5) Last.FM: This dataset contains a history of listening habits for Last.FM users. Applicants pre-process the data. The dataset contains ~1K users, 5000 event types (songs), and ~819K events. The prediction problem is similar to the SOF dataset but with dynamic updating.

6) CiteULike: This dataset contains data about what and when a user posted on citeulike website. The original dataset has about 8000 samples. Similar to Last.FM Applicants used the pre-processing used by to select ~1.6K sequences with 5000 event types (papers) and ~36K events. The task for this dataset is similar to that for Last.FM.

Figure 1B:
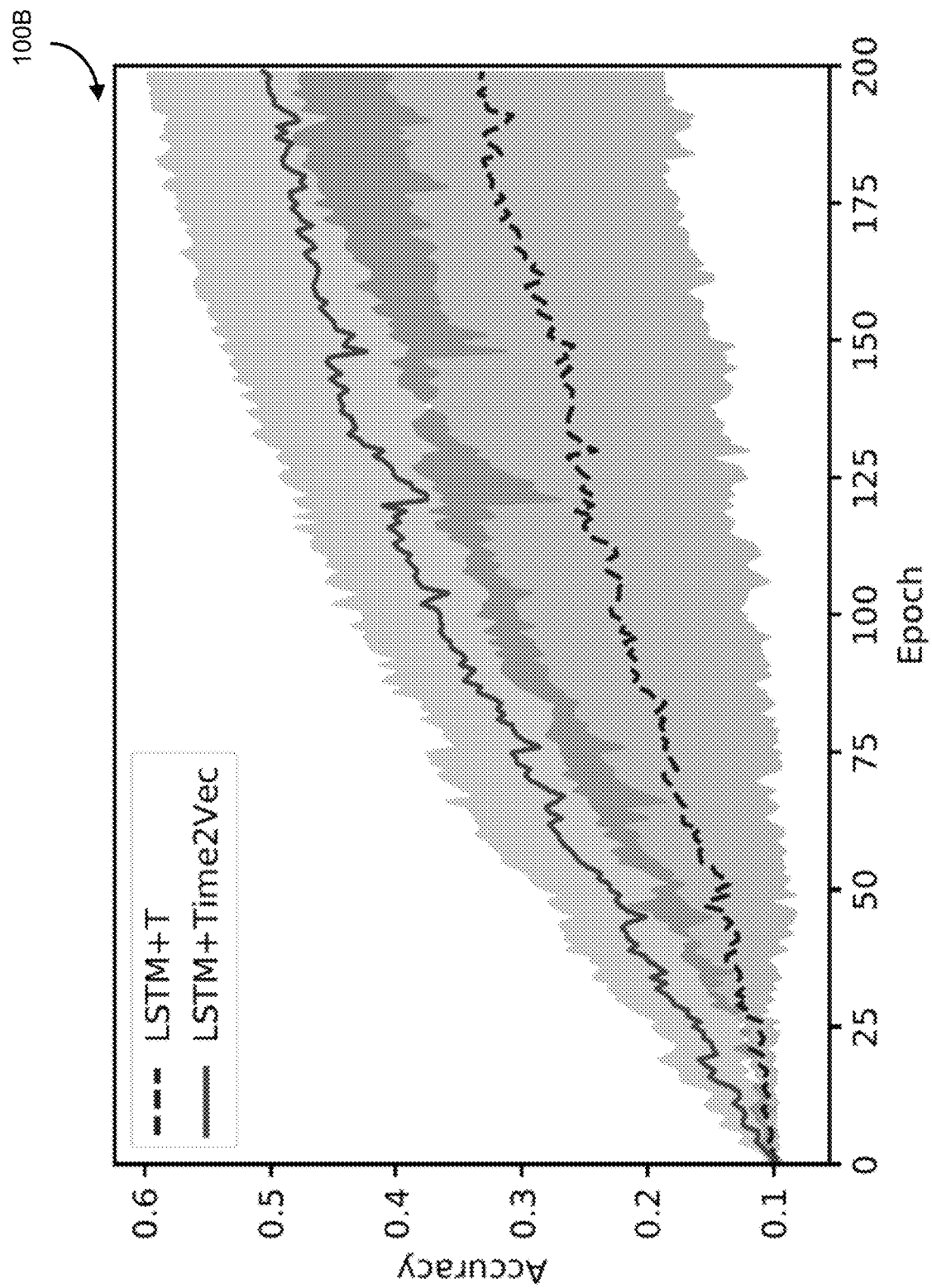
Figure 1C:
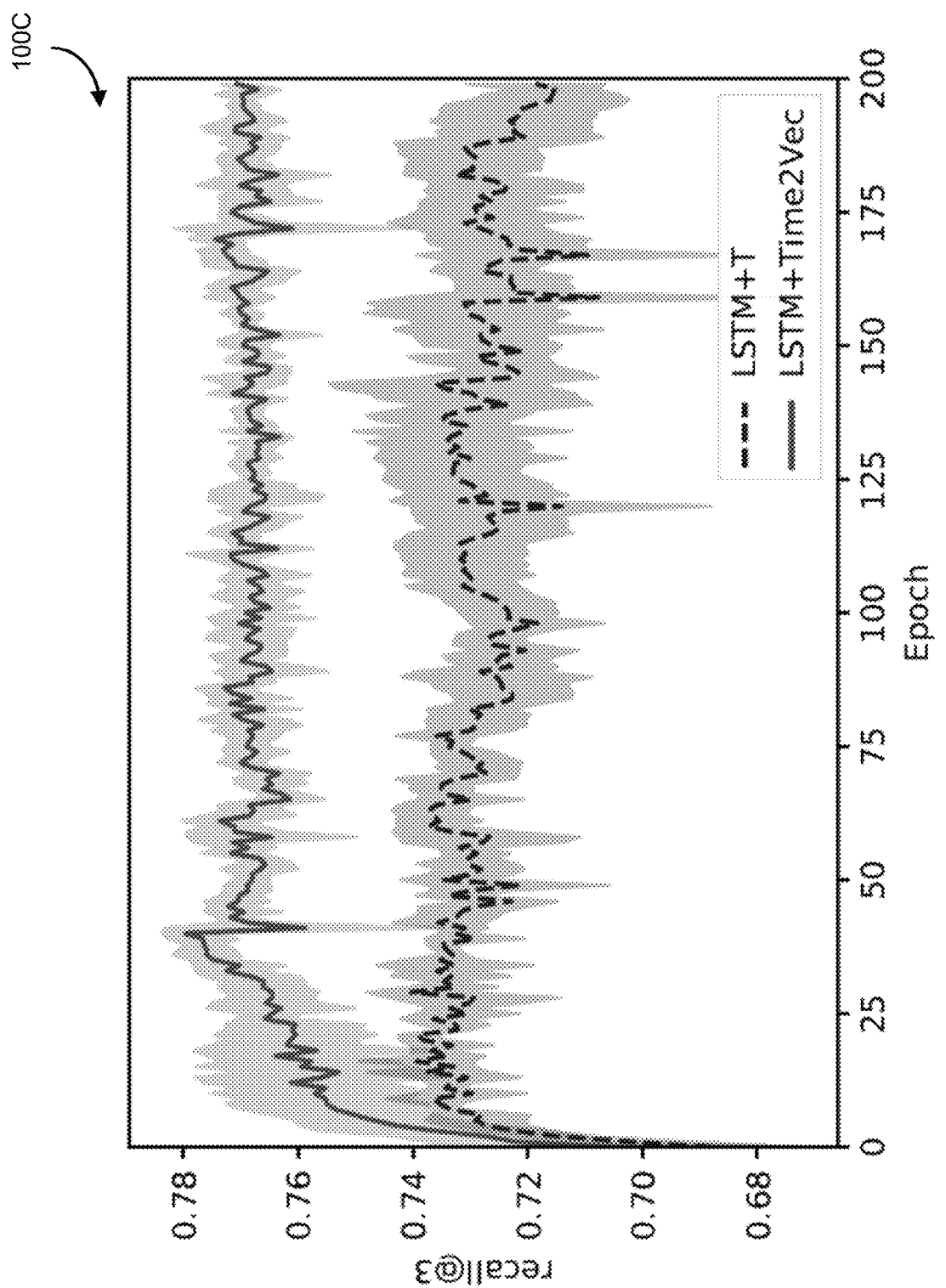
Figure 1D:
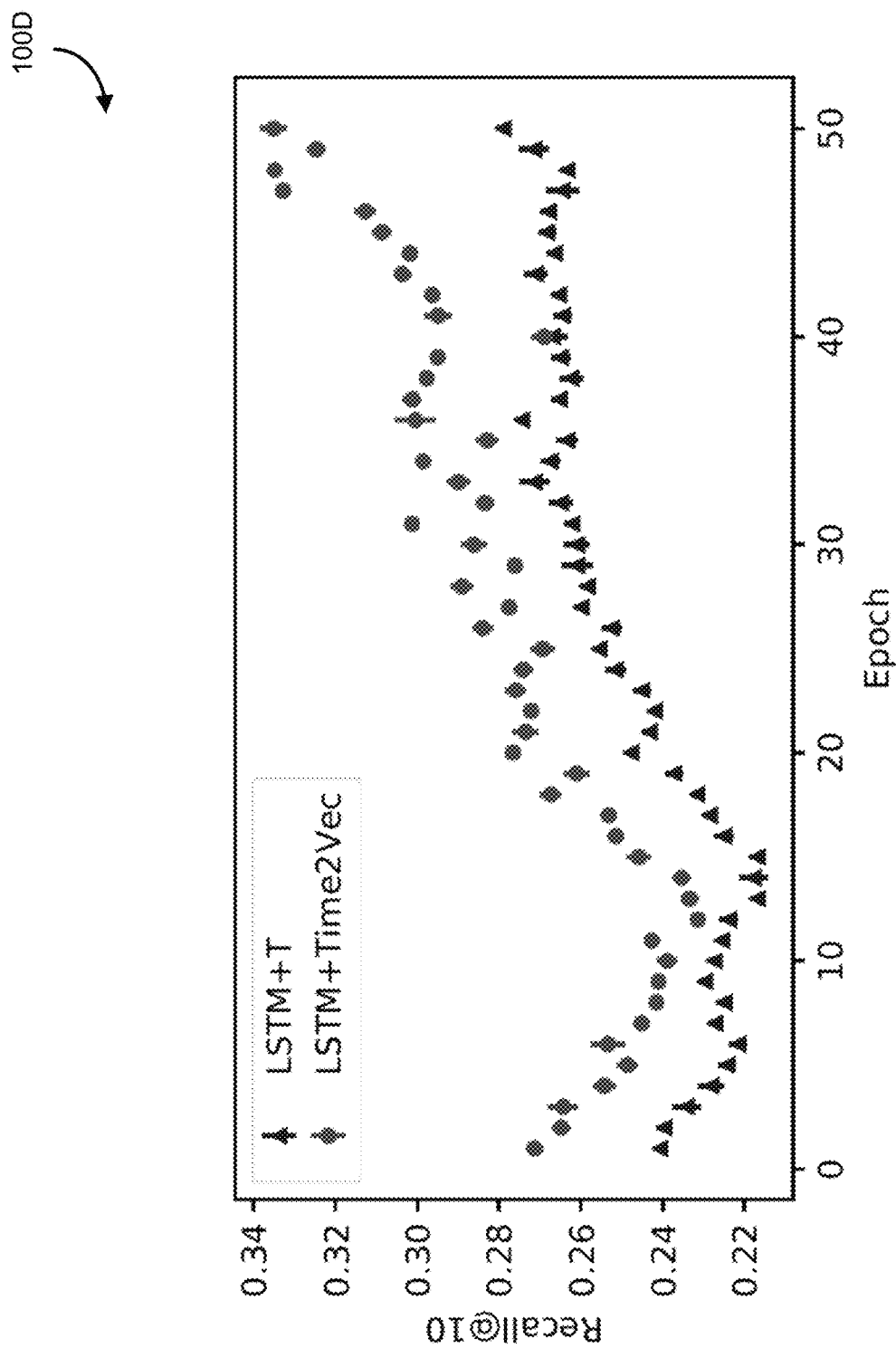
Figure 1E:
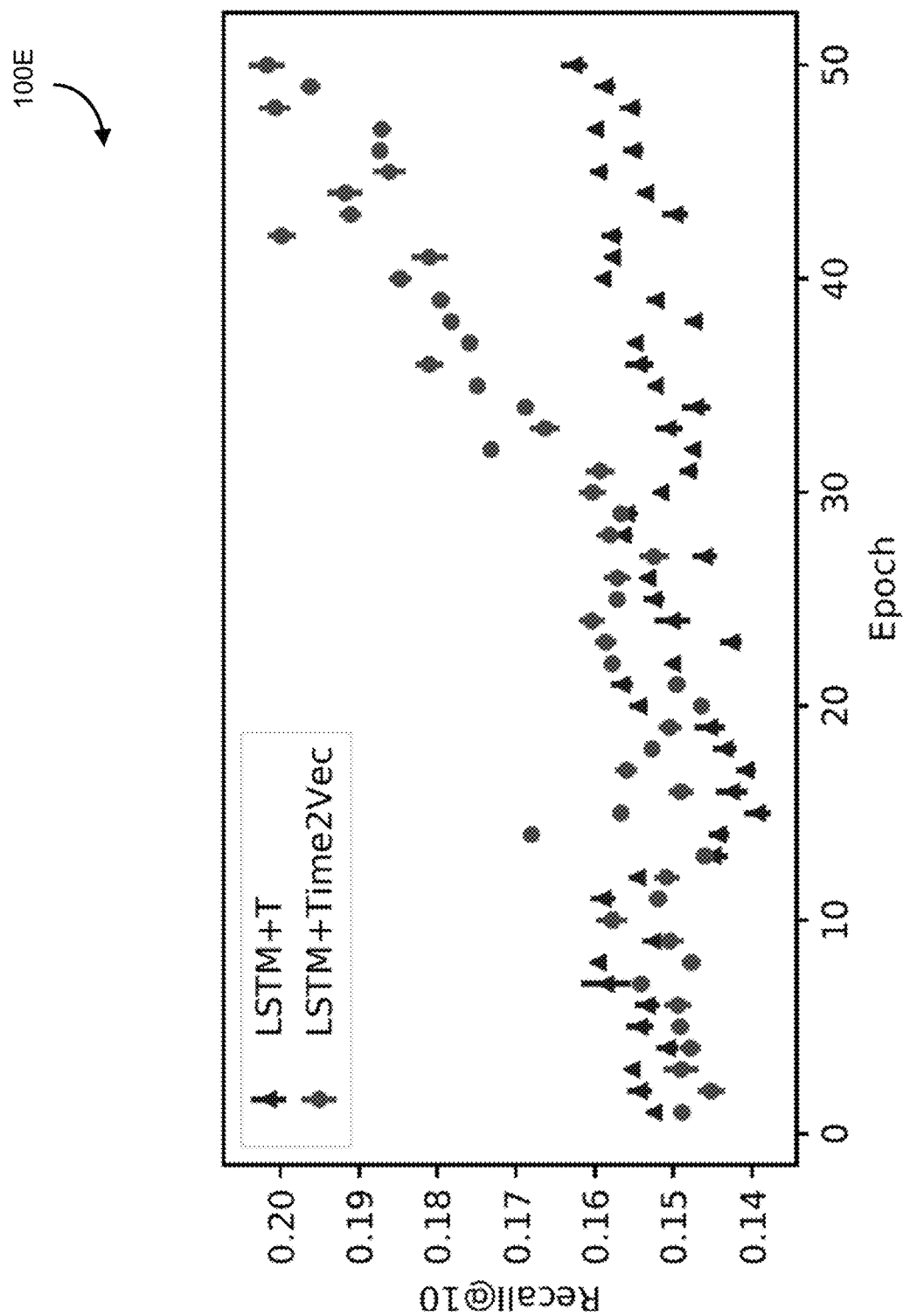

FIG. 1A-1E include charts comparing LSTM+T and LSTM+ Time2Vec on several datasets, according to some embodiments. FIG. 1A is a comparison plot 100A against the Event-MNIST dataset, FIG. 1B is a comparison plot 100B against the TI DIGITS spoken digit dataset (N_TI-DIGITS_18), FIG. 1C is a comparison plot 100C against a dataset based on Stack Overflow, FIG. 1D is a comparison plot 100D against a history of the listening habits for 992 users on the Last.FMsite (Last.FM) dataset. FIG. 1E is a comparison plot 100E against a dataset containing data about what and when a user posed on the citeulike website (CiteULike).

Measures: For classification tasks, Applicants report accuracy corresponding to the percentage of correctly classified examples. For recommendation tasks, Applicants report Recall@q and MRR@q.

To generate a recommendation list, Applicants sample k−1 random items and add the correct item to the sampled list resulting in a list of k items. Then the model ranks these k items.

Looking only at the top ten recommendations, Recall@q corresponds to the percentage of recommendation lists where the correct item is in the top q; MRR@q corresponds to the mean of the inverses of the rankings of the correct items where the inverse rank is considered 0 if the item does not appear in top q recommendations. For Last.FM and CiteULike, Applicants report Recall@10 and MRR@10. For SOF, Applicants report Recall@3 and MRR as there are only 22 event types and Recall@10 and MRR@10 are not informative enough.

Implementation:

For the experiments on Event-MNIST and N_TIDIGITS_18, the model was implemented in PyTorch [Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. 2017].

In both experiments, Adam optimizer was used [Diederik P Kingma and Jimmy Ba. Adam: A method for stochastic optimization. *arXiv preprint arXiv:*1412.6980, 2014] with a learning rate of 0.001 and a hidden size of 128 for the LSTM. For the experiments on Last.FM and CiteULike, the code released by Zhu et al. [Yu Zhu, Hao Li, Yikang Liao, Beidou Wang, Ziyu Guan, Haifeng Liu, and Deng Cai. What to do next: Modeling user behaviors by time-lstm. In *Proceedings of the Twenty-Sixth International Joint Conference on Artificial Intelligence, IJCAI-17*, pages 3602-3608, 2017] was used without any modifications, except replacing $\tau$ with $t2v(\tau)$. For the fairness of the experiments, the competing models for all experiments had an (almost) equal number of parameters.

For instance, since adding Time2Vec as an input to the LSTM increases the number of model parameters compared to just adding time as a feature, the hidden size of the LSTM for this model was reduced to ensure the number of model parameters remained nearly the same.

For all except the synthesized dataset, the event times were shifted such that the first event of each sequence started at time 0. For the experiments involving Time2Vec, unless stated otherwise, vectors with 16, 32 and 64 sine functions (and one linear term) were tried. The vector length offering the best performance was reported.

To verify the effectiveness of the Time2Vec representation, LSTM+t2v was compared with LSTM+T on four datasets.

FIGS. 1A-1E represents the obtained results of comparing LSTM+ Time2Vec with LSTM+T on several datasets with different properties and statistics. On all datasets, replacing time with Time2Vec improves the performance in most cases and never deteriorates it; in many cases, LSTM+ Time2Vec performs consistently better than LSTM+T.

In alternate approaches such as that provided in Anumula, LSTM+T fails on N_TIDIGITS18 as the dataset contains very long sequences. By feeding better features to the LSTM rather than relying on the LSTM to extract them, Time2Vec helps better optimize the LSTM and offers higher accuracy (and lower variance) compared to LSTM+T.

Besides N_TIDIGITS18, SOF also contains somewhat long sequences and long time horizons. The results on these two datasets indicate that Time2Vec can be effective for datasets with long sequences and time horizons.

To verify if Time2Vec can be integrated with other architectures and improve their performance, Applicants integrate it with TLSTM1 and TLSTM3, two recent and powerful models for handling asynchronous events. Applicants replaced their notion $\tau$ of time with $t2v(\tau)$ and replaced the vectors getting multiplied to $\tau$ with matrices accordingly. The updated formulations are presented further in this description.

Figure 2A:
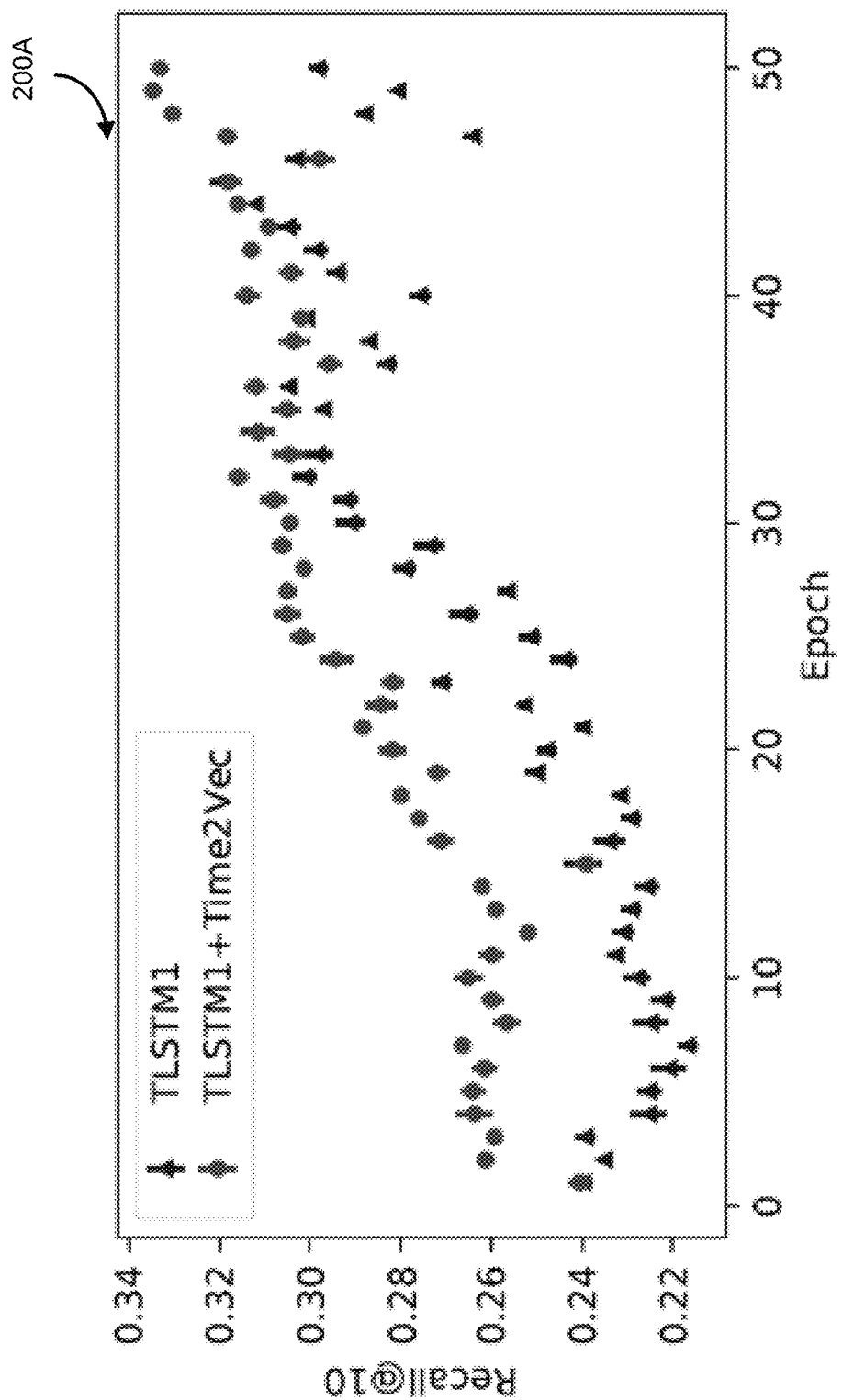
FIG. 2A-2D are charts comparing TLSTM1 and TLSTM3 on Last.FM and CiteULike in terms of Recall@10 with and without Time2Vec, according to some embodiments.
Figure 2B:
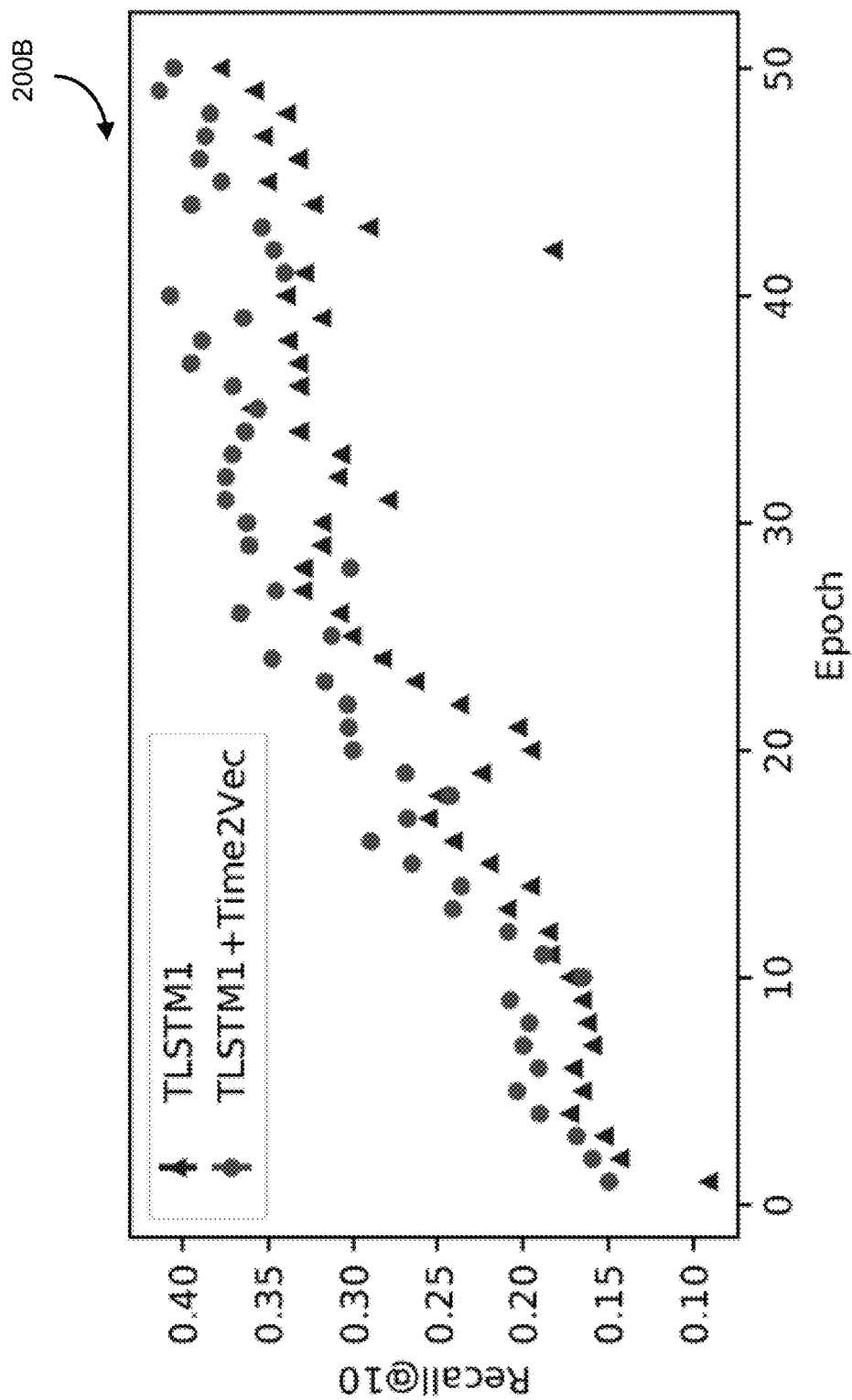
Figure 2C:
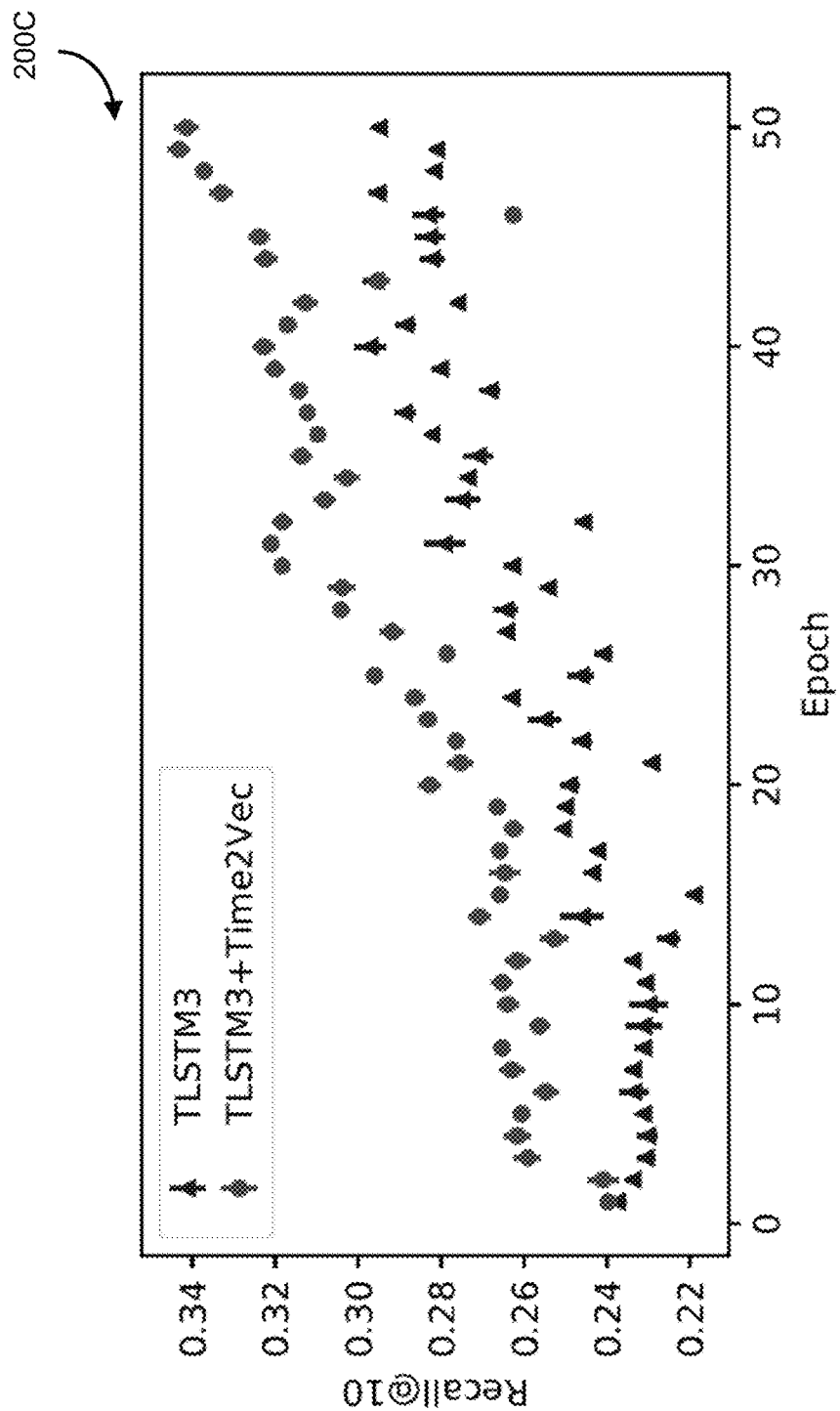
Figure 2D:
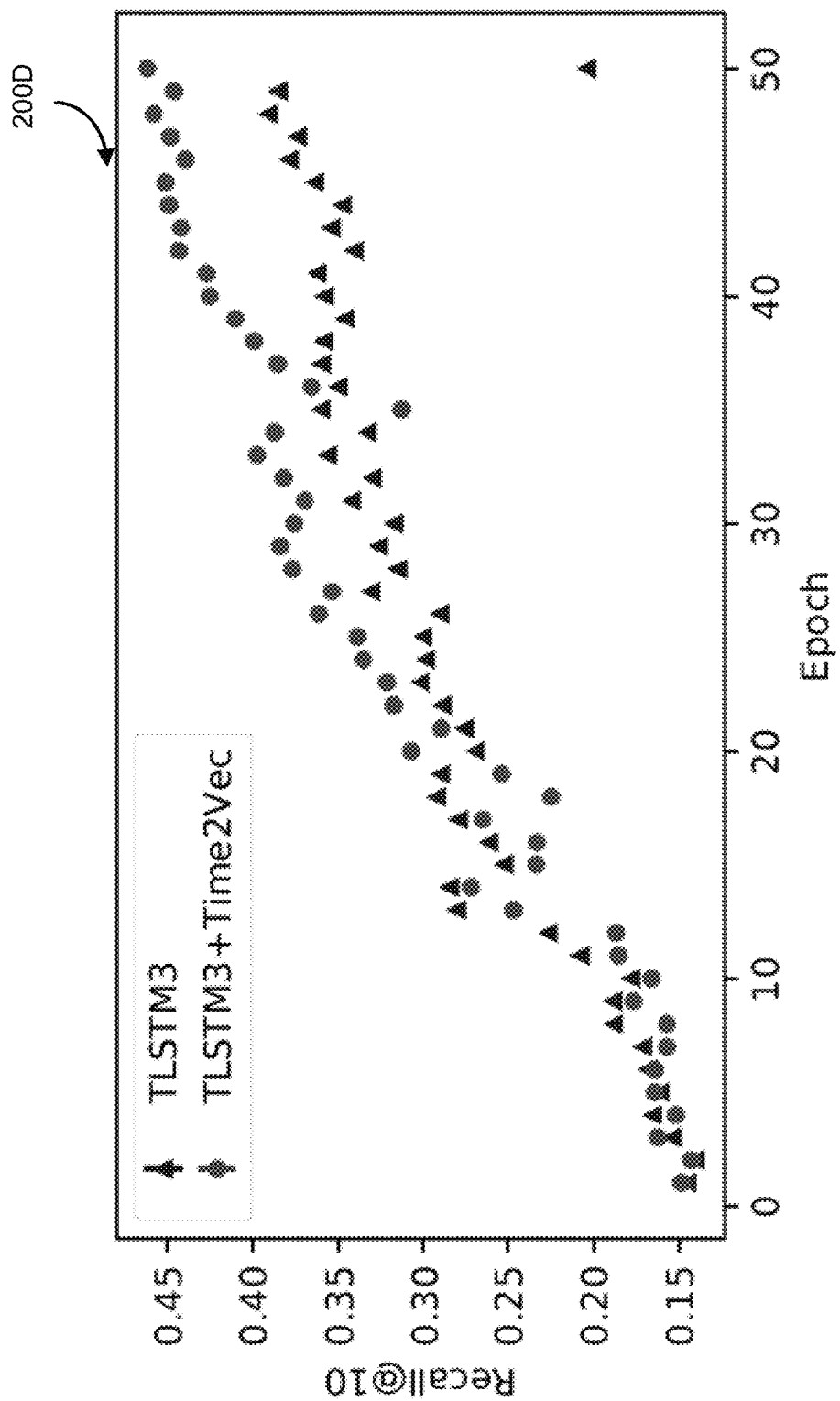

The obtained results in FIG. 2A-D for TLSTM1 and TLSTM3 on Last.FM and CiteULike demonstrates that replacing time with Time2Vec for both TLSTM1 and TLSTM3 improves the performance. FIG. 2A-2D are charts comparing TLSTM1 and TLSTM3 on Last.FM and CiteULike in terms of Recall@10 with and without Time2Vec, according to some embodiments. FIG. 2A is a chart 200A showing TLSTM1 on Last. FM, FIG. 2B is a chart 200B showing TLSTM1 on CiteULike, FIG. 2C is a chart 200C showing TLSTM3 on Last. FM, FIG. 2D is a chart 200D showing TLSTM3 on CiteULike.

Inspired by Fourier sine series and by positional encoding, the approach used sine activations in Eq. (2). To evaluate how sine activations compare to other activation functions for the setting, Applicants repeated the experiment on Event-MNIST when using non-periodic activations such as Sigmoid, Tan h, and rectified linear units (ReLU), and periodic activations such as mod and triangle. Applicants fixed the length of the Time2Vec to 64+1, i.e. 64 units with a non-linear transformation and 1 unit with a linear transformation.

To understand what the sine functions of Time2Vec learn and answer Q2, a model was trained on the synthesized dataset where the input integer (day) was used as the time for the sine functions of Time2Vec (ignoring the linear term) and a fully connected layer was used on top of the Time2Vec to predict the class. That is, the probability of one of the classes is a sigmoid of a weighted sum of the sine functions.

To measure how well Time2Vec performs in capturing periodic behaviours, Applicants trained a model on a synthesized dataset where the input integer (day) is used as the time for Time2Vec and a fully connected layer is used on top of the Time2Vec to predict the class. That is, the probability of one of the classes is a sigmoid of a weighted sum of the Time2Vec elements.

Figure 3A:
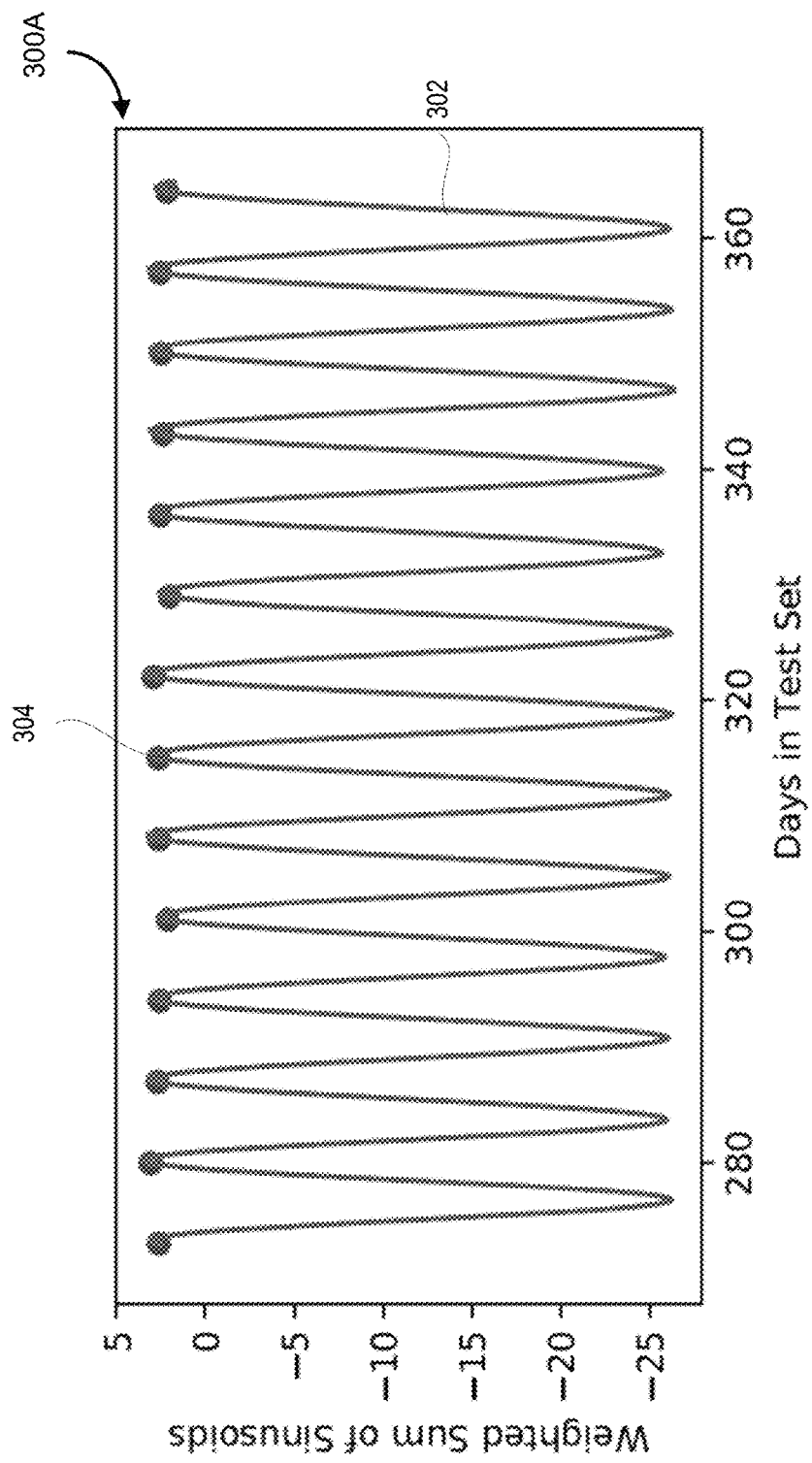
FIG. 3A-3B are charts showing a weighted sum of sinusoids oscillating at different amounts of days, showing the models learned for Applicants' synthesized dataset before the final activation. according to some embodiments. FIG.
Figure 3B:
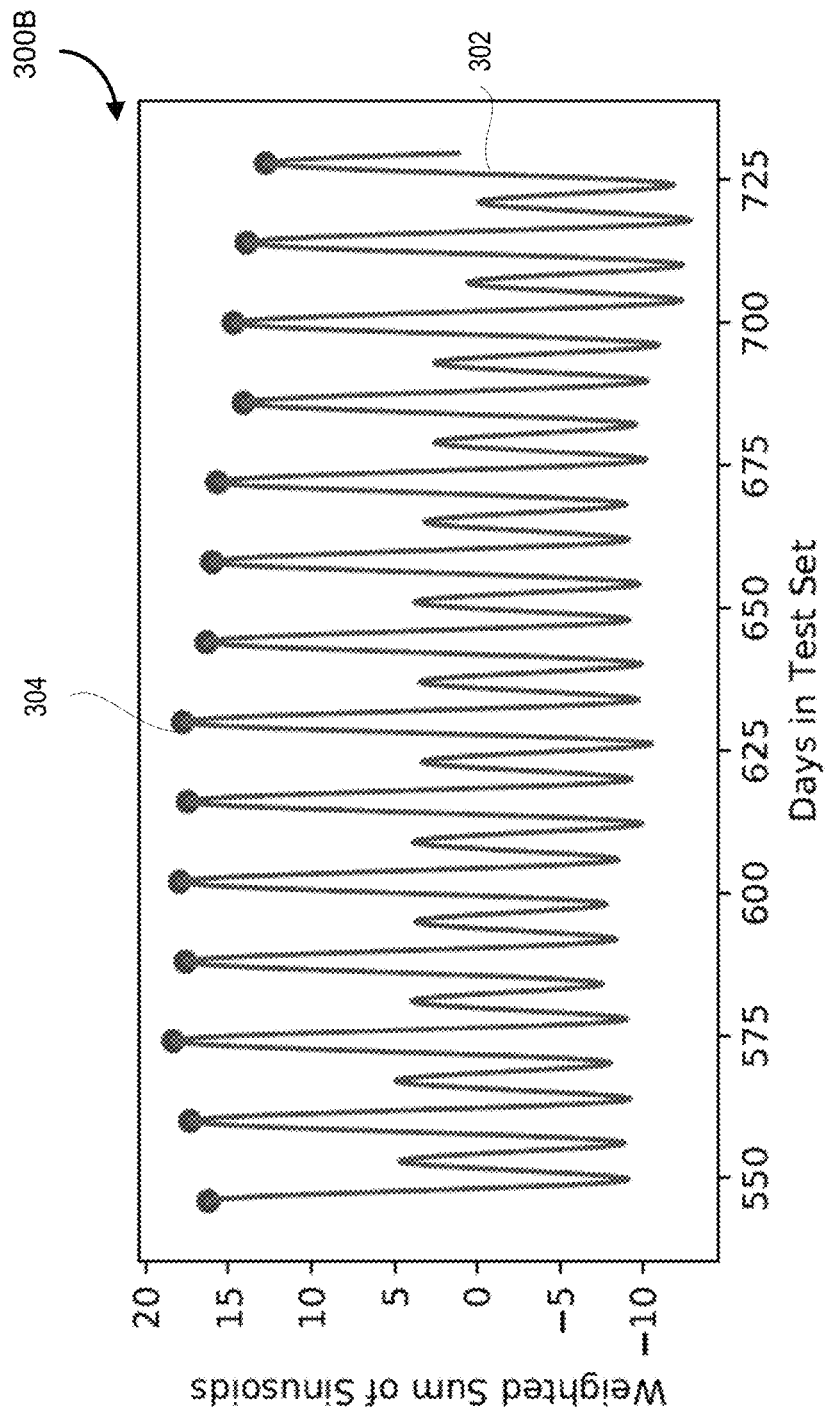

FIG. 3A-3B are charts showing a weighted sum of sinusoids oscillating at different amounts of days, showing the models learned for Applicants' synthesized dataset before the final activation. according to some embodiments. FIG. 3A is a chart 300A showing oscillation every 7 days, and FIG. 3B is a chart 300B showing oscillation every 14 days. The circles represent the points to be classified as 1.

FIG. 3A shows that the learned function for the days in the test set where the weights, frequencies and phase-shifts are learned from the data. The red dots on the figure represent multiples of 7. It can be observed that Time2Vec successfully learns the correct period and oscillates every 7 days.

The phase-shifts have been learned in a way that all multiples of 7 are placed on the positive peaks of the signal to facilitate separating them from the other days. Looking at the learned frequency and phase-shift for the sine functions across several runs, Applicants observed that in many runs one of the main sine functions has a frequency around $0.898 \approx 2\pi/7$ and a phase-shift around $1.56 \approx \pi/2$, thus learning to oscillate every 7 days and shifting by $\pi/2$ to make sure multiples of 7 end up at the peaks of the signal.

The phase-shifts had been learned in a way that all multiples of 7 were placed on the positive peaks of the signal to facilitate separating them from the other days.

The model perfectly classified the examples in the test set showing that the sine functions in Time2Vec can be used effectively for extrapolation and out of sample times assuming that the test set follows similar periodic patterns as the train set. Replacing sine with other activation functions resulted in always predicting the majority class.

Figure 4B:
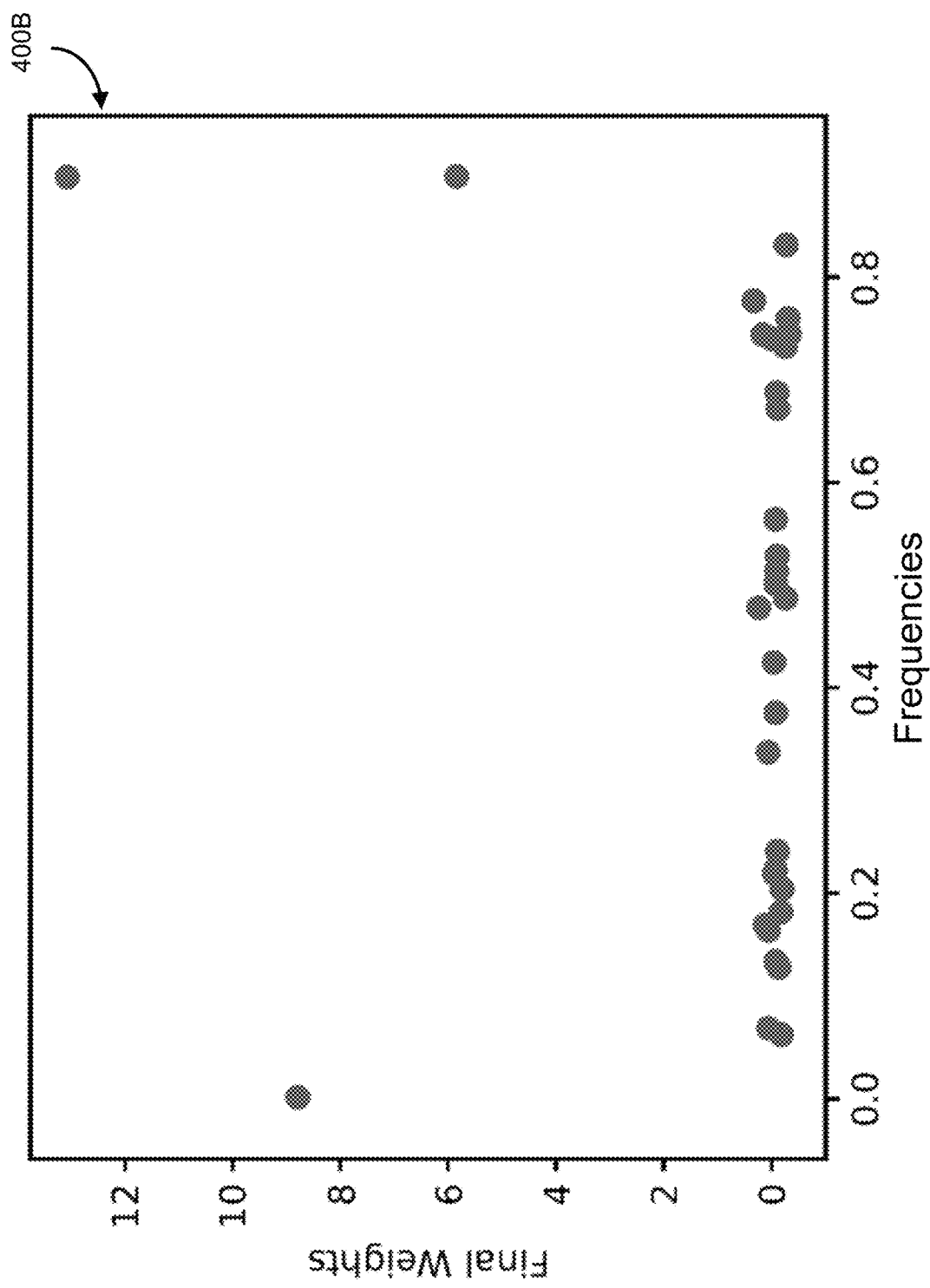

FIG. 4A-4B are charts showing weights for frequencies for the synthesized data set, according to some embodiments. FIG. 4A is a plot 400A of the initial weights, and FIG. 4B is a plot 400B of the learned weights.

FIG. 4A and FIG. 4B shows the initial and learned sine frequencies for one run. It can be viewed that at the beginning, the weights and frequencies are random numbers. But after training, only the desired frequency ($2\pi/7$) has a high weight (and the 0 frequency which gets subsumed into the bias).

The model perfectly classifies the examples in the test set which represents the sine functions in Time2Vec can be used effectively for extrapolation and out of sample times assuming that the test set follows similar periodic patterns as the train set.

Applicants added some noise to the labels by flipping 5% of the labels selected at random and observed a similar performance in most runs.

To test invariance to time rescaling, Applicants multiplied the inputs by 2 and observed that in many runs, the frequency of one of the main sine functions was around $0.448 \approx 2\pi/(2*7)$ thus oscillating every 14 days. An example of a combination of signals learned to oscillate every 14 days is in FIG. 3B.

Figure 5A:
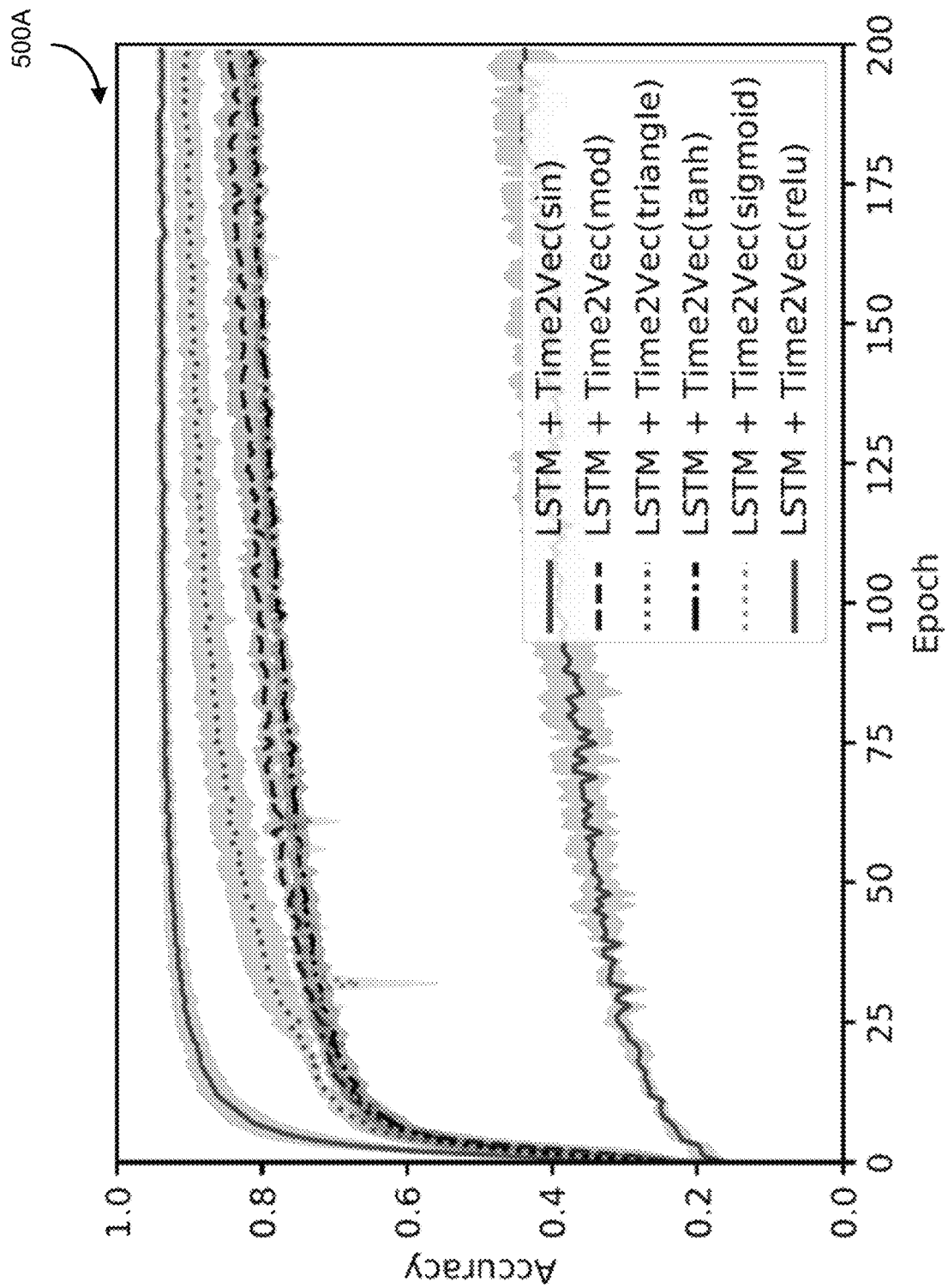
FIG. 5A-5D are plots showing an ablation study of several components in Time2Vec.
Figure 5B:
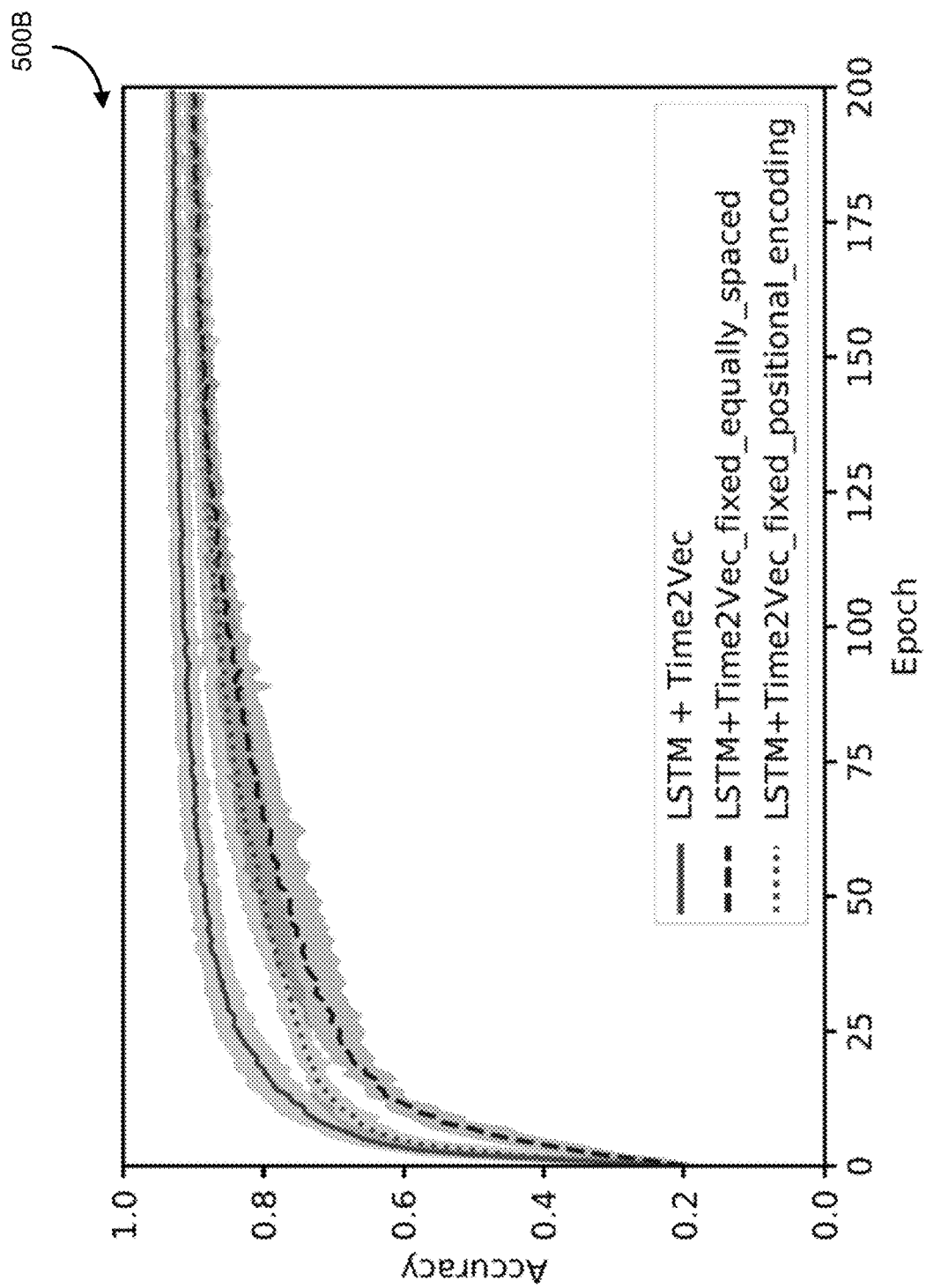
Figure 5C:
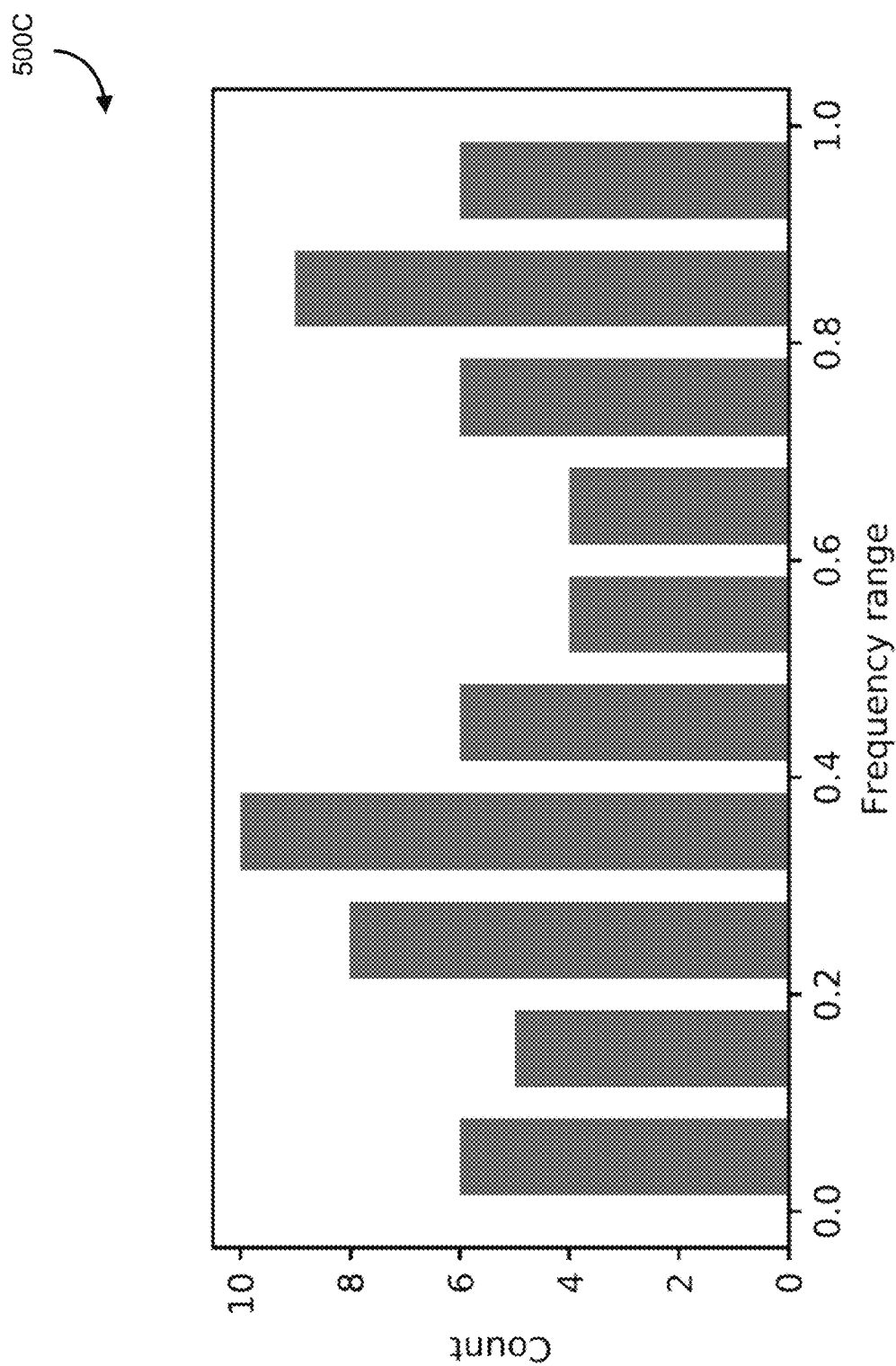
Figure 5D:
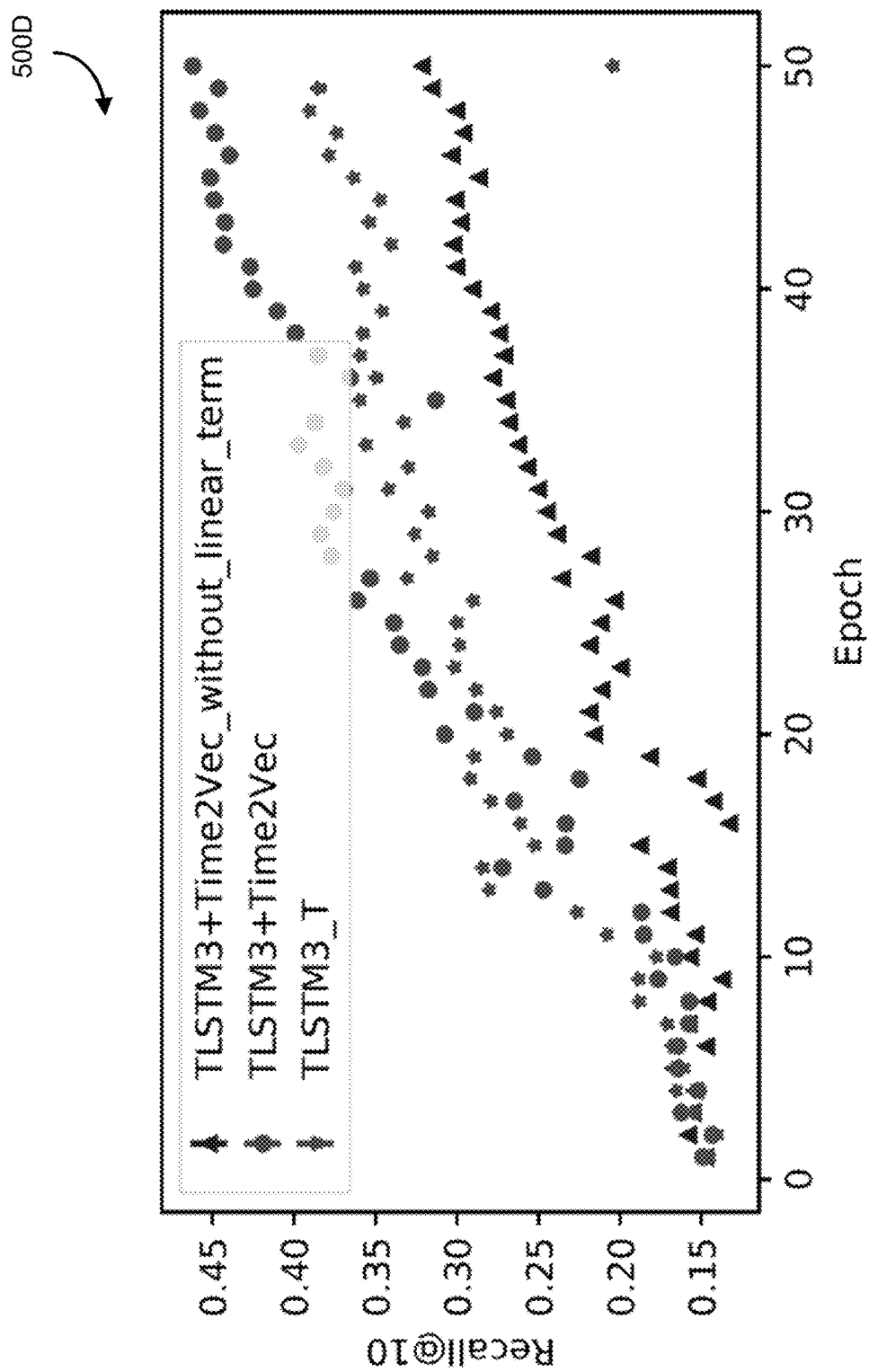

FIG. 5A-5D are plots showing an ablation study of several components in Time2Vec. FIG. 5A is a plot 500A comparing different activation functions for Time2Vec on Event-MNIST. In FIG. 5A, Sigmoid and Tan h almost overlap. FIG. 5B is a plot 500B comparing frequencies fixed to equally-spaced values, frequencies fixed according to positional encoding, and learned frequencies on Event-MNIST. FIG. 5C is a plot 500C of a histogram of the frequencies learned in Time2Vec for Event-MNIST. The x-axis represents frequency intervals and the y-axis represents the number of frequencies in that interval. FIG. 5D is a plot 500D showing the performance of TLSTM3+ Time2Vec on CiteULike in terms of Recall@10 with and without the linear term.

In considering other periodic functions, from the results shown in FIG. 5A, it can be observed that the periodic activation functions (sine, mod, and triangle) outperform the non-periodic ones. Other than not being able to capture periodic behaviors, Applicants suggest that one of the main reasons why these non-periodic activation functions do not perform well is because as time goes forward and becomes larger, Sigmoid and Tan h saturate and ReLU either goes to zero or explodes. Among periodic activation functions, sine outperforms the other two.

While sine was used as the activation function of the Time2Vec, other activation functions such as Sigmoid, Tan h, or rectified linear units (ReLU) [Vinod Nair and Geoffrey E Hinton. Rectified linear units improve restricted Boltzmann machines. In *Proceedings of the 27th international conference on machine learning (ICML*-10), pages 807-814, 2010] were also tested by repeating the experiment on Event-MNIST using activation functions other than the sine.

The length of the Time2Vec was fixed to 64+1, i.e., 64 units with a non-linear transformation and 1 unit with a linear transformation. Sine outperformed the other activation functions. Other than not being able to capture periodic behaviours, one of the main reasons why the other activation functions did not perform well is likely because as time goes forward and becomes larger, Sigmoid and Tan h saturate and ReLU either goes to zero or explodes.

Giambattista Parascandolo et al. [Tuomas Virtanen Giambattista Parascandolo, Heikki Huttunen. Taming the waves: sine as activation function in deep neural networks. 2017] argue that when sine is used as the activation function in deep learning architectures, only one of the monotonically increasing (or monotonically decreasing) parts of the sine function is used and the periodic part is ignored.

When Time2Vec was used, however, the periodicity of the sine functions were also being used and seemed to be key to the effectiveness of the Time2Vec representation.

There is a question of whether learning the sine frequencies and phase-shifts of Time2Vec from data offer any advantage compared to fixing them. To answer this question, Applicants compare three models on Event-MNIST when using Time2Vec of length 16+1: 1—fixing $t2v(\tau)[n]$ to sin $$\left(\frac{2\pi n}{16}\right)$$

for $n \le 16$, 2—fixing the frequencies and phase shifts according to's positional encoding, and 3—learning the frequencies and phase-shifts from the data. FIG. 5B represents the obtained results. The obtained results in FIG. 5B show that learning the frequencies and phase-shifts rather than fixing them helps improve the performance of the model.

It has been argued that when sine activations are used, only a monotonically increasing (or decreasing) part of it is used and the periodic part is ignored. When Applicants use Time2Vec, however, the periodicity of the sine functions are also being used and seem to be key to the effectiveness of the Time2Vec representation. FIG. 5C shows some statistics on the frequencies learned for Event-MNIST where Applicants count the number of learned frequencies that fall within intervals of lengths 0.1 centered at [0.05, 0.15, . . . , 0.95] (all learned frequencies are between 0 and 1). FIG. 5C contains two peaks at 0.35 and 0.85. Since the input to the sine functions for this problem can have a maximum value of 784 (number of pixels in an image), sine functions with frequencies around 0.35 and 0.85 finish (almost) 44 and 106 full periods. The smallest learned frequency is 0.029 which finishes (almost) 3.6 full periods. These values indicate that the model is indeed using the periodicity of the sine functions, not just a monotonically increasing (or decreasing) part of them.

To see the effect of the linear term in Time2Vec, Applicants repeated the experiment for Event-MNIST when the linear term is removed from Time2Vec Applicants observed that the results were not affected substantially, thus showing that the linear term may not be helpful for Event-MNIST. This might be due to the simplicity of the Event-MNIST dataset. Then Applicants conducted a similar experiment for TLSTM3 on CiteULike (which is a more challenging dataset) and obtained the results in FIG. 5D. From these results, Applicants can see that the linear term helps facilitate learning functions of time that can be effectively consumed by the model.

The linear term can play a crucial role in some embodiments of Time2Vec. In some embodiments, variants of the linear term are utilized. In alternate embodiments, the linear term is replaced with a non-linear, non-periodic term. Other potential terms include exponential terms (e.g., quadratic/polynomial), logarithmic functions, among others.

To verify if Time2Vec can be integrated with other architectures and improve their performance, it was integrated with TLSTM1 and TLSTM3, two state-of-the-art models for handling asynchronous events. To replace time in TLSTM1 with Time2Vec, equations 7 and 9 were modified as follows:

$$t_j = \sigma(W_t x_j + \sigma(U_t t2v(\tau)) + b_t) \quad (20)$$

$$o_j = \sigma(W_o x_j + V_t t2v(\tau) + U_o h_{j-1} + b_o) \quad (21)$$

i.e., $\tau$ was replaced with $t2v(\tau)$, $u_t$ was replaced with $U_t$, and $v_t$ was replaced with $V_t$. Similarly, for TLSTM3 equations 10, 11 and 14 were modified as follows:

$$t1_j = \sigma(W_{t1} x_j + \sigma(U_{t1} t2v(\tau)) + b_{t1}) \quad (22)$$

$$t2_j = \sigma(W_{t2} x_j + \sigma(U_{t2} t2v(\tau)) + b_{t2}) \quad (23)$$

$$o_j = \sigma(W_o x_j + V_t t2v(\tau) + U_o h_{j-1} + b_o) \quad (24)$$

The results obtained on Last.FM and CiteULike for TLSTM1 are in FIGS. 11A-11B, and FIGS. 12A-12B, and for TLSTM3 in FIGS. 13A-13B and FIGS. 14A-14B, respectively.

Example Scenarios

Embodiments herein can be utilized for machine learning in respect of supply chain management. For example, predicting and coordinating efficient resource deliveries based on unexpected events such as suddenly unavailable resources based on political or environmental events.

The events in question can be modelled as data inputs, and time can be provided as a vectorized function as a set of features (as opposed to a single feature). Decomposing time allows for seemingly non-periodic or difficult to determine periodicities to become evident through training epochs, given a sufficiently large training set and/or number of iterations.

The periodicity as identified through the decomposed time vector converges towards one or more periodic terms of the decomposed features and/or the linear term, which provides additional features as inputs into the machine learning mechanism. Decomposed time, for example, may then, from a feature perspective, indicate that the certain resourcing issues which have some level of periodicity may be connected to a particular outcome based on a tuning of the machine learning mechanism across the training epochs. The decomposition is particularly useful where the periodicity is not entirely consistent (e.g., the issues arise with some level of "fuzziness" in frequency).

The linear term and/or phase shift term of some factors is useful in modelling shifts that may not specifically be periodic, such as a non-periodic translation in timing that arises due to a one-time delay, etc.

Embodiments herein can be utilized for machine learning in respect of health care records. For example, predicting hospital staffing needs due to patterns relating to update time and location inputs in patients' records. Similarly, the decomposition of time prior to provisioning into a machine learning mechanism is useful to help improve machine learning outcomes where suspected periodicity is present but unclear from the underlying data.

Embodiments herein can be utilized for machine learning in respect of processing financial data to add various metadata tags and/or determine patterns and/or relationships as between data elements. For example, determining relationships between data elements for transactions relating to renovations after an extreme weather event or a significant personal event such as buying a house or starting a new job. The relationships between data elements is difficult to ascertain, and adding periodic terms that naturally converge over training epochs helps potentially improve prediction accuracy over a number of epochs.

Embodiments herein can be utilized for machine learning in respect of improving computer performance in relation to resource usage predictions.

For example, determining the asynchronous computer usage events that occur preceding a large increase in server traffic to potentially aid in more efficient allocation of resources during those times and a corresponding reduction in computational cost when time inputs indicating reduced usage are present.

In this example, machine-learning approaches for generating control signals for modifying computational parameters, for example, to allocate resources predictively based on estimated future resource demand for cloud-computing, can converge more quickly in view of the underlying periodicity being tracked as in the additional features provided by decomposing time into a set of features.

Embodiments herein can be utilized for machine learning in respect of internet-connected home devices. For example, traffic flow patterns for internet-connected vehicles based on patterns of use before leaving the home for purposes such as shopping or predicting injuries based on an increased level of activity monitored by smartphones or devices that track physical activity and heart rate.

Figure 18:
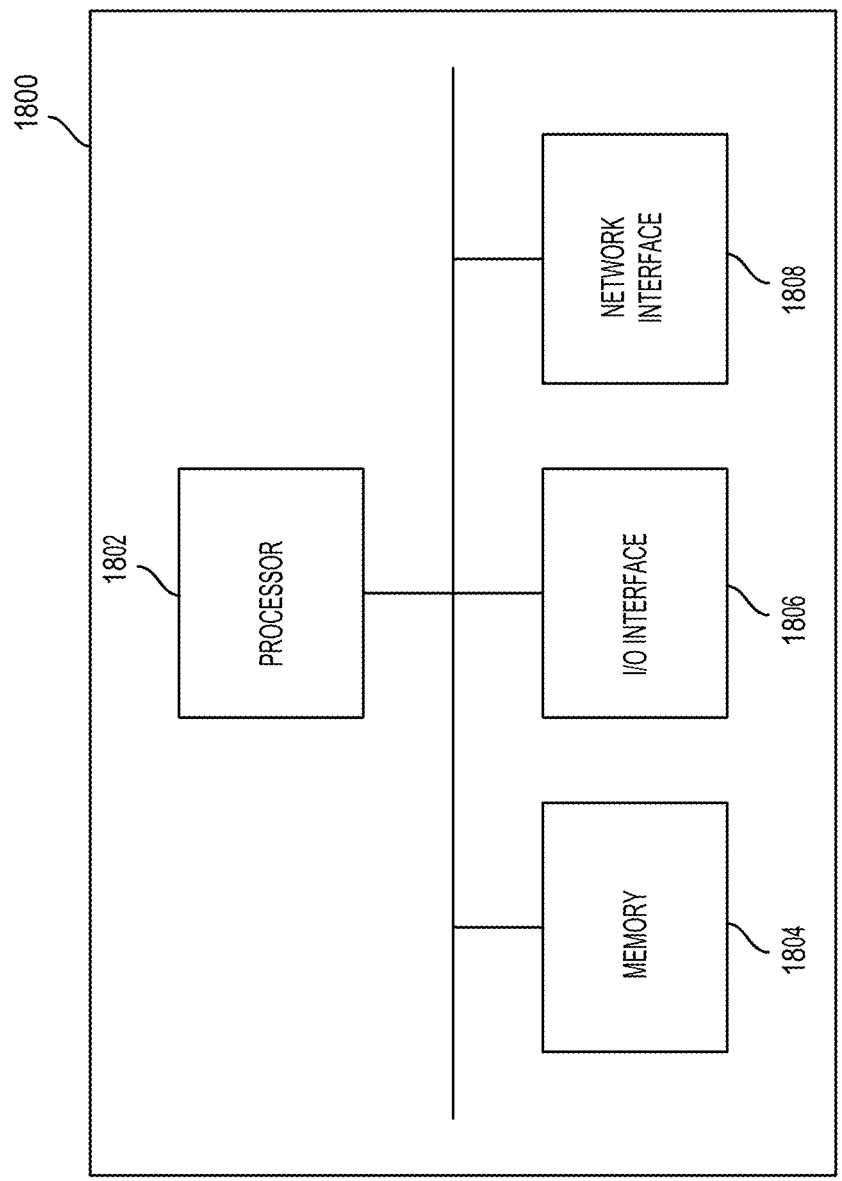
FIG. 18 is a diagram of an example computing device, according to some embodiments.

FIG. 18 is a diagram of an example computing device, according to some embodiments. The computing device 1800 can be used to implement various embodiments, and may include a processor 1802 that operates in conjunction with computer memory 1804, input/output interfaces 1806, and network interfaces 1808. The computing device 1800 is configured such that processor 1802 performs a method for feature encoding by decomposing time features into a data structure as inputs into a machine learning data model architecture, according to various embodiments described herein. The computing device 1800 can be a computer server that operates in a data center, for example, and the processor 1802 can, in some embodiments, include multiple processors operating in parallel or in a distributed resources based implementation.

Figure 19:
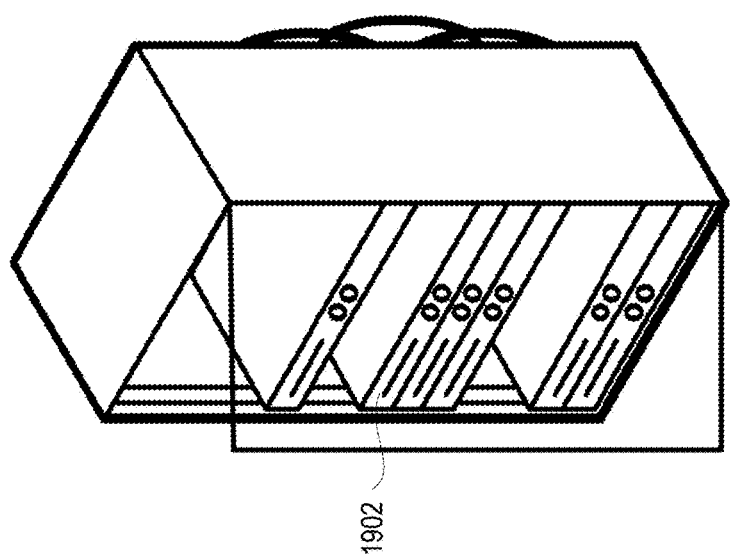
FIG. 19 is an example special purpose machine, according to some embodiments.

FIG. 19 is an example special purpose machine 1900, according to some embodiments. A feature encoding machine 1902 is provided that receives machine learning input vectors having time components and transforms the inputs by expanding the feature sets with data structures representing decomposed time components in accordance with various embodiments described herein.

REFERENCES

Hirotugu Akaike. Fitting autoregressive models for prediction. Annals of the institute of Statistical Mathematics, 21(1):243-247, 1969.

Jithendar Anumula, Daniel Neil, Tobi Delbruck, and Shih-Chii Liu. Feature representations for neuromorphic audio spike streams. Frontiers in neuroscience, 12:23, 2018.

George B Arfken and Hans J Weber. Mathematical methods for physicists, 1999.

Inci M Baytas, Cao Xiao, Xi Zhang, Fei Wang, Anil K Jain, and Jiayu Zhou. Patient subtyping via time-aware lstm networks. In ACM SIGKDD, pp. 65-74, 2017.

Guillaume Bellec, Darjan Salaj, Anand Subramoney, Robert Legenstein, and Wolfgang Maass. Long short-term memory and learning-to-learn in networks of spiking neurons. In NeurIPS, 2018.

Ronald Newbold Bracewell and Ronald N Bracewell. The Fourier transform and its applications. McGraw-Hill New York, 1986.

Victor Campos, Brendan Jou, Xavier Giro-i Nieto, Jordi Torres, and Shih-Fu Chang. Skip rnn: Learning to skip state updates in recurrent neural networks. In ICLR, 2018.

O. Celma. Music Recommendation and Discovery in the Long Tail. Springer, 2010.

Tian Qi Chen, Yulia Rubanova, Jesse Bettencourt, and David Duvenaud. Neural ordinary differential equations. In Neural Information Processing Systems (NeurIPS), 2018.

Edward Choi, Mohammad Taha Bahadori, Andy Schuetz, Walter F Stewart, and Jimeng Sun. Doctor AI: Predicting clinical events via recurrent neural networks. In Machine Learning for Healthcare Conference, pp. 301-318, 2016.

Leon Cohen. Time-frequency analysis, volume 778. Prentice hall, 1995.

Daryl J Daley and David Vere-Jones. An introduction to the theory of point processes: volume II: general theory and structure. Springer Science & Business Media, 2007.

Harris Drucker, Christopher J C Burges, Linda Kaufman, Alex J Smola, and Vladimir Vapnik. Support vector regression machines. In NeurIPS, pp. 155-161, 1997.

Nan Du, Hanjun Dai, Rakshit Trivedi, Utkarsh Upadhyay, Manuel Gomez-Rodriguez, and Le Song. Recurrent marked temporal point processes: Embedding event history to vector. In ACM SIGKDD, pp. 1555-1564. ACM, 2016.

Mazdak Fatahi, Mahmood Ahmadi, Mahyar Shahsavari, Arash Ahmadi, and Philippe Devienne. evt_mnist: A spike based version of traditional mnist. arXiv preprint arXiv:1604.06751, 2016.

Michael S Gashler and Stephen C Ashmore. Modeling time series data with deep fourier neural networks. Neurocomputing, 188:3-11, 2016.

Jonas Gehring, Michael Auli, David Grangier, Denis Yarats, and Yann N Dauphin. Convolutional sequence to sequence learning. arXiv preprint arXiv:1705.03122, 2017.

Felix A Gers and Jurgen Schmidhuber. Recurrent nets that time and count. In IJCNN, volume 3, pp. 189-194. IEEE, 2000.

Tuomas Virtanen Giambattista Parascandolo, Heikki Huttunen. Taming the waves: sine as activation function in deep neural networks. 2017. URL https://openreview.net/pdf?id=Sks3zF9eg.

Luke B Godfrey and Michael S Gashler. Neural decomposition of time-series data for effective generalization. IEEE transactions on neural networks and learning systems, 29(7):2973-2985, 2018.

Klaus Greff, Rupesh K Srivastava, Jan Koutnik, Bas R Steunebrink, and Jurgen Schmidhuber. Lstm: A search space odyssey. IEEE transactions on neural networks and learning systems, 28(10): 2222-2232, 2017.

Aditya Grover and Jure Leskovec. node2vec: Scalable feature learning for networks. In ACM SIGKDD, pp. 855-864, 2016.

Sepp Hochreiter and Jurgen Schmidhuber. Long short-term memory. Neural computation, 9(8): 1735-1780, 1997.

Hao Hu and Guo-Jun Qi. State-frequency memory recurrent neural networks. In International Conference on Machine Learning, pp. 1568-1577, 2017.

Seyed Mehran Kazemi and David Poole. SimplE embedding for link prediction in knowledge graphs. In NeurIPS, pp. 4289-4300, 2018.

Seyed Mehran Kazemi, Rishab Goel, Kshitij Jain, Ivan Kobyzev, Akshay Sethi, Peter Forsyth, and Pascal Poupart. Relational representation learning for dynamic (knowledge) graphs: A survey. arXiv preprint arXiv:1905.11485, 2019.

Diederik P Kingma and Jimmy Ba. Adam: A method for stochastic optimization. arXiv preprintarXiv:1412.6980, 2014.

Srijan Kumar, Xikun Zhang, and Jure Leskovec. Learning dynamic embedding from temporal interaction networks. arXiv preprint arXiv:1812.02289, 2018.

Bum Chul Kwon, Min-Je Choi, Joanne Taery Kim, Edward Choi, Young Bin Kim, Soonwook Kwon, Jimeng Sun, and Jaegul Choo. Retainvis: Visual analytics with interpretable and interactive recurrent neural networks on electronic medical records. IEEE transactions on visualization and computer graphics, 25(1):299-309, 2019.

Alan Lapedes and Robert Farber. Nonlinear signal processing using neural networks: Prediction and system modelling. Technical report, 1987.

Patrick J Laub, Thomas Taimre, and Philip K Pollett. Hawkes processes. arXiv preprint arXiv:1507.02822, 2015.

R Gary Leonard and George Doddington. Tidigits. Linguistic Data Consortium, Philadelphia, 1993.

Shuang Li, Shuai Xiao, Shixiang Zhu, Nan Du, Yao Xie, and Le Song. Learning temporal point processes via reinforcement learning. In NeurIPS, pp. 10804-10814, 2018a.

Yang Li, Nan Du, and Samy Bengio. Time-dependent representation for neural event sequence prediction. arXiv preprint arXiv:1708.00065, 2017.

Yang Li, Nan Du, and Samy Bengio. Time-dependent representation for neural event sequence prediction. 2018b. URL https://openreview.net/pdf?id=HyrT5Hkvf.

Zachary C Lipton, David Kale, and Randall Wetzel. Directly modeling missing data in sequences with rnns: Improved classification of clinical time series. In Machine Learning for Healthcare Conference, pp. 253-270, 2016.

Peng Liu, Zhigang Zeng, and Jun Wang. Multistability of recurrent neural networks with nonmonotonic activation functions and mixed time delays. IEEE Transactions on Systems, Man, and Cybernetics: Systems, 46(4):512-523, 2016.

Yao Ma, Ziyi Guo, Zhaochun Ren, Eric Zhao, Jiliang Tang, and Dawei Yin. Streaming graph neural networks. arXiv preprint arXiv:1810.10627, 2018.

Hongyuan Mei and Jason M Eisner. The neural hawkes process: A neurally self-modulating multivariate point process. In NeurIPS, pp. 6754-6764, 2017.

Tomas Mikolov, Ilya Sutskever, Kai Chen, Greg S Corrado, and Jeff Dean. Distributed representations of words and phrases and their compositionality. In NeurIPS, 2013.

Luis Mingo, Levon Aslanyan, Juan Castellanos, Miguel Diaz, and Vladimir Riazanov. Fourier neural networks: An approach with sinusoidal activation functions. 2004.

Kevin Patrick Murphy and Stuart Russell. Dynamic bayesian networks: representation, inference and learning. 2002.

Vinod Nair and Geoffrey E Hinton. Rectified linear units improve restricted boltzmann machines. In ICML, pp. 807-814, 2010.

Daniel Neil, Michael Pfeiffer, and Shih-Chii Liu. Phased lstm: Accelerating recurrent network training for long or event-based sequences. In NeurIPS, pp. 3882-3890, 2016.

Behnam Neyshabur, Zhiyuan Li, Srinadh Bhojanapalli, Yann LeCun, and Nathan Srebro. The role of over-parametrization in generalization of neural networks. In ICLR, 2019.

Maximilian Nickel, Kevin Murphy, Volker Tresp, and Evgeniy Gabrilovich. A review of relational machine learning for knowledge graphs. Proceedings of the IEEE, 104(1):11-33, 2016.

Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. 2017.

Jeffrey Pennington, Richard Socher, and Christopher Manning. Glove: Global vectors for word representation. In EMNLP, pp. 1532-1543, 2014.

David Poole, David Buchman, Seyed Mehran Kazemi, Kristian Kersting, and Sriraam Natarajan. Population size extrapolation in relational probabilistic modelling. In SUM. Springer, 2014.

Lawrence R Rabiner and Biing-Hwang Juang. An introduction to hidden markov models. ieee assp magazine, 3(1): 4-16, 1986.

Carl Edward Rasmussen. Gaussian processes in machine learning. In Advanced lectures on machine learning, pp. 63-71. Springer, 2004.

Josep M Sopena, Enrique Romero, and Rene Alquezar. Neural networks with periodic and monotonic activation functions: a comparative study in classification problems. 1999.

Charles Sutton, Andrew McCallum, and Khashayar Rohanimanesh. Dynamic conditional random fields: Factorized probabilistic models for labeling and segmenting sequence data. Journal of Machine Learning Research, 8(March):693-723, 2007.

Corentin Tallec and Yann Ollivier. Can recurrent neural networks warp time? In International Conference Rakshit Trivedi, Hanjun Dai, Yichen Wang, and Le Song. Know-evolve: Deep temporal reasoning for dynamic knowledge graphs. In ICML, pp. 3462-3471, 2017.

Utkarsh Upadhyay, Abir De, and Manuel Gomez-Rodriguez. Deep reinforcement learning of marked temporal point processes. In NeurIPS, 2018.

Ashish Vaswani, Noam Shazeer, Niki Parmar, Jakob Uszkoreit, Llion Jones, Aidan N Gomez, Lukasz Kaiser, and Illia Polosukhin. Attention is all you need. In NeurIPS, 2017.

Kwok-wo Wong, Chi-sing Leung, and Sheng-jiang Chang. Handwritten digit recognition using multilayer feedforward neural networks with periodic and monotonic activation functions. In Pattern Recognition, volume 3, pp. 106-109. IEEE, 2002.

Shuai Xiao, Mehrdad Farajtabar, Xiaojing Ye, Junchi Yan, Le Song, and Hongyuan Zha. Wasserstein learning of deep generative point process models. In NeurIPS, 2017.

Shuai Xiao, Hongteng Xu, Junchi Yan, Mehrdad Farajtabar, Xiaokang Yang, Le Song, and Hongyuan Zha. Learning conditional generative models for temporal point processes. In AAAI, 2018.

Yu Zhu, Hao Li, Yikang Liao, Beidou Wang, Ziyu Guan, Haifeng Liu, and Deng Cai. What to do next: Modeling user behaviors by time-lstm. In IJCAI, pp. 3602-3608, 2017.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

APPENDIX

Figure 6:
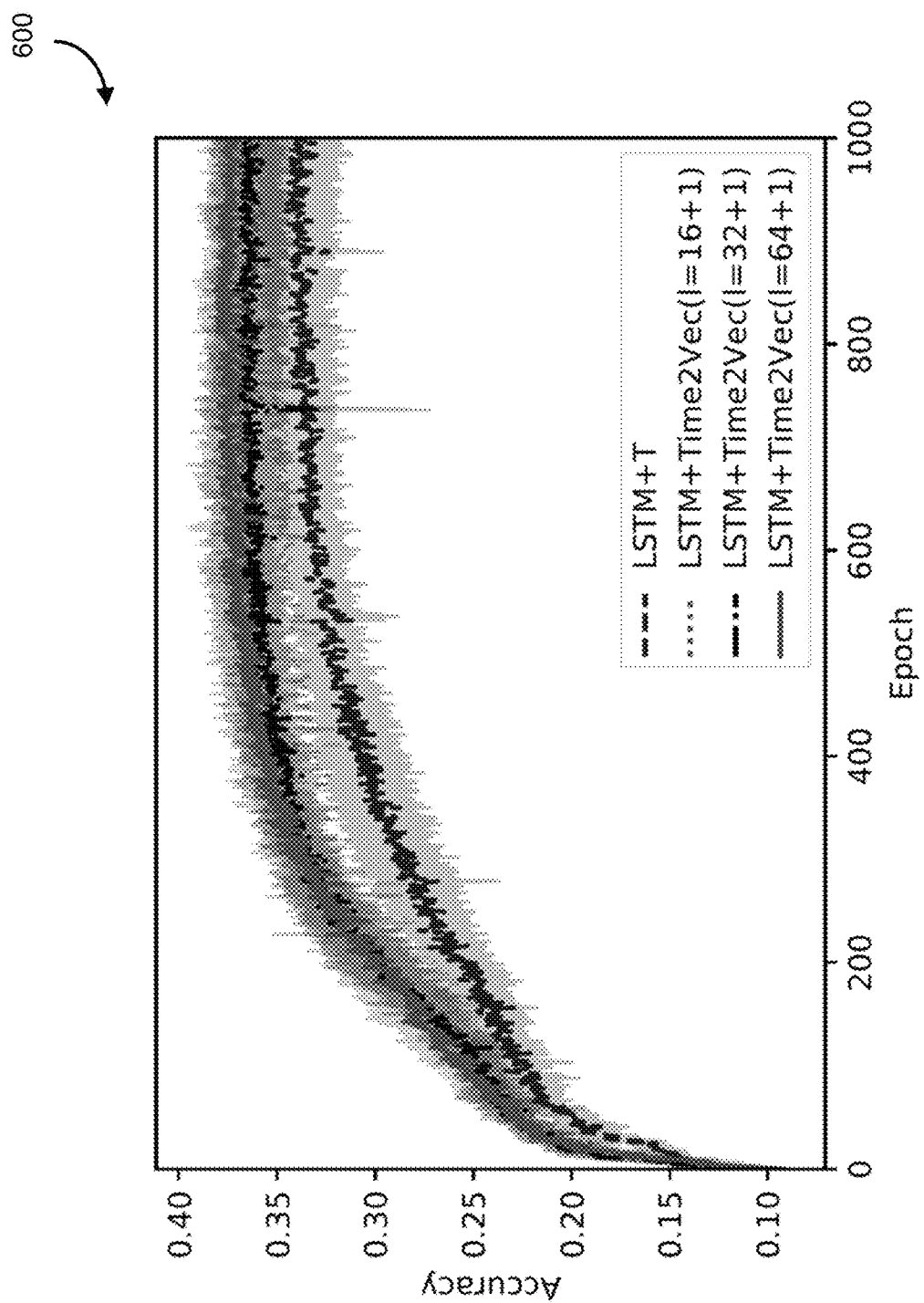
FIG. 6 is a plot comparing LSTM+T and LSTM+ Time2Vec on Event-MNIST, according to some embodiments.

FIG. 6 is a plot 600 comparing LSTM+T and LSTM+Time2Vec on Event-MNIST, according to some embodiments.

For the experiments on Event-MNIST, N_TIDIGITS18 and SOF, Applicants implemented the model in PyTorch. Applicants used Adam optimizer with a learning rate of 0.001. For Event-MNIST and SOF, Applicants fixed the hidden size of the LSTM to 128. For N_TIDIGITS18, due to its smaller train set, Applicants fixed the hidden size to 64.

Applicants allowed each model 200 epochs.

Applicants used a batch size of 512 for Event-MNIST and 128 for N_TIDIGITS18 and SOF. For the experiments on Last.FM and CiteULike, replaced $\tau$ with $t2v(\tau)$. Another change in the code was to change the SAMPLE_TIME variable from 3 to 20.

SAMPLE_TIME controls the number of times Applicants do sampling to compute Recall@10 and MRR@10. Applicants experienced a high variation when sampling only 3 times so Applicants increased the number of times Applicants sample to 20 to make the results more robust.

For both Last.FM and CiteULike, Adagrad optimizer is used with a learning rate of 0.01, vocabulary size is 5000, and the maximum length of the sequence is 200. For Last.FM, the hidden size of the LSTM is 128 and for CiteULike, it is 256. For all except the synthesized dataset, Applicants shifted the event times such that the first event of each sequence starts at time 0.

For the fairness of the experiments, Applicants made sure the competing models for all the experiments have an (almost) equal number of parameters. For instance, since adding Time2Vec as an input to the LSTM increases the number of model parameters compared to just adding time as a feature, Applicants reduced the hidden size of the LSTM for this model to ensure the number of model parameters stays (almost) the same.

For the experiments involving Time2Vec, unless stated otherwise, Applicants tried vectors with 16, 32 and 64 sine functions (and one linear term). Applicants reported the vector length offering the best performance in the main text. For the synthetic dataset, Applicants use Adam optimizer with a learning rate of 0.001 without any regularization. The length of the Time2Vec vector is 32.

More Results

Applicants ran experiments on other versions of the N_TIDIGITS18 dataset as well. Following, Applicants converted the raw event data to event-binned features by virtue of aggregating active channels through a period of time in which a pre-defined number of events occur.

The outcome of binning is thus consecutive frames each with multiple but a fixed number of active channels. In the experiments, Applicants used event-binning with 100 events per frame. For this variant of the dataset, Applicants compared LSTM+T and LSTM+ Time2Vec. The obtained results were on-par. Then, similar to Event-MNIST, Applicants only fed as input the times at which events occurred (i.e. Applicants removed the channels from the input).

Applicants allowed the models 1000 epochs to make sure they converge. The obtained results are presented in FIG. 6. It can be viewed that Time2Vec provides an effective representation for time and LSTM+ Time2Vec outperforms LSTM+T on this dataset.

In the main text, for the experiments involving Time2Vec, Applicants tested Time2Vec vectors with 16, 32 and 64 sinusoids and reported the best one for the clarity of the diagrams. Here, Applicants show the results for all frequencies.

FIGS. 7A-10B compare LSTM+T and LSTM+ Time2Vec for the datasets.

Figure 7A:
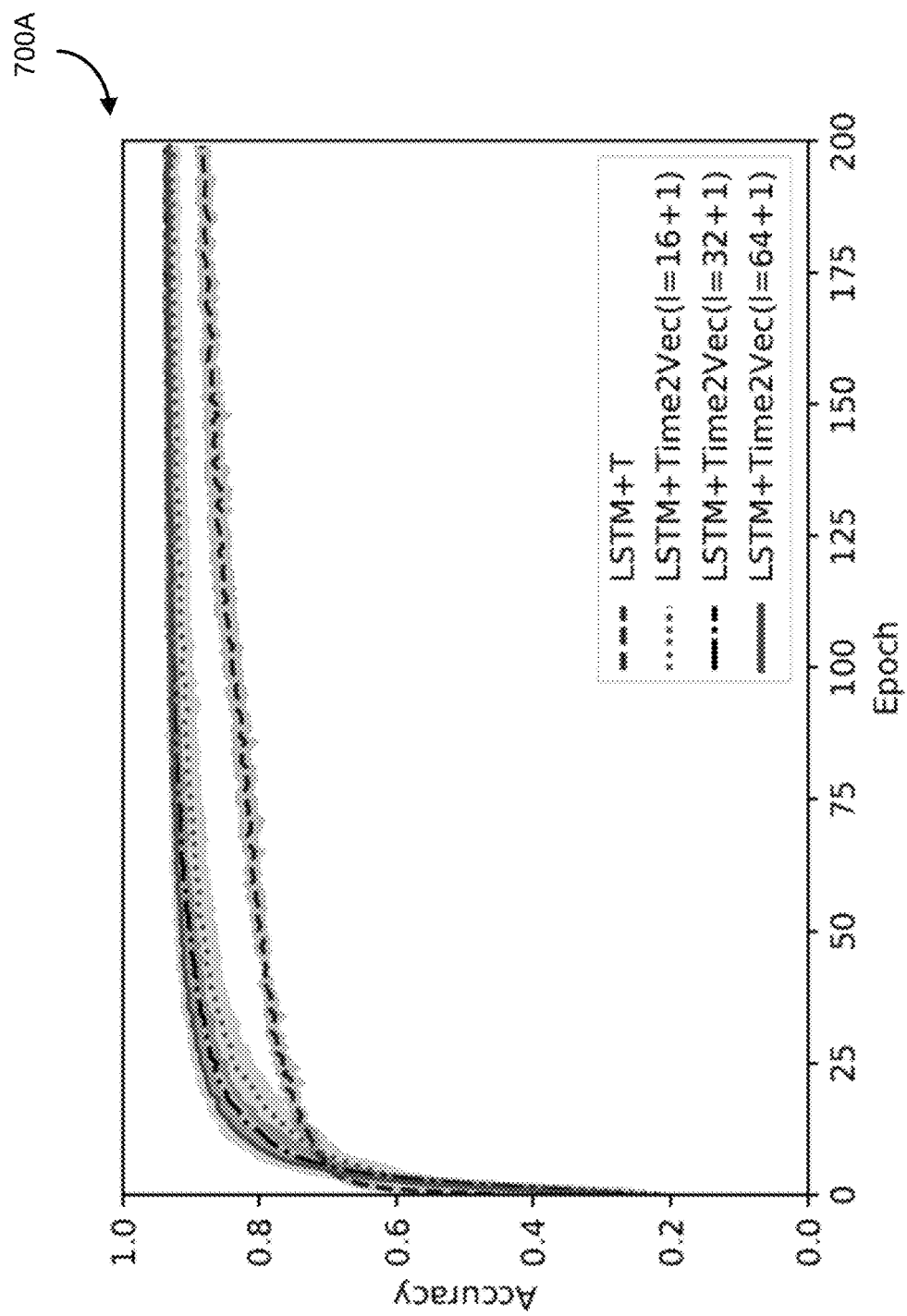
FIG. 7A-7B are plots comparing LSTM+T and LSTM+ Time2Vec on Event-MNIST and raw N_TIDIGITS18, according to some embodiments.
Figure 7B:
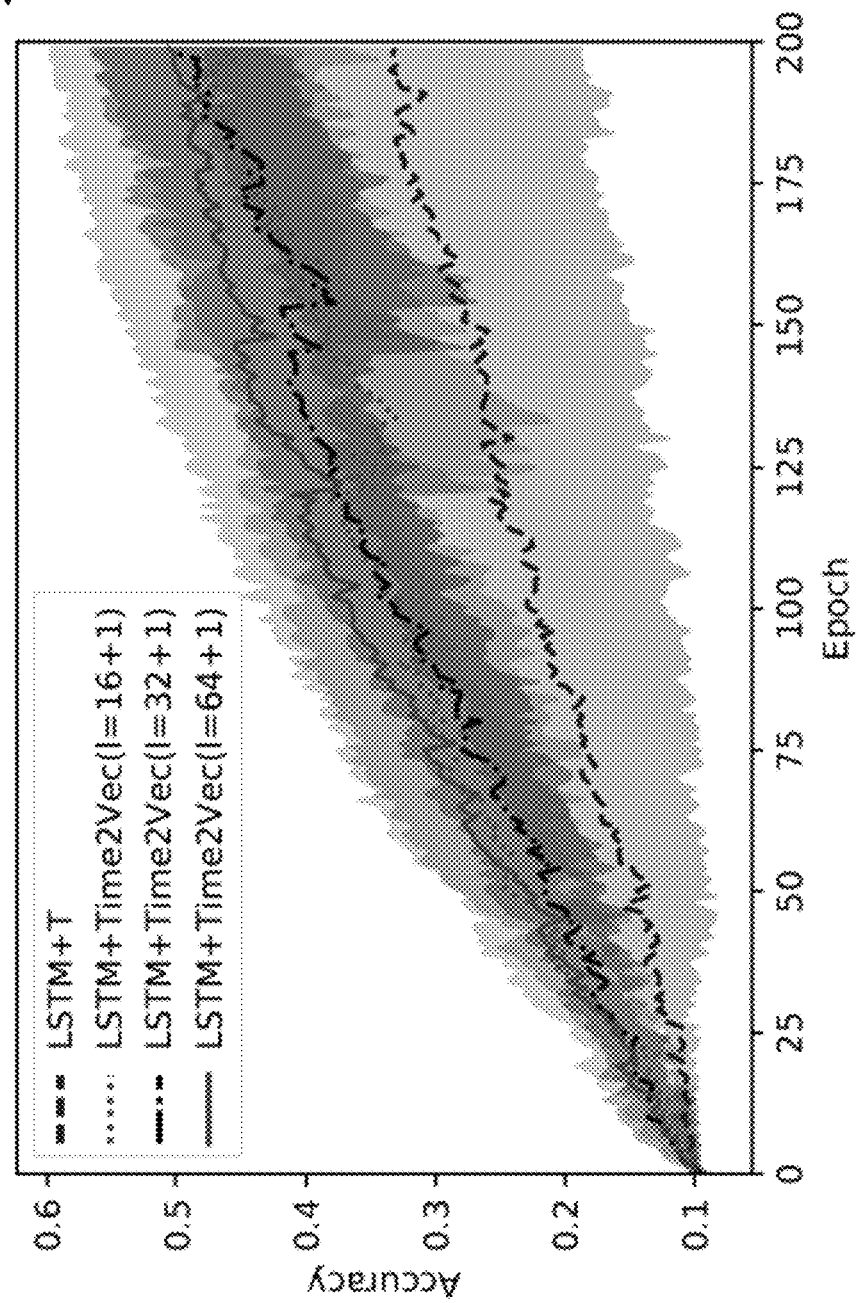

FIG. 7A-7B are plots comparing LSTM+T and LSTM+ Time2Vec on Event-MNIST and raw N_TIDIGITS18, according to some embodiments. FIG. 7A is a plot 700A in relation to Event-MNIST. FIG. 7B is a plot 700B in relation to raw N_TIDIGITS18.

Figure 8A:
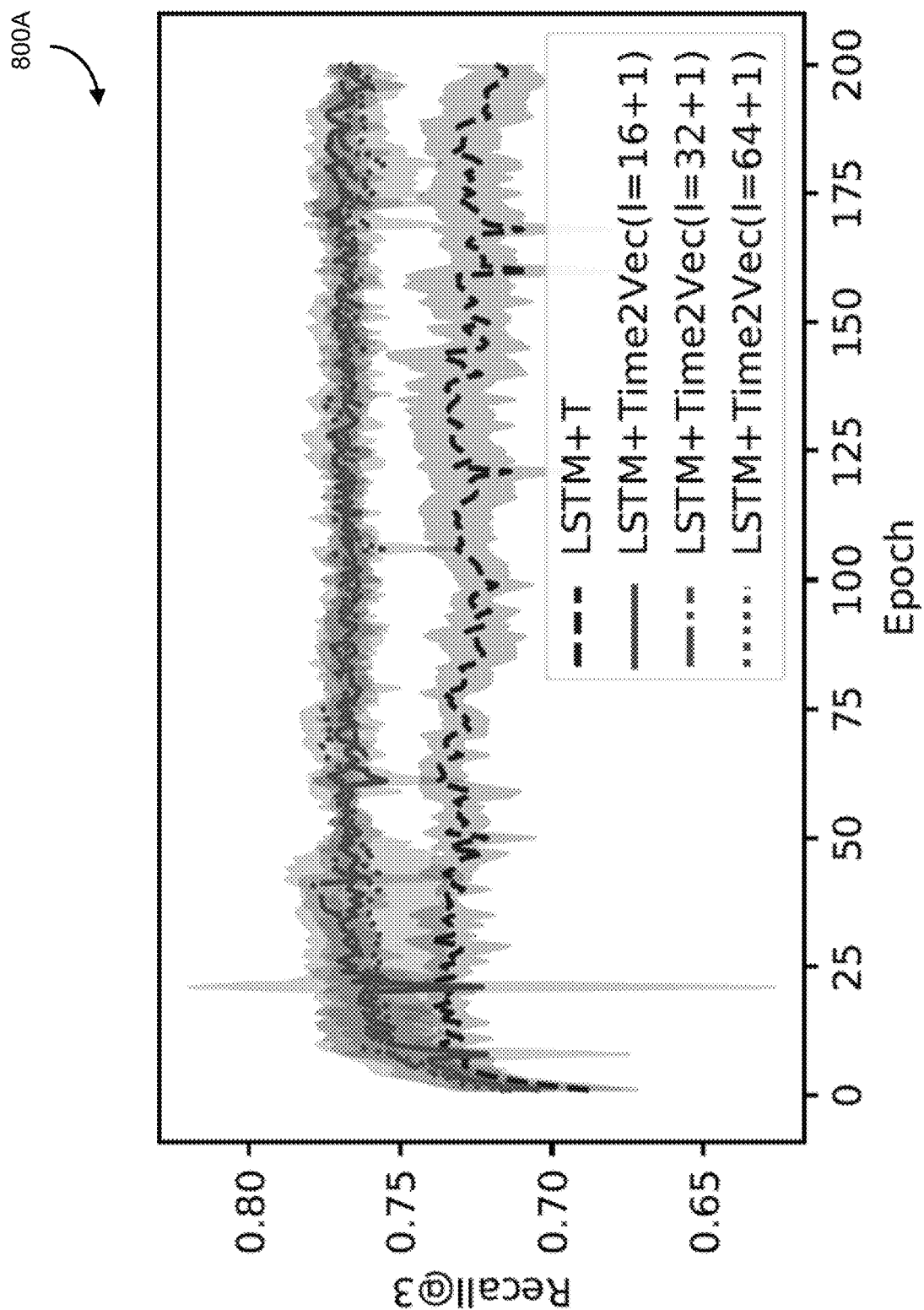
FIG. 8A-8B are plots comparing LSTM+T and LSTM+ Time2Vec on SOF (Stack Overflow), according to some embodiments.
Figure 8B:
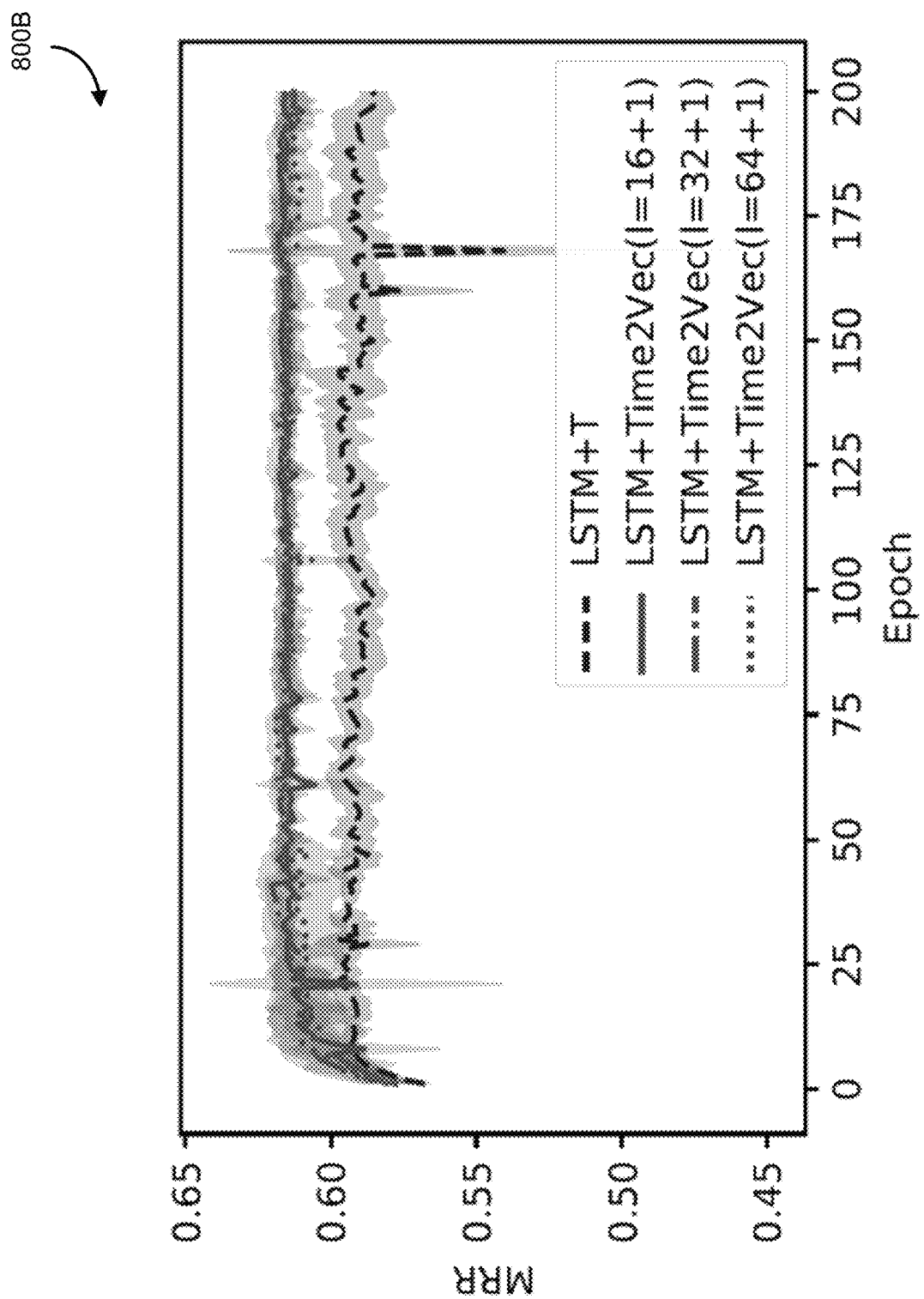

FIG. 8A-8B are plots comparing LSTM+T and LSTM+ Time2Vec on SOF (Stack Overflow), according to some embodiments. FIG. 8A is a plot 800A in relation to Recall, and FIG. 8B is a plot 800B in relation to MRR.

Figure 9A:
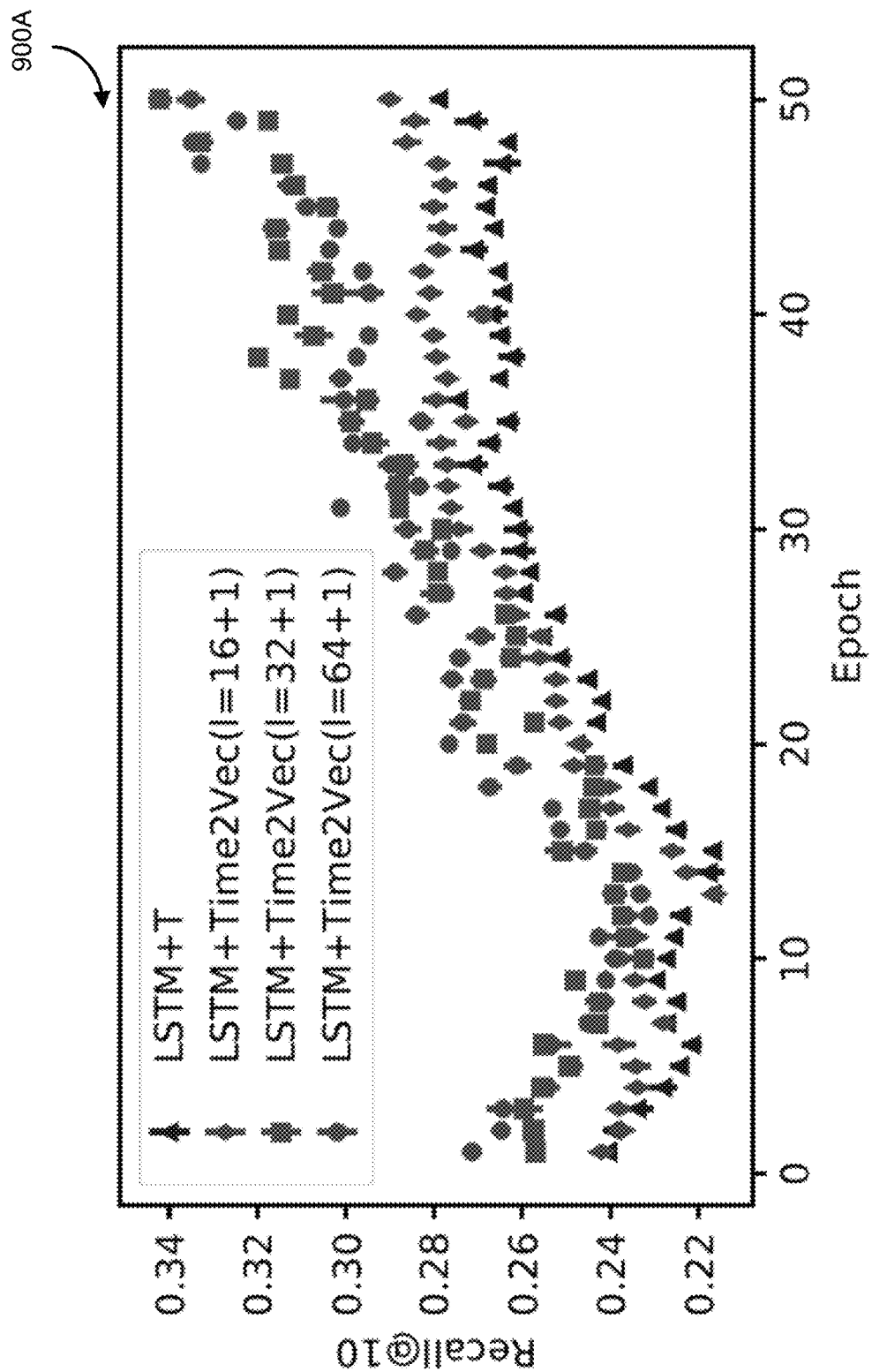
FIG. 9A-9B are plots comparing LSTM+T and LSTM+ Time2Vec on Last.FM, according to some embodiments.
Figure 9B:
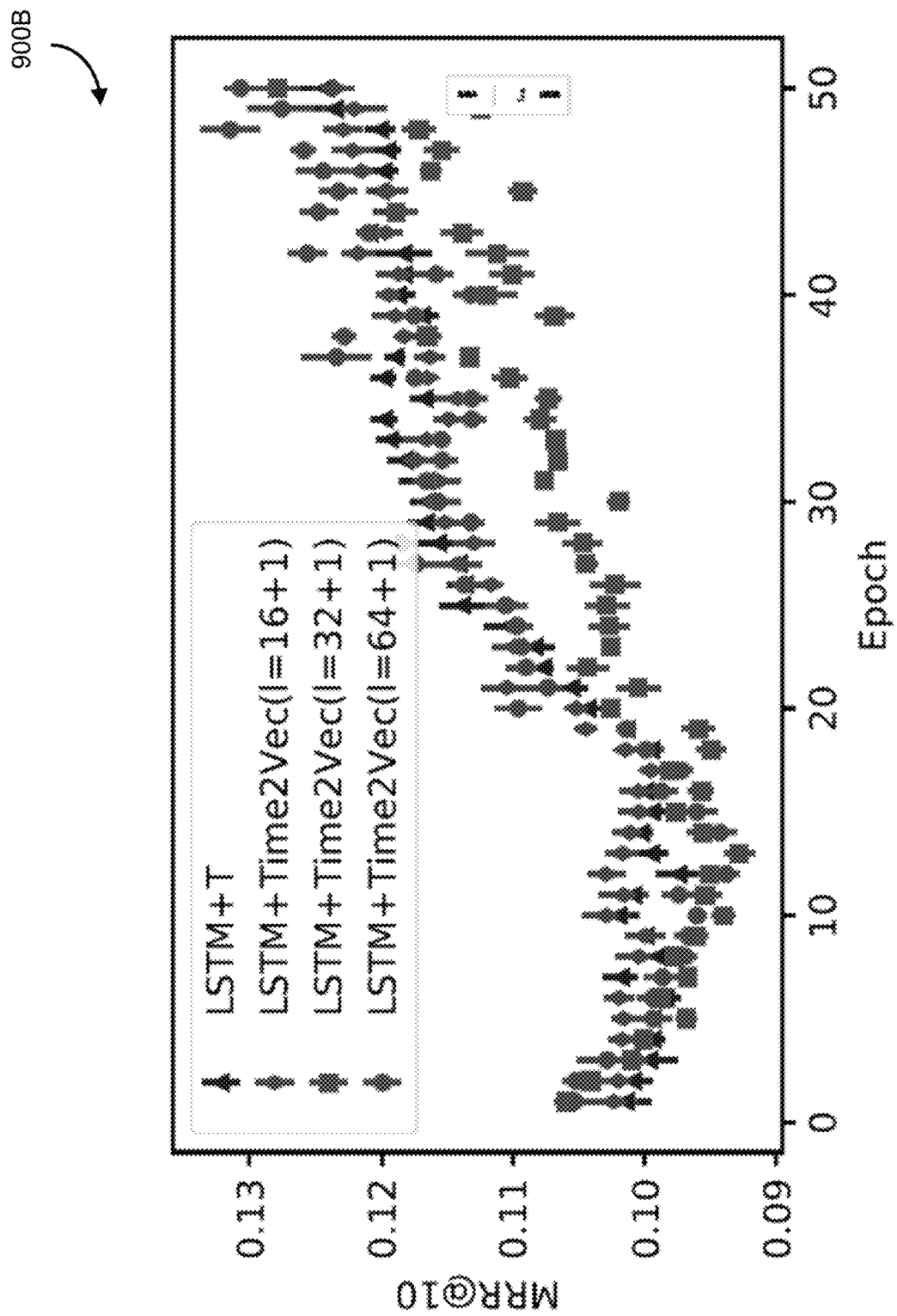

FIG. 9A-9B are plots comparing LSTM+T and LSTM+ Time2Vec on Last.FM, according to some embodiments. FIG. 9A is a plot 900A in relation to Recall, and FIG. 9B is a plot 900B in relation to MRR.

Figure 10A:
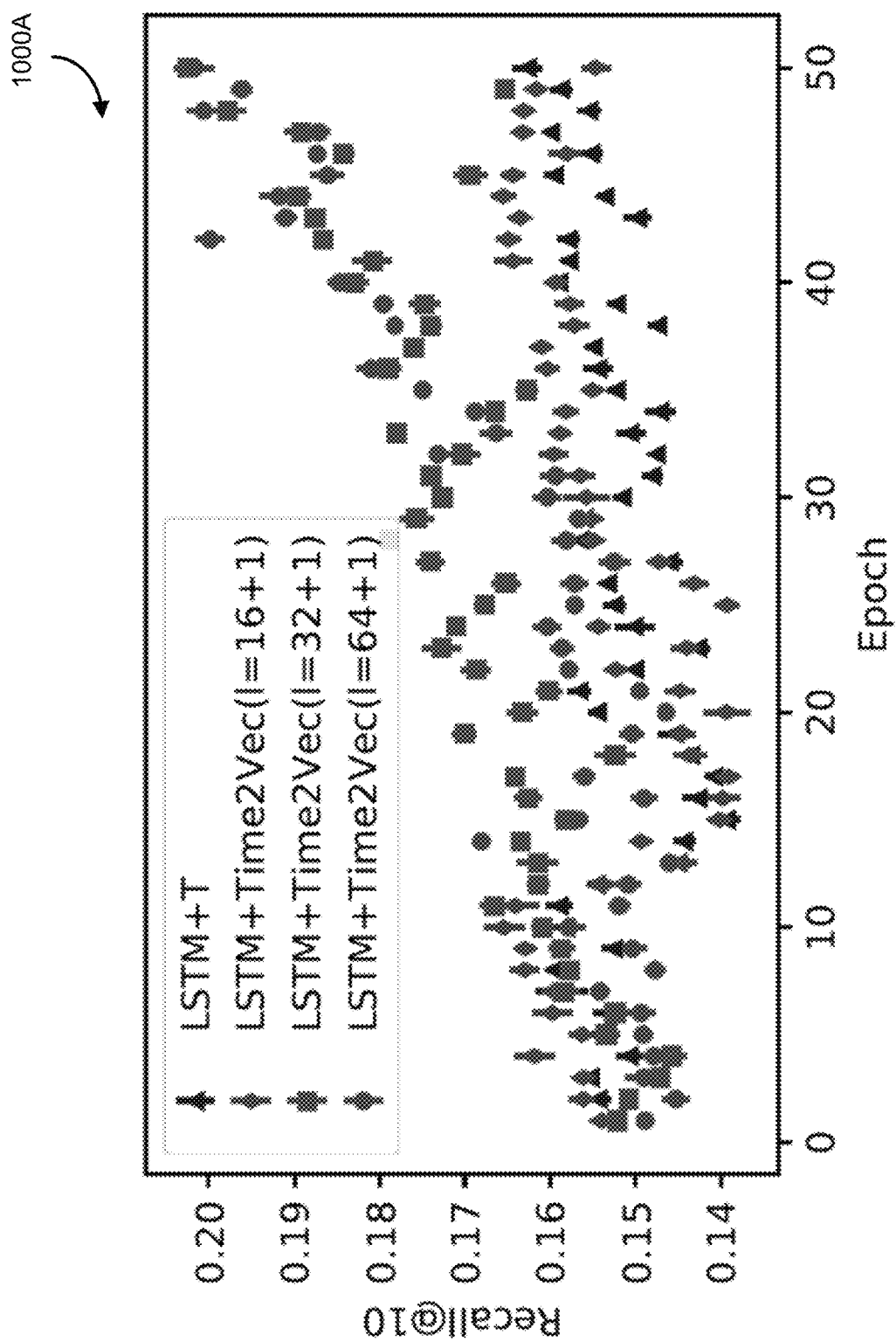
FIG. 10A-10B are plots comparing LSTM+T and LSTM+ Time2Vec on CiteULike, according to some embodiments.
Figure 10B:
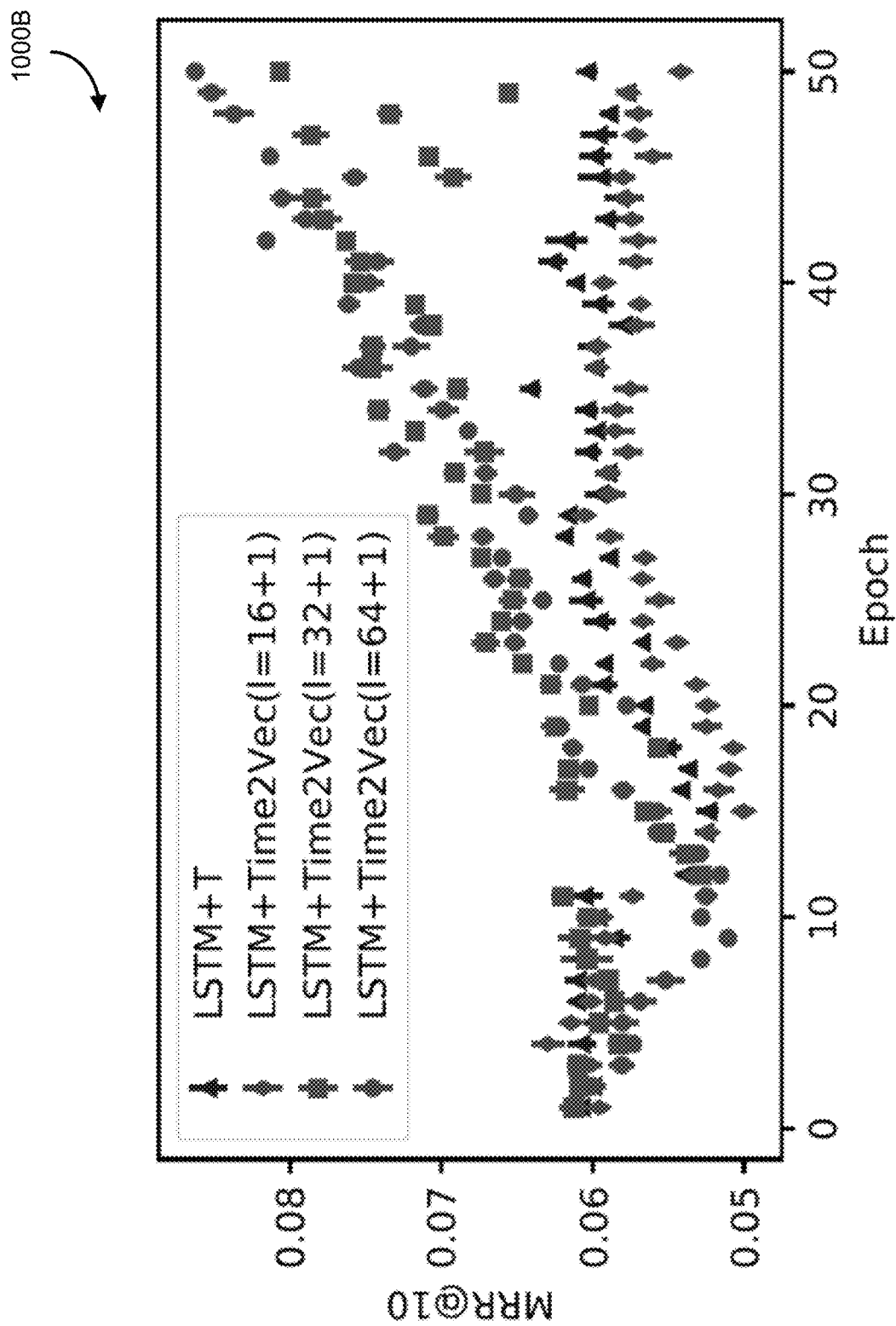

FIG. 10A-10B are plots comparing LSTM+T and LSTM+ Time2Vec on CiteULike, according to some embodiments. FIG. 10A is a plot 1000A in relation to Recall, and FIG. 10B is a plot 1000B in relation to MRR.

FIGS. 11A-11B, and FIGS. 12A-12B compare TLSTM1 with TLSTM1+ Time2Vec on Last.FM and CiteULike. FIGS. 13A-13B, and FIGS. 14A-14B compare TLSTM3 with TLSTM+ Time2Vec on Last.FM and CiteULike.

Figure 11A:
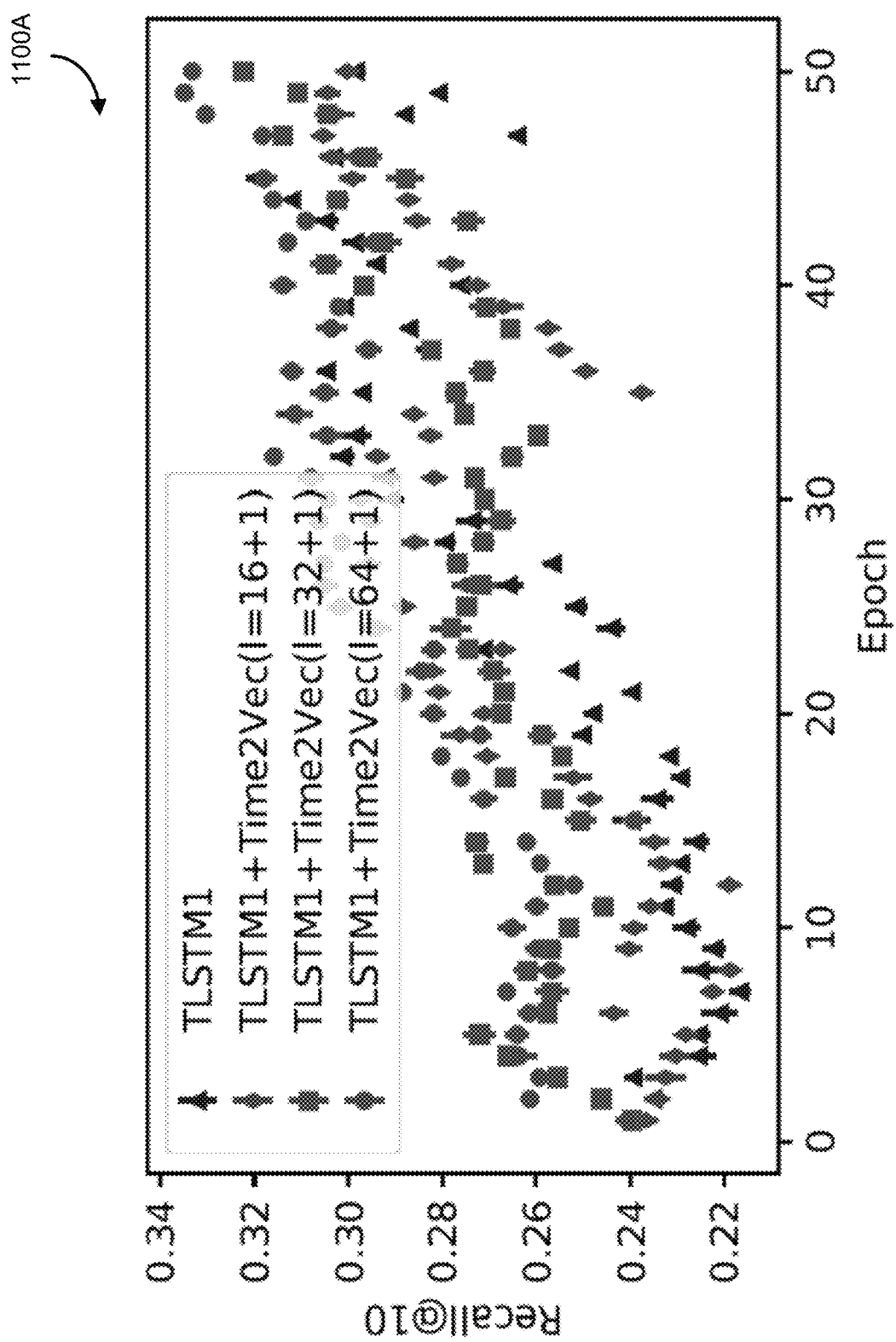
FIGS. 11A-11B are plots comparing TLSTM1's performance on Last.FM with and without Time2Vec, according to some embodiments.
Figure 11B:
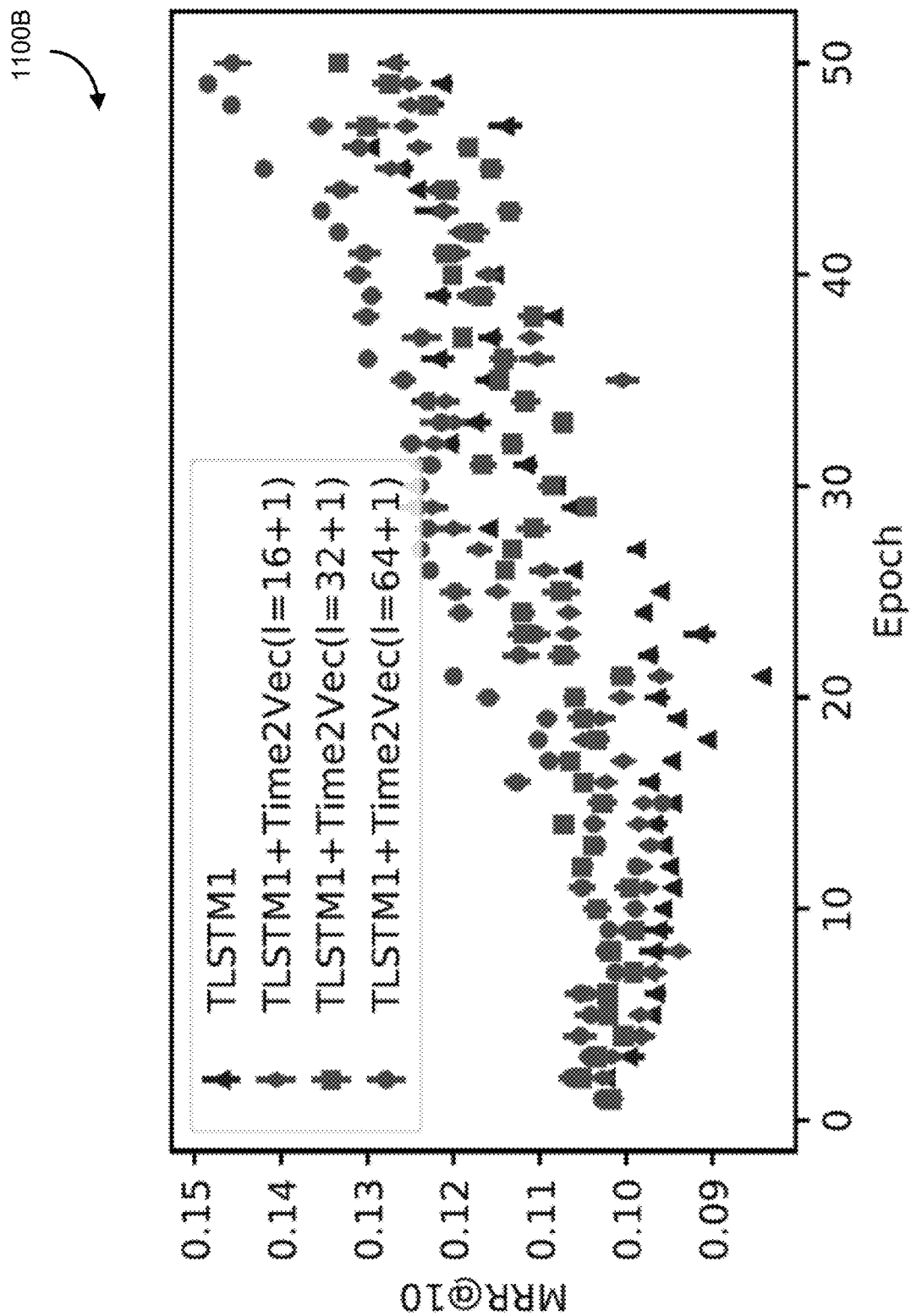

FIGS. 11A-11B are plots comparing TLSTM1's performance on Last.FM with and without Time2Vec, according to some embodiments. FIG. 11A is a plot 1100A in relation to Recall, and FIG. 11B is a plot 1100B in relation to MRR.

Figure 12A:
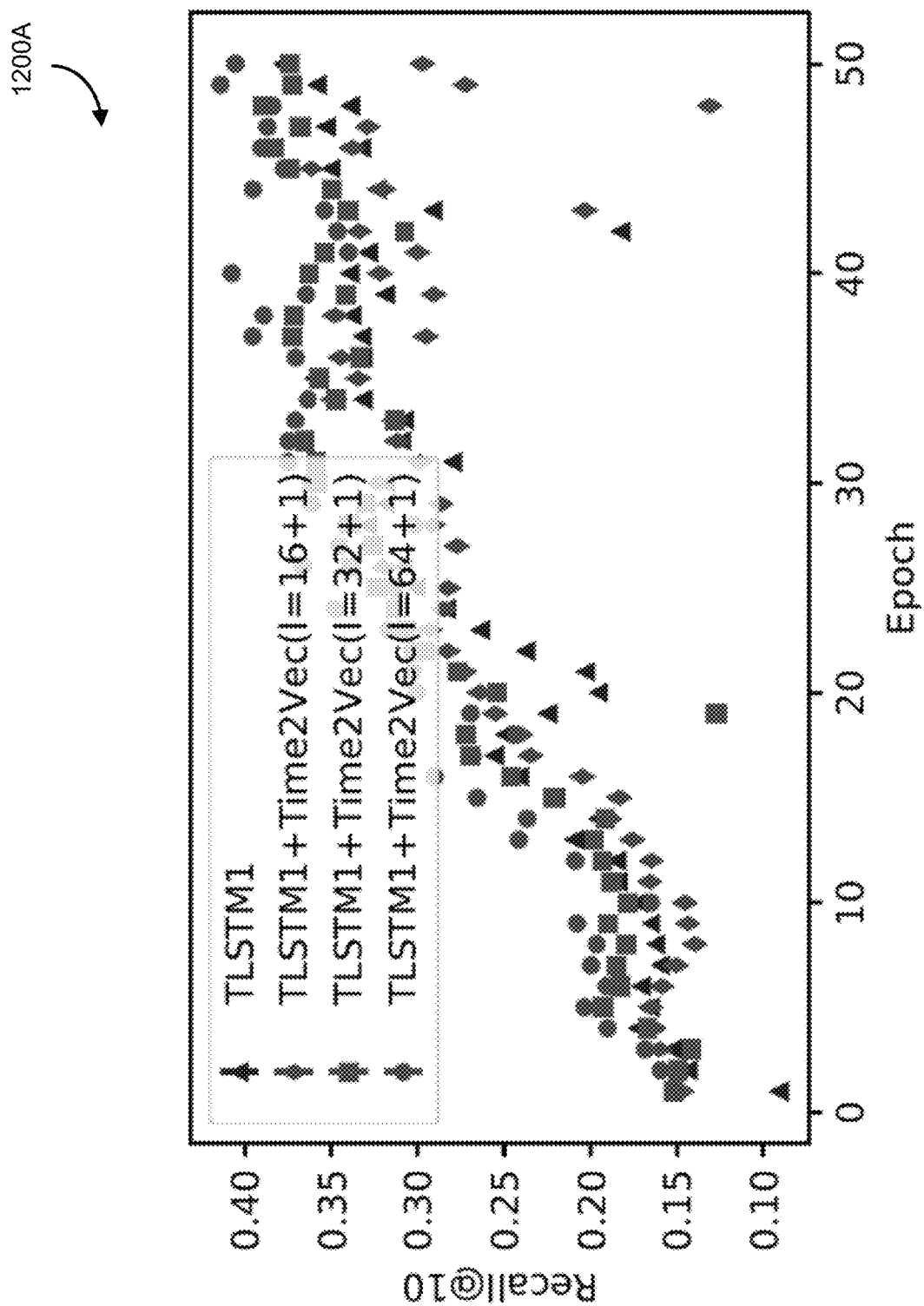
FIGS. 12A-12B are plots comparing TLSTM1's performance on CiteULike with and without Time2Vec, according to some embodiments.
Figure 12B:
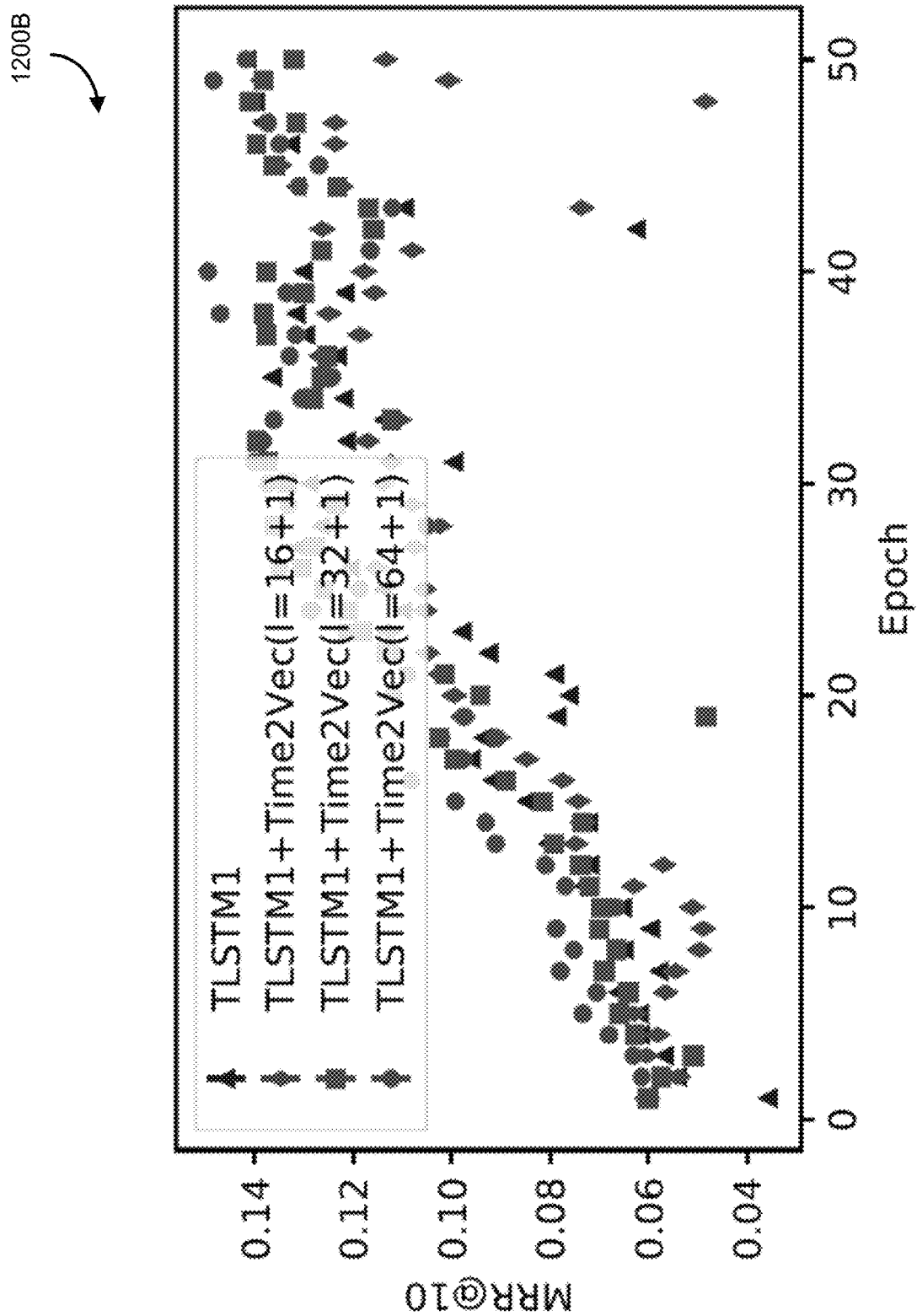

FIGS. 12A-12B are plots comparing TLSTM1's performance on CiteULink with and without Time2Vec, according to some embodiments. FIG. 12A is a plot 1200A in relation to Recall, and FIG. 12B is a plot 1200A in relation to MRR.

Figure 13A:
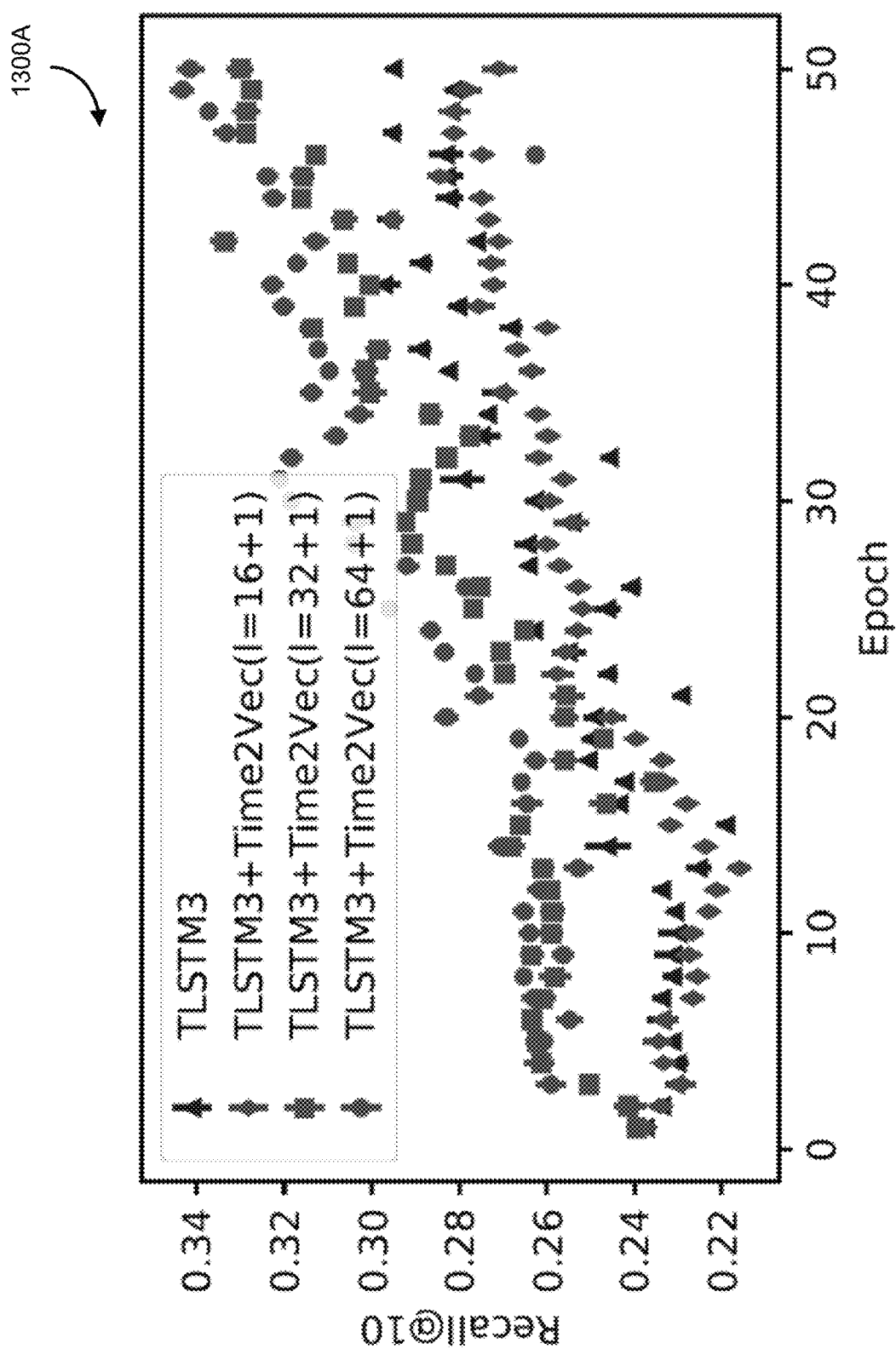
FIG. 13A-13B are plots comparing TLSTM3's performance on Last.FM with and without Time2Vec, according to some embodiments.
Figure 13B:
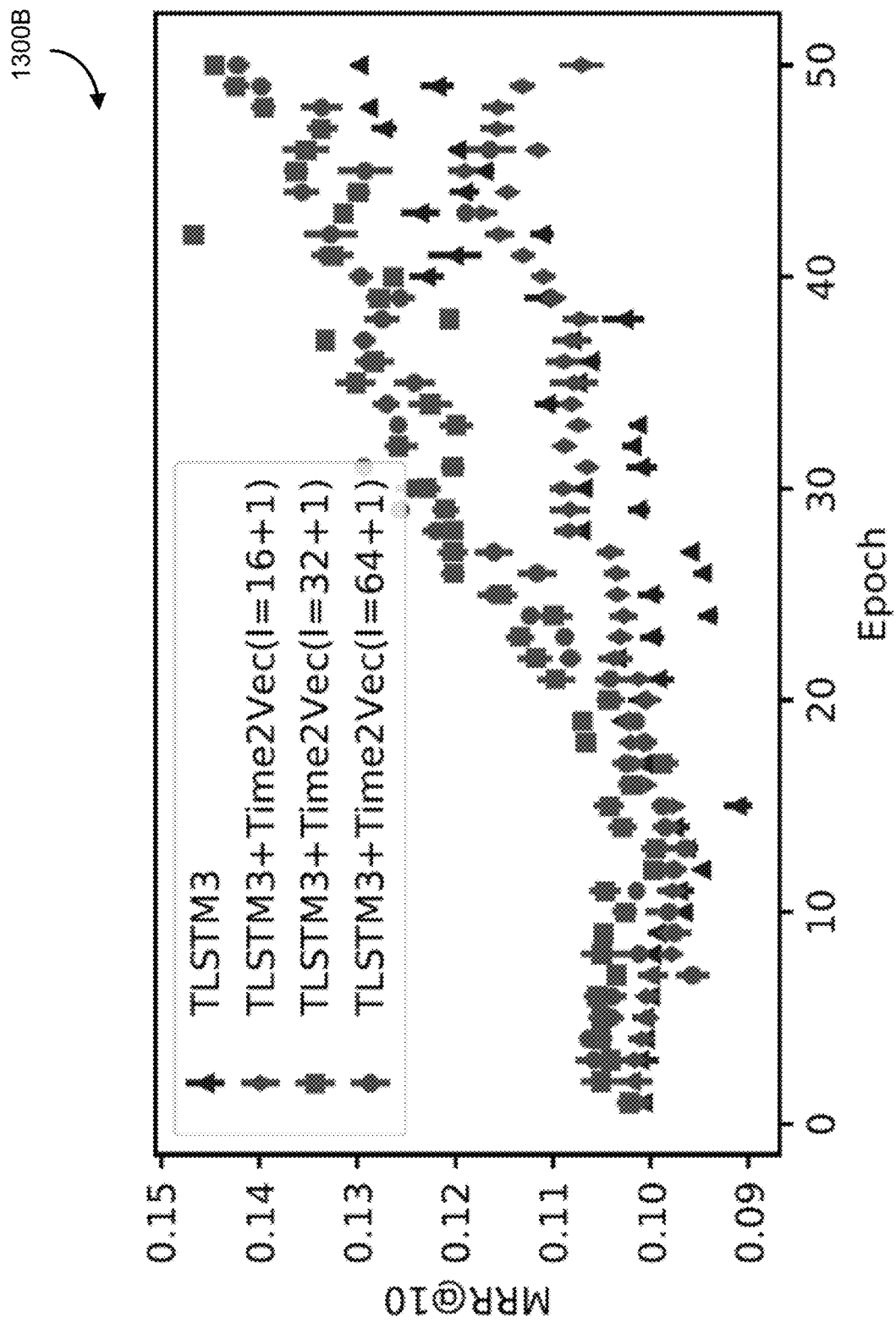

FIG. 13A-13B are plots comparing TLSTM3's performance on Last.FM with and without Time2Vec, according to some embodiments. FIG. 13A is a plot 1300A in relation to Recall, and FIG. 13B is a plot 1300B in relation to MRR.

Figure 14A:
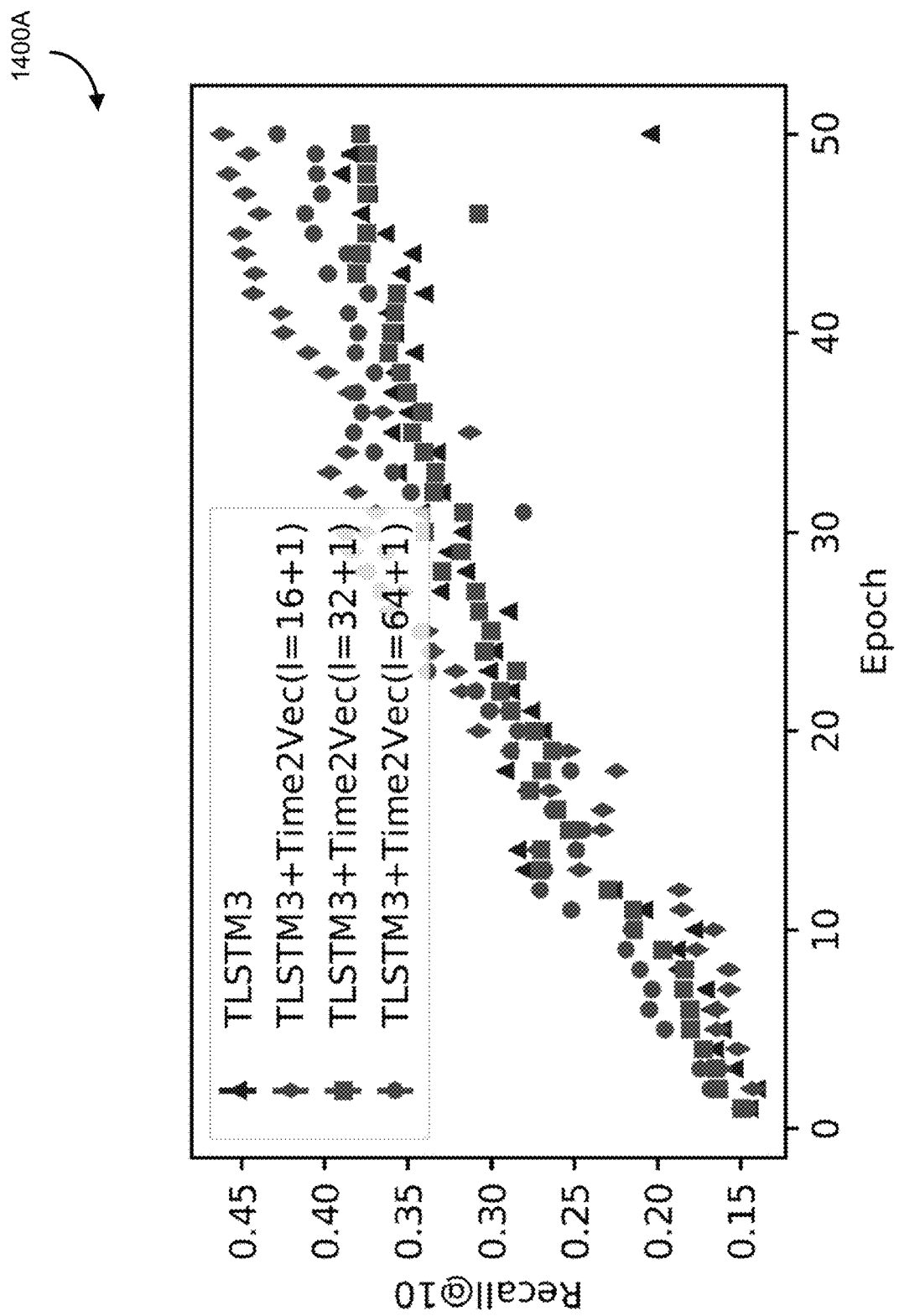
FIG. 14A-14B are plots comparing TLSTM3's performance on CiteULink with and without Time2Vec, according to some embodiments.
Figure 14B:
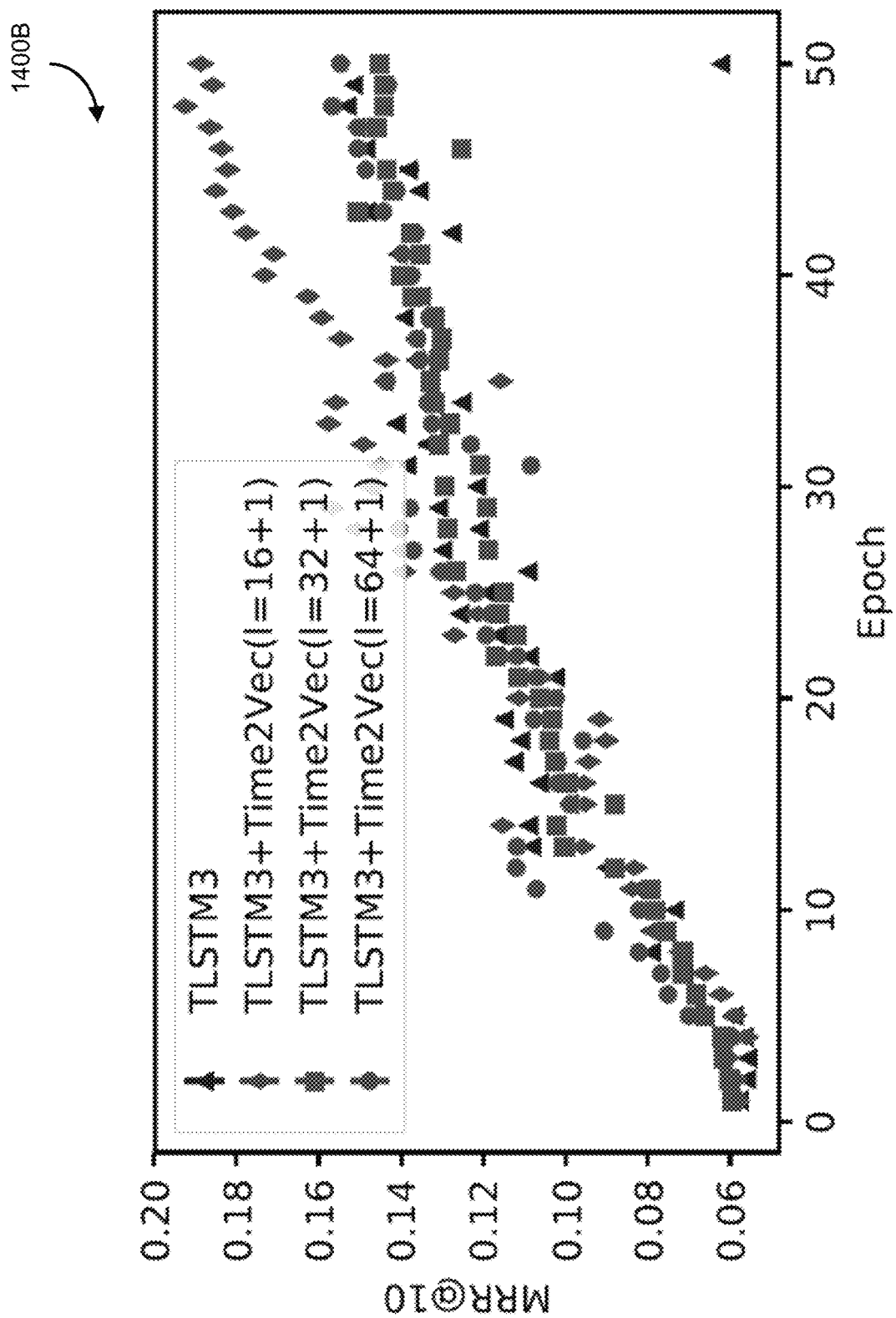

FIGS. 14A-14B are plots comparing TLSTM3's performance on CiteULink with and without Time2Vec, according to some embodiments. FIG. 14A is a plot 1400A in relation to Recall, and FIG. 14B is a plot 1400B in relation to MRR.

In most cases, Time2Vec with 64 sinusoids outperforms (or gives on-par results with) the cases with 32 or 16 sinusoids.

An exception is TLSTM3 where 16 sinusoids works best. Applicants believe that is because TLSTM3 has two time gates and adding, e.g., 64 temporal components (corresponding to the sinusoids) to each gate makes it overfit to the temporal signals.

LSTM Architectures

The original LSTM model can be neatly defined with the following equations:

$$i_j = \sigma(W_i x_j + U_i h_{j-1} + b_i) \quad (1)$$

$$f_j = \sigma(W_f x_j + U_f h_{j-1} + b_f) \quad (2)$$

$$\overline{c}_j = \text{Tan } h(W_c x_j + U_c h_{j-1} + b_c) \quad (3)$$

$$c_j = f_t \odot c_{j-1} + i_j \odot \overline{c}_j \quad (4)$$

$$o_j = \sigma(W_o x_j + U_o h_{j-1} + b_o) \quad (5)$$

$$h_j = o_j \odot \text{Tan } h(c_j) \quad (6)$$

Here $i_t$, $f_t$, and $o_t$ represent the input, forget and output gates respectively, while $c_t$ is the memory cell and $h_t$ is the hidden state. $\sigma$ and Tan h represent the Sigmoid and hyperbolic tangent activation functions respectively. Applicants refer to $x_j$ as the $j^{th}$ event.

Peepholes:

Gers & Schmidhuber (2000) introduced a variant of the LSTM architecture where the input, forget, and output gates peek into the memory cell. In this variant, $w_{pi} \odot c_{j-1}$, $w_{pf} \odot c_{j-1}$, and $w_{po} \odot c_j$ are added to the linear parts of Eq. ((1)), ((2)), and ((5)) respectively, where $w_{pi}$, $w_{pf}$ and $w_{po}$ are learnable parameters.

LSTM+T:

Let $\tau_j$ represent the time features for the $j^{th}$ event in the input and let $x'_j = [x_j; \tau_j]$. Then LSTM+T uses the same equations as the standard LSTM (denoted above) except that $x_j$ is replaced with $x'_j$.

TimeLSTM:

Applicants explain TLSTM1 and TLSTM3 which have been used in the experiments. For clarity of writing, Applicants do not include the peephole terms in the equations but they are used in the experiments. In TLSTM1, a new time gate is introduced as in Eq. equation (7) and Eq. equation (4) and equation (5) are updated to Eq. equation (8) and equation (9) respectively:

$$t_j = \sigma(W_x x_j + \sigma(u_t x_j) + b_t) \quad (7)$$

$$c_j = f_j \odot c_{j-1} + i_j \odot t_j \odot \overline{c}_j \quad (8)$$

$$o_j = \sigma(W_o x_j + v_t \tau_j + U_o h_{j-1} + b_o) \quad (9)$$

$t_j$ controls the influence of the current input on the prediction and makes the required information from timing history get stored on the cell state. TLSTM3 uses two time gates:

$$t1_j = \sigma(W_{t1}x_j + \sigma(u_{t1}\tau_j) + b_{t1}) \tag{10}$$

$$t2_j = \sigma(W_{t2}x_j + \sigma(u_{t2}\tau_j) + b_{t2}) \tag{11}$$

where the elements of $W_{t1}$ are constrained to be non-positive. t1 is used for controlling the influence of the last consumed item and t2 stores the $\tau$s thus enabling modeling long range dependencies. TLSTM3 couples the input and forget gates along with the t1 and t2 gates and replaces Eq. ((4)) to ((6)) with the following:

$$\tilde{c}_j = (1 - i_j \odot t1_j) \odot c_{j-1} + i_j \odot t1_j \odot \bar{c}_j \tag{12}$$

$$c_j = (1 - i_j) \odot c_{j-1} + i_j \odot t2_j \odot \bar{c}_j \tag{13}$$

$$o_j = \sigma(W_o x_j + v_o \tau_j + U_o h_{j-1} + b_o) \tag{14}$$

$$h_j = o_j \odot \operatorname{Tan} h(\tilde{c}_j) \tag{15}$$

Zhu uses $\tau_j = \Delta t_j$ in their experiments, where $\Delta t_j$ is the duration between the current and the last event.

TimeLSTM+ Time2Vec:

To replace time in TLSTM1 with Time2Vec, Applicants modify Eq. ((7)) and ((9)) as follows:

$$t_j = \sigma(W_t x_j + \sigma(U_t t2v(\tau)) + b_t) \tag{16}$$

$$o_j = \sigma(W_o x_j + V_t t2v(\tau) + U_o h_{j-1} + b_o) \tag{17}$$

i.e., $\tau$ is replaced with $t2v(\tau)$, $u_t$ is replaced with $U_t$, and $v_t$ is replaced with $V_t$. Similarly, for TLSTM3 Applicants modify Eq. ((10)), ((11)) and ((14)) as follows:

$$t1_j = \sigma(W_{t1}x_j + \sigma(U_{t1}t2v(\tau)) + b_{t1}) \tag{18}$$

$$t2_j = \sigma(W_{t2}x_j + \sigma(u_{t2}t2v(\tau)) + b_{t2}) \tag{19}$$

$$t_j = \sigma(W_t x_j + V_t t2v(\tau) + U_o h_{j-1} + b_t) \tag{20}$$

Proofs

Proposition 1 Time2Vec is Invariant to Time Rescaling.

Proof.

Consider the following Time2Vec representation $\mathcal{M}_1$:

$$t2v(\tau)[i] = \begin{cases} \omega_i \tau + \varphi_i, & \text{if } i = 0. \\ \sin(\omega_i \tau + \varphi_i), & \text{if } 1 \le i \le k. \end{cases} \tag{21}$$

Replacing $\tau$ with $\alpha \cdot \tau$ (for $\alpha > 0$), the Time2Vec representation updates as follows:

$$t2v(\alpha \cdot \tau)[i] = \begin{cases} \omega_i(\alpha \cdot \tau) + \varphi_i, & \text{if } i = 0. \\ \sin(\omega_i(\alpha \cdot \tau) + \varphi_i), & \text{if } 1 \le i \le k. \end{cases} \tag{22}$$

Consider another Time2Vec representation $\mathcal{M}_2$ with frequencies $$\omega'_i = \frac{\omega_i}{\alpha}.$$

Then $\mathcal{M}_2$ behaves in the same way as $\mathcal{M}_1$. This proves that Time2Vec is invariant to time rescaling.

What is claimed is:

1. A special-purpose physical computer apparatus configured for conducting machine learning pre-processing by performing a feature encoding data structure transformation of an input data set by decomposing time features of the input data set into a computer implemented data structure as transformed inputs into a machine learning data model architecture, the special-purpose physical computer apparatus residing in a data center and coupled to a message bus such that the input data set can be received across a network interface and the transformed inputs can be provided through the network interface to the machine learning data model architecture, the special purpose physical computer apparatus comprising a computer processor operating in conjunction with computer memory, input and output interfaces, and network interfaces, the computer processor configured to:

receive the input data set and extract an initial set of machine learning input vectors;

generate, based on the input data set and the extracted initial set of machine learning input vectors, a decomposed set of feature components representative of at least one or more periodic functions such that the decomposed set of feature components represent time through at least one or more periodic functions and the one or more periodic functions include at least frequency and phase-shift learnable parameters, the one or more periodic functions including at least one of sine functions, cosine functions and sawtooth functions;

provide the decomposed set of feature components into the machine learning data model architecture, the machine learning data model architecture including neural networks, the machine learning data model architecture including a first neural network activation layer that accepts the one or more periodic functions as input, wherein the first neural network activation layer comprises a plurality of neurons, each neuron with an activation function, the plurality of neurons taking in the decomposed set of feature components representing time, wherein the first neural network activation layer outputs an attribute vector comprising attribute components that represent a plurality of distinct temporal attributes having both a periodic and non-periodic part; and update, as the machine learning data model architecture iterates on a set of training data, the frequency and phase-shift learnable parameters of the decomposed set of feature components based on a reward or penalty function such that weightings associated with the frequency and phase-shift learnable parameters shift over training to reflect periodicity of the set of training data and improve at least one of accuracy, convergence speed, and reduced total number of processing cycles; and replace, during inference usage of the machine learning data model architecture, the input data set with the decomposed set of feature components representing a transformed variant of the input data set;

wherein the decomposed set of feature components representative of the at least one or more periodic functions is a vector representation $t2v(\tau)$ having k sinusoids, provided in accordance with a relation:

$$t2v(\tau)[i] = \begin{cases} \omega_i \tau + \varphi_i, & \text{if } i = 0. \\ \sin(\omega_i \tau + \varphi_i), & \text{if } 1 \le i \le k; \end{cases}$$

wherein t2v(τ)[i] is a vector of size k+1, t2v(τ)[i] is the $i^{th}$ element of t2v(τ), $\omega_i$ is the frequency learnable parameter, τ is a time feature, and φi is the phase-shift learnable parameter.

2. The special-purpose physical computer apparatus of claim 1, wherein the special-purpose physical computer apparatus is a special purpose machine, comprising a feature encoding machine that receives machine learning input vectors having time components and transforms the input vectors by expanding the decomposed set of feature components with data structures representing decomposed time components.

3. The special-purpose physical computer apparatus of claim 1, wherein t2v(τ) replaces a time feature, τ as an input into the machine learning data model architecture.

4. The special-purpose physical computer apparatus of claim 1, wherein the set of training data where a period or a phase shift of the set of training data is undefined and is updated over a plurality of iterated training epochs by modifying one or more weights associated with the frequency and phase-shift learnable parameters.

5. The special-purpose physical computer apparatus of claim 1, wherein the frequency and phase-shift learnable parameters are initialized as random numbers or predefined numbers.

6. The special-purpose physical computer apparatus of claim 1, wherein the number of sinusoids, k, is a selectable hyperparameter.

7. The special-purpose physical computer apparatus of claim 1, wherein the decomposed set of feature components includes a non-periodic term that is a linear term that represents a progression of time and the linear term is used for capturing non-periodic patterns in the set of training data that depend on time; and
   wherein the linear term includes at least a representation of the frequency and phase-shift learnable parameters.

8. The special-purpose physical computer apparatus of claim 1, wherein providing the decomposed set of feature components as inputs into the machine learning data model architecture includes replacing a time feature of one or more gates of the machine learning data model architecture with the decomposed set of feature components.

9. The special-purpose physical computer apparatus of claim 1, wherein the set of training data includes a plurality of sequences or time horizons, wherein the plurality of sequences can be synchronous and sampled at an equal rate or asynchronous and sampled at different points in time by utilizing point processes and continuous time normalizing flows.

10. The special-purpose physical computer apparatus of claim 1, wherein the computer processor is configured to:
   receive a new data set representative of a new example to conduct a machine learning task, including at least one of classification, prediction, or generation;
   process the new data set using the machine learning data model architecture to generate an output data element, the output data element including at least one of a plurality of control signals or a plurality of logits or softmax outputs;
   wherein the plurality of control signals are generated by a control signal generator to control aspects of a circuit or an electronic device; and
   wherein the plurality of logits or softmax outputs include one or more prediction data elements, the prediction data elements including at least one of data structures storing data values or fields representing logits, prediction values, and prediction classifications.

11. A machine learning pre-processing method for performing a feature encoding data structure transformation of an input data set by decomposing time features of the input data set into a computer implemented data structure as transformed inputs into a machine learning data model architecture, the performing conducted by a special-purpose physical computer apparatus residing in a data center and coupled to a message bus such that the input data set can be received across a network interface and the transformed inputs can be provided through the network interface to the machine learning data model architecture, the machine learning pre-processing method comprising:
   receiving the input data set and extracting an initial set of machine learning input vectors;
   generating, based on the input data set and the extracted initial set of machine learning input vectors, a decomposed set of feature components representative of at least one or more periodic functions such that the decomposed set of feature components represent time through at least one or more periodic functions and the one or more periodic functions include at least frequency and phase-shift learnable parameters, the one or more periodic functions including at least one of sine functions, cosine functions and sawtooth functions;
   providing the decomposed set of feature components into the machine learning data model architecture, the machine learning data model architecture including neural networks, the machine learning data model architecture including a first neural network activation layer that accepts the one or more periodic functions as input, wherein the first neural network activation layer comprises a plurality of neurons, each neuron with an activation function, the plurality of neurons taking in the decomposed set of feature components representing time, wherein the first neural network activation layer outputs an attribute vector comprising attribute components that represent a plurality of distinct temporal attributes having both a periodic and non-periodic part; and
   updating, as the machine learning data model architecture iterates on a set of training data, the frequency and phase-shift learnable parameters of the decomposed set of feature components based on a reward or penalty function such that weightings associated with the frequency and phase-shift learnable parameters shift over training to reflect periodicity of the set of training data and improve at least one of accuracy, convergence speed, and reduced total number of processing cycles; and
   replacing, during inference usage of the machine learning data model architecture, the input data set with the decomposed set of feature components representing a transformed variant of the input data set;
   wherein the decomposed set of feature components representative of the at least one or more periodic functions is a vector representation t2v(τ) having k sinusoids, provided in accordance with a relation:

$$t2v(\tau)[i] = \begin{cases} \omega_i \tau + \varphi_i, & \text{if } i = 0. \\ \sin(\omega_i \tau + \varphi_i), & \text{if } 1 \leq i \leq k; \end{cases}$$

wherein t2v(τ)[i] is a vector of size k+1, t2v(τ)[i] is the $i^{th}$ element of t2v(τ), $\omega_i$ is the frequency learnable parameter, τ is a time feature, and φi is the phase-shift learnable parameter.

12. The machine learning pre-processing method of claim 11, wherein the special-purpose physical computer apparatus is a special purpose machine, comprising a feature encoding machine that receives machine learning input vectors having time components and transforms the input vectors by expanding the decomposed set of feature components with data structures representing decomposed time components.

13. The machine learning pre-processing method of claim 11, wherein the vector representation $t2v(\tau)$ replaces a time feature, $\tau$ as an input into the machine learning data model architecture.

14. The machine learning pre-processing method of claim 11, wherein the set of training data where a period or a phase shift of the set of training data is undefined and is updated over a plurality of iterated training epochs by modifying one or more weights associated with the frequency and phase-shift learnable parameters.

15. The machine learning pre-processing method of claim 11, wherein the frequency and phase-shift learnable parameters are initialized as random numbers or predefined numbers.

16. The machine learning pre-processing method of claim 12, wherein the number of sinusoids, k, is a selectable hyperparameter.

17. The machine learning pre-processing method of claim 11, wherein the decomposed set of feature components includes a non-periodic term that is a linear term that represents a progression of time and the linear term is used for capturing non-periodic patterns in the set of training data that depend on time; and
wherein the linear term includes at least a representation of the frequency and phase-shift learnable parameters.

18. The machine learning pre-processing method of claim 11, wherein providing the decomposed set of feature components as inputs into the machine learning data model architecture includes replacing a time feature of one or more gates of the machine learning data model architecture with the decomposed set of feature components.

19. The machine learning pre-processing method of claim 11, wherein the set of training data includes a plurality of sequences or time horizons, wherein the plurality of sequences can be synchronous and sampled at an equal rate or asynchronous and sampled at different points in time by utilizing point processes and continuous time normalizing flows.

20. The machine learning pre-processing method of claim 11, comprising:
receiving a new data set representative of a new example to conduct a machine learning task, including at least one of classification, prediction, or generation;
processing the new data set using a trained machine learning data model architecture to generate an output data element, the output data element including at least one of a plurality of control signals or a plurality of logits or softmax outputs;
wherein the plurality of control signals are generated by a control signal generator to control aspects of a circuit or an electronic device; and
wherein the plurality of logits or softmax outputs include one or more prediction data elements, the prediction data elements including at least one of data structures storing data values or fields representing logits, prediction values, and prediction classifications.

21. A non-transitory computer readable medium storing a machine learning data model architecture, the machine learning data model architecture trained using a machine learning pre-processing method for performing a feature encoding data structure transformation of an input data set by decomposing time features of the input data set into a computer implemented data structure as transformed inputs into a machine learning data model architecture, the performing conducted by a special-purpose physical computer apparatus residing in a data center and coupled to a message bus such that the input data set can be received across a network interface and the transformed inputs can be provided through the network interface to the machine learning data model architecture, the machine learning pre-processing method comprising:
receiving the input data set and extracting an initial set of machine learning input vectors;
generating, based on the input data set and the extracted initial set of machine learning input vectors, a decomposed set of feature components representative of at least one or more periodic functions such that the decomposed set of feature components represent time through at least one or more periodic functions and the one or more periodic functions include at least frequency and phase-shift learnable parameters, the one or more periodic functions including at least one of sine functions, cosine functions and sawtooth functions;
providing the decomposed set of feature components into the machine learning data model architecture, the machine learning data model architecture including neural networks, the machine learning data model architecture including a first neural network activation layer that accepts the one or more periodic functions as input, wherein the first neural network activation layer comprises a plurality of neurons, each neuron with an activation function, the plurality of neurons taking in the decomposed set of feature components representing time, wherein the first neural network activation layer outputs an attribute vector comprising attribute components that represent a plurality of distinct temporal attributes having both a periodic and non-periodic part; and
updating, as the machine learning data model architecture iterates on a set of training data, the frequency and phase-shift learnable parameters of the decomposed set of feature components based on a reward or penalty function such that weightings associated with the frequency and phase-shift learnable parameters shift over training to reflect periodicity of the set of training data and improve at least one of accuracy, convergence speed, and reduced total number of processing cycles; and
replacing, during inference usage of the machine learning data model architecture, the input data set with the decomposed set of feature components representing a transformed variant of the input data set;
wherein the decomposed set of feature components representative of the at least one or more periodic functions is a vector representation $t2v(\tau)$ having k sinusoids, provided in accordance with a relation:

$$t2v(\tau)[i] = \begin{cases} \omega_i \tau + \varphi_i, & \text{if } i = 0. \\ \sin(\omega_i \tau + \varphi_i), & \text{if } 1 \leq i \leq k; \end{cases}$$

wherein $t2v(\tau)[i]$ is a vector of size k+1, $t2v(\tau)[i]$ is the $i^{th}$ element of $t2v(\tau)$, $\omega_i$ is the frequency learnable parameter, $\tau$ is a time feature, and $\varphi i$ is the phase-shift learnable parameter.

22. The non-transitory computer readable medium of claim 21, wherein t2v(τ) replaces a time feature, τ as an input of or in one or more relations corresponding to one or more gates of the machine learning data model architecture.

23. A non-transitory computer readable medium storing machine interpretable instructions, which when executed, cause a processor to perform a machine learning pre-processing method for a feature encoding data structure transformation of an input data set by decomposing time features of the input data set into a computer implemented data structure as transformed inputs into a machine learning data model architecture, the performing conducted by a special-purpose physical computer apparatus residing in a data center and coupled to a message bus such that the input data set can be received across a network interface and the transformed inputs can be provided through the network interface to the machine learning data model architecture, the machine learning pre-processing method comprising:

receiving the input data set and extracting an initial set of machine learning input vectors;

generating, based on the input data set and the extracted initial set of machine learning input vectors, a decomposed set of feature components representative of at least one or more periodic functions such that the decomposed set of feature components represent time through at least one or more periodic functions and the one or more periodic functions include at least frequency and phase-shift learnable parameters, the one or more periodic functions including at least one of sine functions, cosine functions and sawtooth functions;

providing the decomposed set of feature components into the machine learning data model architecture, the machine learning data model architecture including neural networks, the machine learning data model architecture including a first neural network activation layer that accepts the one or more periodic functions as input, wherein the first neural network activation layer comprises a plurality of neurons, each neuron with an activation function, the plurality of neurons taking in the decomposed set of feature components representing time, wherein the first neural network activation layer outputs an attribute vector comprising attribute components that represent a plurality of distinct temporal attributes having both a periodic and non-periodic part; and updating, as the machine learning data model architecture iterates on a set of training data, the frequency and phase-shift learnable parameters of the decomposed set of feature components based on a reward or penalty function such that weightings associated with the frequency and phase-shift learnable parameters shift over training to reflect periodicity of the set of training data and improve at least one of accuracy, convergence speed, and reduced total number of processing cycles; and replacing, during inference usage of the machine learning data model architecture, the input data set with the decomposed set of feature components representing a transformed variant of the input data set;

wherein the decomposed set of feature components representative of the at least one or more periodic functions is a vector representation t2v(τ) having k sinusoids, provided in accordance with a relation:

$$t2v(\tau)[i] = \begin{cases} \omega_i \tau + \varphi_i, & \text{if } i = 0. \\ \sin(\omega_i \tau + \varphi_i), & \text{if } 1 \leq i \leq k; \end{cases}$$

wherein t2v(τ)[i] is a vector of size k+1, t2v(τ)[i] is the $i^{th}$ element of t2v(τ), $\omega_i$ is the frequency learnable parameter, τ is a time feature, and φi is the phase-shift learnable parameter.

* * * * *